United States Patent
Takeda et al.

(10) Patent No.: US 12,414,102 B2
(45) Date of Patent: Sep. 9, 2025

(54) TECHNIQUES FOR CROSS-CARRIER SCHEDULING FROM A SECONDARY CELL TO A PRIMARY CELL

(71) Applicant: QUALCOMM INCORPORATED, San Diego, CA (US)

(72) Inventors: Kazuki Takeda, Tokyo (JP); Wanshi Chen, San Diego, CA (US); Peter Gaal, San Diego, CA (US); Yiqing Cao, Beijing (CN); Alberto Rico Alvarino, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/758,489

(22) PCT Filed: Jan. 27, 2021

(86) PCT No.: PCT/CN2021/073960
§ 371 (c)(1),
(2) Date: Jul. 7, 2022

(87) PCT Pub. No.: WO2021/151382
PCT Pub. Date: Aug. 5, 2021

(65) Prior Publication Data
US 2023/0026760 A1    Jan. 26, 2023

(30) Foreign Application Priority Data

Jan. 29, 2020    (WO) ................ PCT/CN2020/074063

(51) Int. Cl.
*H04W 72/1263* (2023.01)
*H04L 1/00* (2006.01)
(Continued)

(52) U.S. Cl.
CPC ....... *H04W 72/1263* (2013.01); *H04L 1/0038* (2013.01); *H04L 1/1812* (2013.01);
(Continued)

(58) Field of Classification Search
CPC ............. H04W 72/12; H04W 72/1263; H04W 72/1268; H04W 72/1273; H04W 24/00;
(Continued)

(56) References Cited

U.S. PATENT DOCUMENTS 8,280,389 B1 * 10/2012 Turtinen ................ H04W 24/10
455/450
8,780,833 B2 * 7/2014 Kim ...................... H04L 5/0048
370/329

(Continued)

FOREIGN PATENT DOCUMENTS

| CN | 103748824 A | 4/2014 |
| CN | 104519515 A | 4/2015 |

(Continued)

OTHER PUBLICATIONS

Intel Corporation: "Scheduling and UCI feedback for carrier aggregation", 3GPP Draft, 3GPP TSG-RAN WG1 #90, R1-1712603, Prague, Czechia Aug. 21-25, 2017, Aug. 25, 2017 (Aug. 25, 2017), pp. 1-5, the whole document.

(Continued)

*Primary Examiner* — Warner Wong
(74) *Attorney, Agent, or Firm* — Holland & Hart LLP/Qualcomm

(57) ABSTRACT

Methods, systems, and devices for wireless communications are described. A user equipment (UE) may be configured to monitor search spaces on a primary cell and an secondary cell in a carrier aggregation configuration. The UE may monitor the search spaces for control information according to a shared search space monitoring configuration. Based on
(Continued)

the shared search space monitoring configuration, the UE may identify that the secondary cell is a scheduling cell and the primary cell is a scheduled cell (e.g., cross-carrier scheduling). The UE may monitor control channel candidates of search spaces on the primary cell and on the secondary cell for downlink control information messages scheduling data transmissions with the primary cell. In some examples, the cross-carrier scheduled communications may be configured according to a scheduling configuration, which may include one or more scheduling constraints.

20 Claims, 20 Drawing Sheets

(51) Int. Cl.
*H04L 1/1812* (2023.01)
*H04W 24/08* (2009.01)
*H04W 72/23* (2023.01)

(52) U.S. Cl.
CPC ............ *H04W 24/08* (2013.01); *H04W 72/23* (2023.01); *H04L 1/0007* (2013.01)

(58) Field of Classification Search
CPC ................. H04W 24/08; H04W 72/00; H04W 72/1289; H04W 36/00692; H04W 28/00; H04W 72/50; H04W 74/00; H04W 74/04; H04L 1/0036; H04L 1/0038; H04L 1/18; H04L 1/1812; H04L 43/00; H04L 43/08; H04L 43/10
See application file for complete search history.

(56) References Cited

U.S. PATENT DOCUMENTS

| | | | | |
|---|---|---|---|---|
| 2010/0304689 | A1* | 12/2010 | McBeath | H04W 72/20 455/68 |
| 2011/0076962 | A1* | 3/2011 | Chen | H04L 5/001 455/68 |
| 2012/0034945 | A1* | 2/2012 | Wang | H04W 76/27 455/515 |
| 2012/0044821 | A1* | 2/2012 | Kim | H04L 5/0048 455/67.11 |
| 2013/0051355 | A1* | 2/2013 | Hong | H04J 11/0073 370/329 |
| 2013/0114529 | A1 | 5/2013 | Chen et al. | |
| 2014/0003356 | A1* | 1/2014 | Wang | H04W 72/23 370/329 |
| 2014/0140316 | A1* | 5/2014 | Nagata | H04L 5/0035 370/329 |
| 2014/0198748 | A1 | 7/2014 | Lee et al. | |
| 2015/0124729 | A1 | 5/2015 | Lee et al. | |
| 2015/0304086 | A1 | 10/2015 | Kim et al. | |
| 2015/0341918 | A1 | 11/2015 | Yang et al. | |
| 2016/0164622 | A1 | 6/2016 | Yi et al. | |
| 2016/0278056 | A1* | 9/2016 | Abe | H04W 48/12 |
| 2016/0337095 | A1* | 11/2016 | Horiuchi | H04L 5/001 |
| 2018/0152954 | A1* | 5/2018 | Golitschek Edler Von Elbwart | H04L 5/0092 |
| 2018/0241511 | A1* | 8/2018 | Harada | H04W 76/15 |
| 2021/0112585 | A1* | 4/2021 | Ji | H04W 72/23 |
| 2022/0159705 | A1* | 5/2022 | Cirik | H04W 72/046 |
| 2023/0036466 | A1* | 2/2023 | Yoshioka | H04L 5/001 |
| 2024/0137938 | A1* | 4/2024 | Zhou | H04L 5/001 |

FOREIGN PATENT DOCUMENTS

| | | | | |
|---|---|---|---|---|
| CN | 104937865 | A | 9/2015 | |
| CN | 105991263 | A | 10/2016 | |
| CN | 106304371 | A | 1/2017 | |
| CN | 107566093 | A | 1/2018 | |
| CN | 108521321 | A | 9/2018 | |
| CN | 110475356 | A | 11/2019 | |
| WO | WO-2014000456 | A1 | 1/2014 | |
| WO | WO-2016119882 | A1 * | 8/2016 | ............ H04L 5/001 |
| WO | WO-2022029316 | A1 | 2/2022 | |
| WO | WO-2024160143 | A1 * | 8/2024 | ......... H04W 72/232 |

OTHER PUBLICATIONS

International Search Report and Written Opinion—PCT/CN2020/074063—ISAEPO—Oct. 27, 2020.

International Search Report and Written Opinion—PCT/CN2021/073960—ISA/EPO—Apr. 12, 2021.

Huawei, et al., "Remaining Issues on Bandwidth Part and CA", 3GPP TSG RAN WG1 Meeting #94, R1-1809752, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 22, 2018, 24 Pages, XP051517113, section 2.4.

Panasonic: "Overriding of SPS Resource for Carrier Aggregation", 3GPP TSG-RAN WG2 Meeting #70bis, R2-103601, 3rd Generation Partnership Project, Mobile Competence Centre, 650, Route Des Lucioles, F-06921 Sophia-Antipolis Cedex, France, vol. RAN WG2, No. Stockholm, Sweden, Jun. 28, 2010, Jun. 22, 2010, 2 Pages, XP050451148, p. 1 - p. 2.

Supplementary European Search Report—EP21747198—Search Authority —The Hague—Feb. 9, 2024.

* cited by examiner

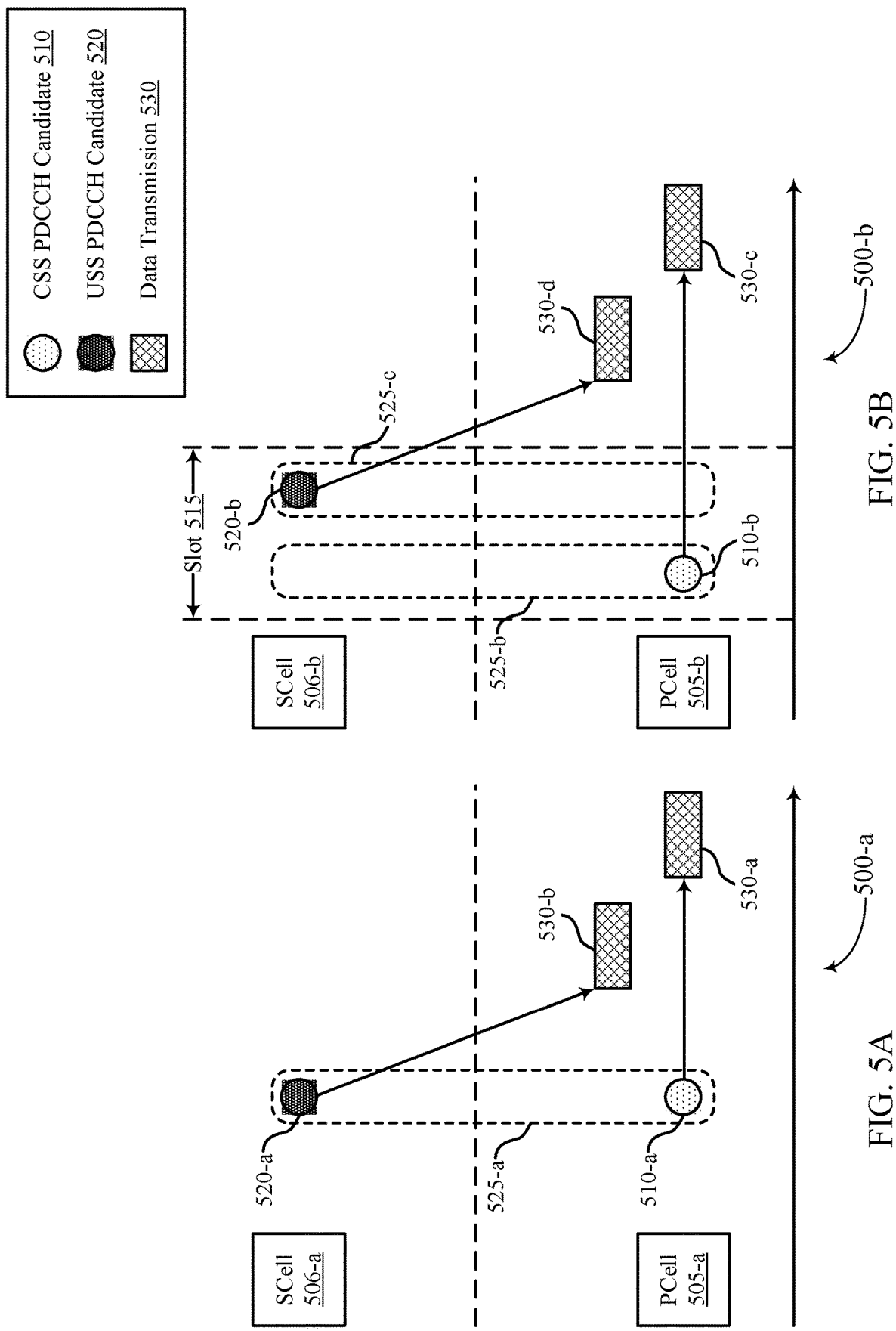

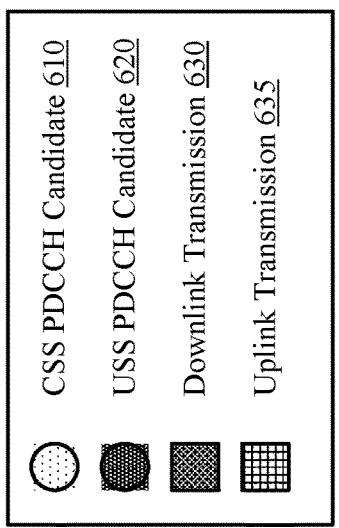
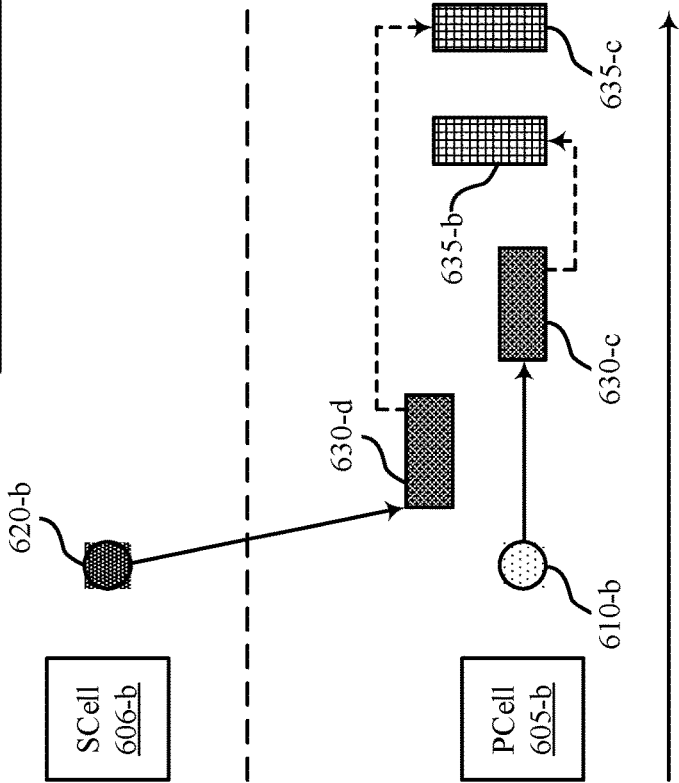
FIG. 6B
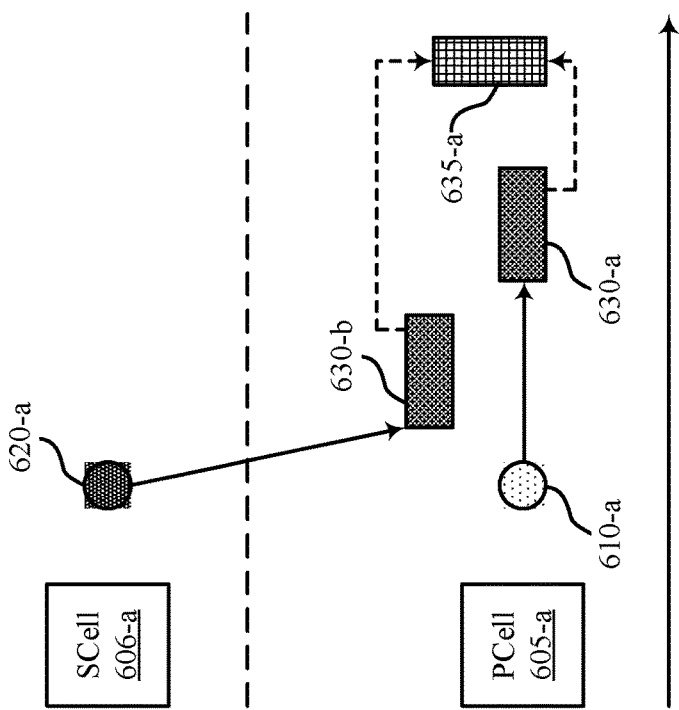
FIG. 6A

TECHNIQUES FOR CROSS-CARRIER SCHEDULING FROM A SECONDARY CELL TO A PRIMARY CELL

CROSS-REFERENCE

The present Application is a 371 national stage filing of International PCT Application No. PCT/CN2021/073960 by TAKEDA et al. entitled "TECHNIQUES FOR CROSS-CARRIER SCHEDULING FROM A SECONDARY CELL TO A PRIMARY CELL," filed Jan. 27, 2021; and claims priority to International Patent Application No. PCT/CN2020/074063 by TAKEDA et al. entitled "TECHNIQUES FOR CROSS-CARRIER SCHEDULING FROM A SECONDARY CELL TO A PRIMARY CELL," Jan. 29, 2020, each of which is assigned to the assignee hereof, and each of which is expressly incorporated by reference in its entirety herein.

FIELD OF TECHNOLOGY

The following relates generally to wireless communications and more specifically to techniques for cross-carrier scheduling from a secondary cell to a primary cell.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with multiple serving cells of a wireless communications system in a carrier aggregation (CA) configuration. In some examples, a serving cell may transmit a cross-carrier scheduling indication that the UE is to communicate with a different serving cell via a data transmission. For example, the UE may be scheduled to receive a downlink transmission, or transmit an uplink transmission.

SUMMARY

The described techniques relate to improved methods, systems, devices, and apparatuses that support techniques for cross-carrier scheduling from a secondary cell to a primary cell. Generally, the described techniques provide for enabling a user equipment (UE) to monitor search spaces on a primary cell and a secondary cell in a carrier aggregation configuration. The UE may monitor search spaces of the primary cell and the secondary cell for control information according to a shared search space monitoring configuration. Based on the shared search space monitoring configuration, the UE may identify that the secondary cell is a scheduling cell and the primary cell is a scheduled cell (e.g., cross-carrier scheduling). The UE may monitor control channel candidates of search spaces on the primary cell and on the secondary cell for downlink control information messages scheduling data transmissions with the primary cell.

In some examples, the cross-carrier scheduled communications may be configured according to a scheduling configuration, which may include one or more scheduling constraints. The scheduling constraints may apply to the downlink control information messages, the scheduled data transmissions, feedback messages corresponding to the data transmissions, or any combination thereof. The scheduling constraints may enable the UE to improve communications efficiency and resource utilization, without significantly increasing communications complexity for the UE.

A method of wireless communications at a UE is described. The method may include identifying that the UE is in communication with a primary cell and a secondary cell in a carrier aggregation configuration, where the primary cell is a cross-carrier scheduled cell and the secondary cell is a cross-carrier scheduling cell, monitoring a common search space of the primary cell and a UE-specific search space of the secondary cell for control information in accordance with a shared search space monitoring configuration, receiving one or more downlink control information messages as a result of monitoring the UE-specific search space of the secondary cell where the one or more downlink control information messages include a cross-carrier scheduling indication that a data transmission is scheduled with the primary cell, and communicating with the primary cell via the data transmission in accordance with at least one of the one or more downlink control information messages.

An apparatus for wireless communications at a UE is described. The apparatus may include a processor, memory coupled with the processor, and instructions stored in the memory. The instructions may be executable by the processor to cause the apparatus to identify that the UE is in communication with a primary cell and a secondary cell in a carrier aggregation configuration, where the primary cell is a cross-carrier scheduled cell and the secondary cell is a cross-carrier scheduling cell, monitor a common search space of the primary cell and a UE-specific search space of the secondary cell for control information in accordance with a shared search space monitoring configuration, receive one or more downlink control information messages as a result of monitoring the UE-specific search space of the secondary cell, where the one or more downlink control information messages include a cross-carrier scheduling indication that a data transmission is scheduled with the primary cell, and communicate with the primary cell via the data transmission in accordance with at least one of the one or more downlink control information messages.

Another apparatus for wireless communications at a UE is described. The apparatus may include means for identifying that the UE is in communication with a primary cell and a secondary cell in a carrier aggregation configuration, where the primary cell is a cross-carrier scheduled cell and the secondary cell is a cross-carrier scheduling cell, monitoring a common search space of the primary cell and a UE-specific search space of the secondary cell for control information in accordance with a shared search space monitoring configuration, receiving one or more downlink control information messages as a result of monitoring the UE-specific search space of the secondary cell, where the one or more downlink control information messages include a cross-carrier scheduling indication that a data transmission is scheduled with the primary cell, and communicating with the primary cell via the data transmission in accordance with at least one of the one or more downlink control information messages.

A non-transitory computer-readable medium storing code for wireless communications at a UE is described. The code may include instructions executable by a processor to identify that the UE is in communication with a primary cell and a secondary cell in a carrier aggregation configuration, where the primary cell is a cross-carrier scheduled cell and the secondary cell is a cross-carrier scheduling cell, monitor a common search space of the primary cell and a UE-specific search space of the secondary cell for control information in accordance with a shared search space monitoring configuration, receive one or more downlink control information messages as a result of monitoring the UE-specific search space of the secondary cell, where the one or more downlink control information messages include a cross-carrier scheduling indication that a data transmission is scheduled with the primary cell, and communicate with the primary cell via the data transmission in accordance with at least one of the one or more downlink control information messages.

Some examples of the method, apparatuses, and non-transitory computer-readable medium described herein may further include operations, features, means, or instructions for identifying a respective carrier indicator field in each of the one or more downlink control information messages, where the cross-carrier scheduling indication may be a value included in one of the respective carrier indicator fields.

Some examples of the method, apparatuses, and non-transitory computer-readable medium described herein may further include operations, features, means, or instructions for determining a limit corresponding to the shared search space monitoring configuration, where the limit may be associated with a maximum number of blind decodes to be attempted by the UE, a maximum number of non-overlapping control channel elements, or both, across control channel candidates of the common search space of the primary cell and of the UE-specific search space of the secondary cell.

Some examples of the method, apparatuses, and non-transitory computer-readable medium described herein may further include operations, features, means, or instructions for receiving an indication of the limit from the secondary cell, where determining the limit may be based on receiving the indication.

Some examples of the method, apparatuses, and non-transitory computer-readable medium described herein may further include operations, features, means, or instructions for receiving an indication of the shared search space monitoring configuration consistent with the limit, where the monitoring may be further in accordance with the limit.

Some examples of the method, apparatuses, and non-transitory computer-readable medium described herein may further include operations, features, means, or instructions for receiving an indication of the shared search space monitoring configuration, where the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both, identifying a second UE-specific search space of the secondary cell included in the shared search space monitoring configuration, and refraining from monitoring the second UE-specific search space of the secondary cell in accordance with the limit.

Some examples of the method, apparatuses, and non-transitory computer-readable medium described herein may further include operations, features, means, or instructions for receiving a second downlink control information message as a result of the monitoring, where the second downlink control information message includes a second scheduling indication that a second data transmission may be scheduled with the secondary cell, and communicating with the secondary cell via the second data transmission in accordance with the second downlink control information message.

Some examples of the method, apparatuses, and non-transitory computer-readable medium described herein may further include operations, features, means, or instructions for receiving a third downlink control information message as a result of the monitoring, where the third downlink control information message includes a third scheduling indication that a third data transmission may be scheduled with the primary cell, and communicating with the primary cell via the third data transmission in accordance with the third downlink control information message.

In some examples of the method, apparatuses, and non-transitory computer-readable medium described herein, the shared search space monitoring configuration includes control channel candidates associated with the one or more downlink control information messages that include the cross-carrier scheduling indication, and the control channel candidates associated with the one or more downlink control information messages may be not included in UE-specific search spaces not associated with the cross-carrier scheduling indication.

In some examples of the method, apparatuses, and non-transitory computer-readable medium described herein, the shared search space monitoring configuration includes control channel candidates associated with the one or more downlink control information messages that include the cross-carrier scheduling indication, and one or more of the control channel candidates associated with the one or more downlink control information messages may be included in a second UE-specific search space not associated with the cross-carrier scheduling indication.

Some examples of the method, apparatuses, and non-transitory computer-readable medium described herein may further include operations, features, means, or instructions for reporting an indication of a capability of the UE to support shared search space control channel candidates in UE-specific search spaces not associated with the cross-carrier scheduling indication, where the shared search space monitoring configuration may be based on the capability.

In some examples of the method, apparatuses, and non-transitory computer-readable medium described herein, monitoring the common search space of the primary cell for the control information may include operations, features, means, or instructions for monitoring a type0 common search space of the primary cell, a type0A common search space of the primary cell, a type1 common search space of the primary cell, a type2 common search space of the primary cell, a type3 common search space of the primary cell, or any combination thereof.

In some examples of the method, apparatuses, and non-transitory computer-readable medium described herein, communicating with the primary cell via the data transmission may include operations, features, means, or instructions for receiving a downlink data transmission from the primary cell, transmitting an uplink data transmission to the primary cell, or both.

A method of wireless communications at a base station is described. The method may include configuring a UE to communicate with a primary cell and a secondary cell in a carrier aggregation configuration, where the primary cell is a cross-carrier scheduled cell and the secondary cell is a cross-carrier scheduling cell, configuring a common search space of the primary cell and a UE-specific search space of the secondary cell for transmitting control information in accordance with a shared search space monitoring configuration, transmitting one or more downlink control information messages to the UE in the UE-specific search space of the secondary cell in accordance with the configuring, where the one or more downlink control information messages include a cross-carrier scheduling indication that a data transmission is scheduled with the primary cell, and communicating with the UE via the data transmission of the primary cell in accordance with at least one of the one or more downlink control information messages.

An apparatus for wireless communications at a base station is described. The apparatus may include a processor, memory coupled with the processor, and instructions stored in the memory. The instructions may be executable by the processor to cause the apparatus to configure a UE to communicate with a primary cell and a secondary cell in a carrier aggregation configuration, where the primary cell is a cross-carrier scheduled cell and the secondary cell is a cross-carrier scheduling cell, configure a common search space of the primary cell and a UE-specific search space of the secondary cell for transmitting control information in accordance with a shared search space monitoring configuration, transmit one or more downlink control information messages to the UE in the UE-specific search space of the secondary cell in accordance with the configuring, where the one or more downlink control information messages include a cross-carrier scheduling indication that a data transmission is scheduled with the primary cell, and communicate with the UE via the data transmission of the primary cell in accordance with at least one of the one or more downlink control information messages.

Another apparatus for wireless communications at a base station is described. The apparatus may include means for configuring a UE to communicate with a primary cell and a secondary cell in a carrier aggregation configuration, where the primary cell is a cross-carrier scheduled cell and the secondary cell is a cross-carrier scheduling cell, configuring a common search space of the primary cell and a UE-specific search space of the secondary cell for transmitting control information in accordance with a shared search space monitoring configuration, transmitting one or more downlink control information messages to the UE in the UE-specific search space of the secondary cell in accordance with the configuring, where the one or more downlink control information messages include a cross-carrier scheduling indication that a data transmission is scheduled with the primary cell, and communicating with the UE via the data transmission of the primary cell in accordance with at least one of the one or more downlink control information messages.

A non-transitory computer-readable medium storing code for wireless communications at a base station is described. The code may include instructions executable by a processor to configure a UE to communicate with a primary cell and a secondary cell in a carrier aggregation configuration, where the primary cell is a cross-carrier scheduled cell and the secondary cell is a cross-carrier scheduling cell, configure a common search space of the primary cell and a UE-specific search space of the secondary cell for transmitting control information in accordance with a shared search space monitoring configuration, transmit one or more downlink control information messages to the UE in the UE-specific search space of the secondary cell in accordance with the configuring, where the one or more downlink control information messages include a cross-carrier scheduling indication that a data transmission is scheduled with the primary cell, and communicate with the UE via the data transmission of the primary cell in accordance with at least one of the one or more downlink control information messages.

Some examples of the method, apparatuses, and non-transitory computer-readable medium described herein may further include operations, features, means, or instructions for configuring a respective carrier indicator field in each of the one or more downlink control information messages, where the cross-carrier scheduling indication may be a value included in one of the respective carrier indicator fields.

Some examples of the method, apparatuses, and non-transitory computer-readable medium described herein may further include operations, features, means, or instructions for determining a limit corresponding to the shared search space monitoring configuration, where the limit may be associated with a maximum number of blind decodes to be attempted by the UE, a maximum number of non-overlapping control channel elements, or both, across control channel candidates of the common search space of the primary cell and of the UE-specific search space of the secondary cell.

Some examples of the method, apparatuses, and non-transitory computer-readable medium described herein may further include operations, features, means, or instructions for transmitting an indication of the limit to the UE based on determining the limit.

Some examples of the method, apparatuses, and non-transitory computer-readable medium described herein may further include operations, features, means, or instructions for determining the shared search space monitoring configuration based on the limit, where the shared search space monitoring configuration may be consistent with the limit, and transmitting an indication of the shared search space monitoring configuration to the UE.

Some examples of the method, apparatuses, and non-transitory computer-readable medium described herein may further include operations, features, means, or instructions for determining the shared search space monitoring configuration based on the limit, where the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both, and transmitting an indication of the shared search space monitoring configuration to the UE.

Some examples of the method, apparatuses, and non-transitory computer-readable medium described herein may further include operations, features, means, or instructions for transmitting a second downlink control information message, where the second downlink control information message includes a second scheduling indication that a second data transmission may be scheduled with the secondary cell, and communicating with the UE via the second data transmission of the secondary cell in accordance with the second downlink control information message.

Some examples of the method, apparatuses, and non-transitory computer-readable medium described herein may further include operations, features, means, or instructions for transmitting a third downlink control information message, where the third downlink control information message includes a third scheduling indication that a third data transmission may be scheduled with the primary cell, and communicating with the UE via the third data transmission of the primary cell in accordance with the third downlink control information message.

In some examples of the method, apparatuses, and non-transitory computer-readable medium described herein, the shared search space monitoring configuration includes control channel candidates associated with the one or more downlink control information messages that include the cross-carrier scheduling indication, and the control channel candidates associated with the one or more downlink control information messages may be not included in UE-specific search spaces not associated with the cross-carrier scheduling indication.

In some examples of the method, apparatuses, and non-transitory computer-readable medium described herein, the shared search space monitoring configuration includes control channel candidates associated with the one or more downlink control information messages that include the cross-carrier scheduling indication, and one or more of the control channel candidates associated with the one or more downlink control information messages may be included in a second UE-specific search space not associated with the cross-carrier scheduling indication.

Some examples of the method, apparatuses, and non-transitory computer-readable medium described herein may further include operations, features, means, or instructions for receiving an indication of a capability of the UE to support shared search space control channel candidates in UE-specific search spaces not associated with the cross-carrier scheduling indication, where the shared search space monitoring configuration may be based on receiving the indication.

In some examples of the method, apparatuses, and non-transitory computer-readable medium described herein, the common search space of the primary cell includes a type0 common search space of the primary cell, a type0A common search space of the primary cell, a type1 common search space of the primary cell, a type2 common search space of the primary cell, a type3 common search space of the primary cell, or any combination thereof.

In some examples of the method, apparatuses, and non-transitory computer-readable medium described herein, communicating with the UE via the data transmission of the primary cell may include operations, features, means, or instructions for transmitting a downlink data transmission to the UE, receiving an uplink data transmission from the UE, or both.

A method of wireless communications at a UE is described. The method may include identifying that the UE is in communication with a primary cell and a secondary cell in a carrier aggregation configuration, where the primary cell is a cross-carrier scheduled cell and the secondary cell is a cross-carrier scheduling cell, receiving, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell, receiving, from the secondary cell, a second downlink control information message that includes a cross-carrier scheduling indication that a second data transmission is scheduled with the primary cell in accordance with the scheduling configuration, and communicating with the primary cell via the first data transmission in accordance with the first downlink control information message, and via the second data transmission in accordance with the second downlink control information message.

An apparatus for wireless communications at a UE is described. The apparatus may include a processor, memory coupled with the processor, and instructions stored in the memory. The instructions may be executable by the processor to cause the apparatus to identify that the UE is in communication with a primary cell and a secondary cell in a carrier aggregation configuration, where the primary cell is a cross-carrier scheduled cell and the secondary cell is a cross-carrier scheduling cell, receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell, receive, from the secondary cell, a second downlink control information message that includes a cross-carrier scheduling indication that a second data transmission is scheduled with the primary cell in accordance with the scheduling configuration, and communicate with the primary cell via the first data transmission in accordance with the first downlink control information message, and via the second data transmission in accordance with the second downlink control information message.

Another apparatus for wireless communications at a UE is described. The apparatus may include means for identifying that the UE is in communication with a primary cell and a secondary cell in a carrier aggregation configuration, where the primary cell is a cross-carrier scheduled cell and the secondary cell is a cross-carrier scheduling cell, receiving, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell, receiving, from the secondary cell, a second downlink control information message that includes a cross-carrier scheduling indication that a second data transmission is scheduled with the primary cell in accordance with the scheduling configuration, and communicating with the primary cell via the first data transmission in accordance with the first downlink control information message, and via the second data transmission in accordance with the second downlink control information message.

A non-transitory computer-readable medium storing code for wireless communications at a UE is described. The code may include instructions executable by a processor to identify that the UE is in communication with a primary cell and a secondary cell in a carrier aggregation configuration, where the primary cell is a cross-carrier scheduled cell and the secondary cell is a cross-carrier scheduling cell, receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell, receive, from the secondary cell, a second downlink control information message that includes a cross-carrier scheduling indication that a second data transmission is scheduled with the primary cell in accordance with the scheduling configuration, and communicate with the primary cell via the first data transmission in accordance with the first downlink control information message, and via the second data transmission in accordance with the second downlink control information message.

Some examples of the method, apparatuses, and non-transitory computer-readable medium described herein may further include operations, features, means, or instructions for monitoring a common search space of the primary cell and one or more UE-specific search spaces of the secondary cell for control information in accordance with a shared search space monitoring configuration, where the first downlink control information message and the second downlink control information message may be received as a result of the monitoring, and where the scheduling configuration may be based on the shared search space monitoring configuration.

In some examples of the method, apparatuses, and non-transitory computer-readable medium described herein, the first data transmission may be communicated in a first duration in accordance with the scheduling configuration, and the second data transmission may be communicated in a second duration that does not overlap with the first duration based on one or more scheduling constraints of the set of scheduling constraints.

In some examples of the method, apparatuses, and non-transitory computer-readable medium described herein, the first data transmission may be communicated in a first slot in accordance with the scheduling configuration, and the second data transmission may be communicated in a second slot different from the first slot based on one or more scheduling constraints of the set of scheduling constraints.

In some examples of the method, apparatuses, and non-transitory computer-readable medium described herein, the first downlink control information message may be received before the second downlink control information message in accordance with the scheduling configuration, and the first data transmission may be communicated before the second data transmission based on one or more scheduling constraints of the set of scheduling constraints.

In some examples of the method, apparatuses, and non-transitory computer-readable medium described herein, the first downlink control information message may be received after the second downlink control information message in accordance with the scheduling configuration, and the first data transmission may be communicated after the second data transmission based on one or more scheduling constraints of the set of scheduling constraints.

In some examples of the method, apparatuses, and non-transitory computer-readable medium described herein, the first downlink control information message may be received in a first duration in accordance with the scheduling configuration, and the second downlink control information message may be received in a second duration that does not overlap with the first duration based on one or more scheduling constraints of the set of scheduling constraints.

In some examples of the method, apparatuses, and non-transitory computer-readable medium described herein, the first downlink control information message may be received in a first monitoring occasion in accordance with the scheduling configuration, and the second downlink control information message may be received in a second monitoring occasion different from the first monitoring occasion based on one or more scheduling constraints of the set of scheduling constraints.

In some examples of the method, apparatuses, and non-transitory computer-readable medium described herein, the first downlink control information message may be received in a first slot in accordance with the scheduling configuration, and the second downlink control information message may be received in a second slot different from the first slot based on one or more scheduling constraints of the set of scheduling constraints.

Some examples of the method, apparatuses, and non-transitory computer-readable medium described herein may further include operations, features, means, or instructions for transmitting a first feedback message to the primary cell based on communicating with the primary cell via the first data transmission, and transmitting a second feedback message to the primary cell based on communicating with the primary cell via the second data transmission.

In some examples of the method, apparatuses, and non-transitory computer-readable medium described herein, the first feedback message may be included in a first uplink transmission in accordance with the scheduling configuration, and the second feedback message may be included in a second uplink transmission different from the first uplink transmission based on one or more scheduling constraints of the set of scheduling constraints.

In some examples of the method, apparatuses, and non-transitory computer-readable medium described herein, the first data transmission may be communicated before the second data transmission in accordance with the scheduling configuration, and the first feedback message may be transmitted before the second feedback message based on one or more scheduling constraints of the set of scheduling constraints.

In some examples of the method, apparatuses, and non-transitory computer-readable medium described herein, the first data transmission may be communicated after the second data transmission in accordance with the scheduling configuration, and the first feedback message may be transmitted after the second feedback message based on one or more scheduling constraints of the set of scheduling constraints.

Some examples of the method, apparatuses, and non-transitory computer-readable medium described herein may further include operations, features, means, or instructions for receiving, from the primary cell, a third downlink control information message that includes a second scheduling indication that a retransmission of the first data transmission may be scheduled with the primary cell in accordance with the scheduling configuration, and communicating with the primary cell via the retransmission of the first data transmission in accordance with the third downlink control information message.

Some examples of the method, apparatuses, and non-transitory computer-readable medium described herein may further include operations, features, means, or instructions for receiving, from the secondary cell, a fourth downlink control information message that includes a second cross-carrier scheduling indication that a retransmission of the second data transmission may be scheduled with the primary cell in accordance with the scheduling configuration, and communicating with the primary cell via the retransmission of the second data transmission in accordance with the fourth downlink control information message.

In some examples of the method, apparatuses, and non-transitory computer-readable medium described herein, the first feedback message includes a hybrid automatic repeat request acknowledgment message or a hybrid automatic repeat request negative acknowledgment message, and the second feedback message includes a hybrid automatic repeat request acknowledgment message or a hybrid automatic repeat request negative acknowledgment message.

In some examples of the method, apparatuses, and non-transitory computer-readable medium described herein, communicating with the primary cell via a data transmission may include operations, features, means, or instructions for receiving a downlink data transmission from the primary cell, transmitting an uplink data transmission to the primary cell, or both.

A method of wireless communications at a base station is described. The method may include configuring a UE to communicate with a primary cell and a secondary cell in a carrier aggregation configuration, where the primary cell is a cross-carrier scheduled cell and the secondary cell is a cross-carrier scheduling cell, transmitting a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell, transmitting a second downlink control information message via the secondary cell that includes a cross-carrier scheduling indication that a second data transmission is scheduled with the primary cell in accordance with the scheduling configuration, and communicating with the UE via the first data transmission of the primary cell in accordance with the first downlink control information message, and via the second data transmission of the primary cell in accordance with the second downlink control information message.

An apparatus for wireless communications at a base station is described. The apparatus may include a processor, memory coupled with the processor, and instructions stored in the memory. The instructions may be executable by the processor to cause the apparatus to configure a UE to communicate with a primary cell and a secondary cell in a carrier aggregation configuration, where the primary cell is a cross-carrier scheduled cell and the secondary cell is a cross-carrier scheduling cell, transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell, transmit a second downlink control information message via the secondary cell that includes a cross-carrier scheduling indication that a second data transmission is scheduled with the primary cell in accordance with the scheduling configuration, and communicate with the UE via the first data transmission of the primary cell in accordance with the first downlink control information message, and via the second data transmission of the primary cell in accordance with the second downlink control information message.

Another apparatus for wireless communications at a base station is described. The apparatus may include means for configuring a UE to communicate with a primary cell and a secondary cell in a carrier aggregation configuration, where the primary cell is a cross-carrier scheduled cell and the secondary cell is a cross-carrier scheduling cell, transmitting a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell, transmitting a second downlink control information message via the secondary cell that includes a cross-carrier scheduling indication that a second data transmission is scheduled with the primary cell in accordance with the scheduling configuration, and communicating with the UE via the first data transmission of the primary cell in accordance with the first downlink control information message, and via the second data transmission of the primary cell in accordance with the second downlink control information message.

A non-transitory computer-readable medium storing code for wireless communications at a base station is described. The code may include instructions executable by a processor to configure a UE to communicate with a primary cell and a secondary cell in a carrier aggregation configuration, where the primary cell is a cross-carrier scheduled cell and the secondary cell is a cross-carrier scheduling cell, transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell, transmit a second downlink control information message via the secondary cell that includes a cross-carrier scheduling indication that a second data transmission is scheduled with the primary cell in accordance with the scheduling configuration, and communicate with the UE via the first data transmission of the primary cell in accordance with the first downlink control information message, and via the second data transmission of the primary cell in accordance with the second downlink control information message.

Some examples of the method, apparatuses, and non-transitory computer-readable medium described herein may further include operations, features, means, or instructions for configuring a common search space of the primary cell and one or more UE-specific search spaces of the secondary cell for transmitting control information in accordance with a shared search space monitoring configuration, where the first downlink control information message and the second downlink control information message may be transmitted based on the determining, and where the scheduling configuration may be based on the shared search space monitoring configuration.

In some examples of the method, apparatuses, and non-transitory computer-readable medium described herein, the first data transmission may be communicated in a first duration in accordance with the scheduling configuration, and the second data transmission may be communicated in a second duration that does not overlap with the first duration based on one or more scheduling constraints of the set of scheduling constraints.

In some examples of the method, apparatuses, and non-transitory computer-readable medium described herein, the first data transmission may be communicated in a first slot in accordance with the scheduling configuration, and the second data transmission may be communicated in a second slot different from the first slot based on one or more scheduling constraints of the set of scheduling constraints.

In some examples of the method, apparatuses, and non-transitory computer-readable medium described herein, the first downlink control information message may be received before the second downlink control information message in accordance with the scheduling configuration, and the first data transmission may be communicated before the second data transmission based on one or more scheduling constraints of the set of scheduling constraints.

In some examples of the method, apparatuses, and non-transitory computer-readable medium described herein, the first downlink control information message may be transmitted after the second downlink control information message in accordance with the scheduling configuration, and the first data transmission may be communicated after the second data transmission based on one or more scheduling constraints of the set of scheduling constraints.

In some examples of the method, apparatuses, and non-transitory computer-readable medium described herein, the first downlink control information message may be transmitted in a first duration in accordance with the scheduling configuration, and the second downlink control information message may be received in a second duration that does not overlap with the first duration based on one or more scheduling constraints of the set of scheduling constraints.

In some examples of the method, apparatuses, and non-transitory computer-readable medium described herein, the first downlink control information message may be transmitted in a first monitoring occasion in accordance with the scheduling configuration, and the second downlink control information message may be transmitted in a second monitoring occasion different from the first monitoring occasion based on one or more scheduling constraints of the set of scheduling constraints.

In some examples of the method, apparatuses, and non-transitory computer-readable medium described herein, the first downlink control information message may be transmitted in a first slot in accordance with the scheduling configuration, and the second downlink control information message may be transmitted in a second slot different from the first slot based on one or more scheduling constraints of the set of scheduling constraints.

Some examples of the method, apparatuses, and non-transitory computer-readable medium described herein may further include operations, features, means, or instructions for receiving a first feedback message from the UE based on communicating with the UE via the first data transmission of the primary cell, and receiving a second feedback message from the UE based on communicating with the UE via the first data transmission of the primary cell.

In some examples of the method, apparatuses, and non-transitory computer-readable medium described herein, the first feedback message may be included in a first uplink transmission in accordance with the scheduling configuration, and the second feedback message may be included in a second uplink transmission different from the first uplink transmission based on one or more scheduling constraints of the set of scheduling constraints.

In some examples of the method, apparatuses, and non-transitory computer-readable medium described herein, the first data transmission may be communicated before the second data transmission in accordance with the scheduling configuration, and the first feedback message may be received before the second feedback message based on one or more scheduling constraints of the set of scheduling constraints.

In some examples of the method, apparatuses, and non-transitory computer-readable medium described herein, the first data transmission may be communicated after the second data transmission in accordance with the scheduling configuration, and the first feedback message may be received after the second feedback message based on one or more scheduling constraints of the set of scheduling constraints.

Some examples of the method, apparatuses, and non-transitory computer-readable medium described herein may further include operations, features, means, or instructions for transmitting a third downlink control information message via the primary cell that includes a second scheduling indication that a retransmission of the first data transmission may be scheduled with the primary cell in accordance with the scheduling configuration, and communicating with the UE via the retransmission of the first data transmission of the primary cell in accordance with the third downlink control information message.

Some examples of the method, apparatuses, and non-transitory computer-readable medium described herein may further include operations, features, means, or instructions for transmitting a fourth downlink control information message via the secondary cell that includes a second cross-carrier scheduling indication that a retransmission of the second data transmission may be scheduled with the primary cell in accordance with the scheduling configuration, and communicating with the UE via the retransmission of the second data transmission of the primary cell in accordance with the fourth downlink control information message.

In some examples of the method, apparatuses, and non-transitory computer-readable medium described herein, the first feedback message includes a hybrid automatic repeat request acknowledgment message or a hybrid automatic repeat request negative acknowledgment message, and the second feedback message includes a hybrid automatic repeat request acknowledgment message or a hybrid automatic repeat request negative acknowledgment message.

In some examples of the method, apparatuses, and non-transitory computer-readable medium described herein, communicating with the UE via a data transmission of the primary cell may include operations, features, means, or instructions for transmitting a downlink data transmission to the UE, receiving an uplink data transmission from the UE, or both.

BRIEF DESCRIPTION OF THE DRAWINGS

FIGS. 5A and 5B illustrate examples of timing diagrams that support techniques for cross-carrier scheduling from a secondary cell to a primary cell in accordance with aspects of the present disclosure.

FIGS. 6A and 6B illustrate examples of timing diagrams that support techniques for cross-carrier scheduling from a secondary cell to a primary cell in accordance with aspects of the present disclosure.

DETAILED DESCRIPTION

Figure 1:
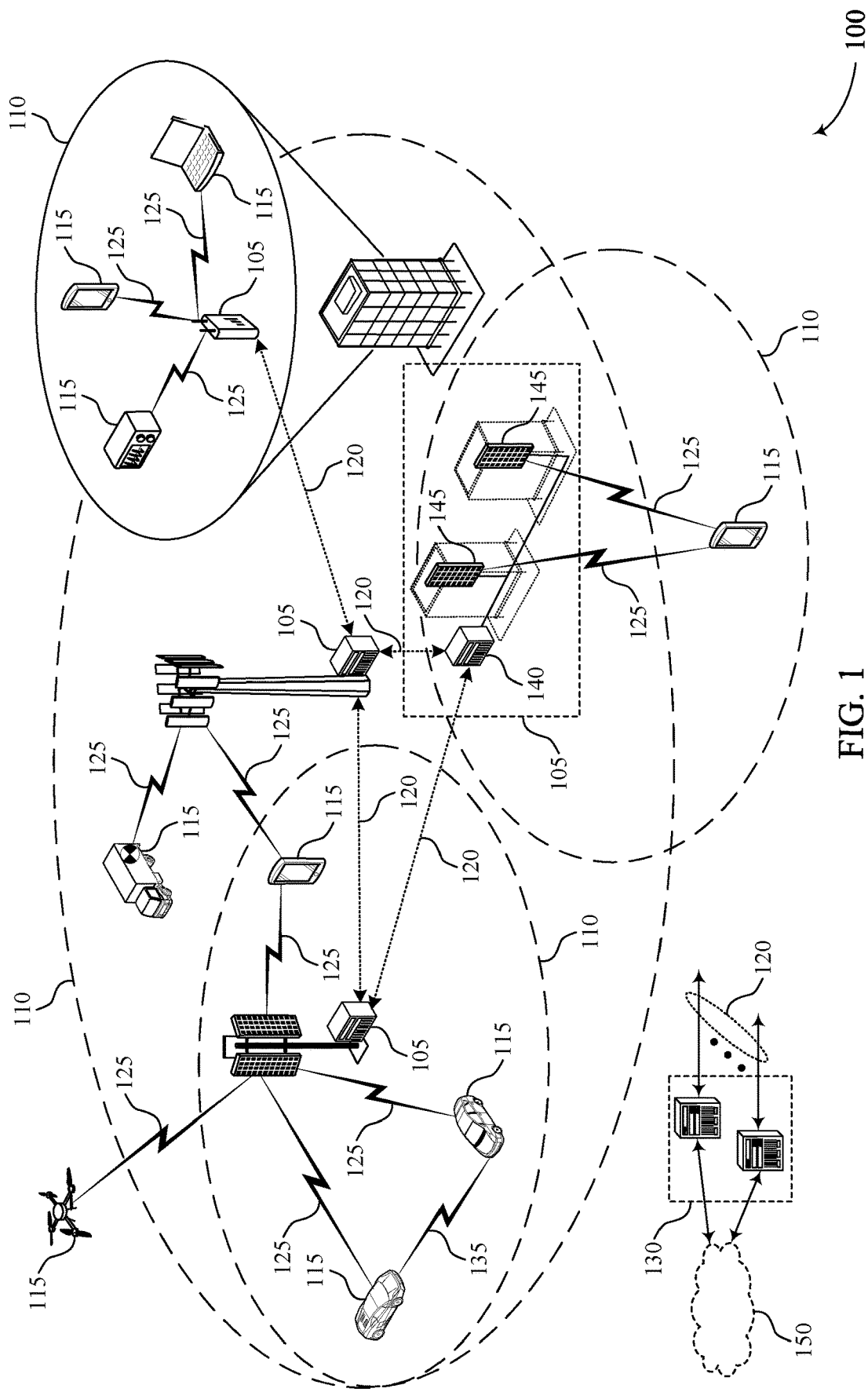
FIGS. 1 and 2 illustrate examples of a wireless communications system that supports techniques for cross-carrier scheduling from a secondary cell to a primary cell in accordance with aspects of the present disclosure.

A user equipment (UE) in a wireless communications system may communicate with multiple serving cells (e.g., associated with one or more base stations) in a carrier aggregation (CA) configuration to increase available bandwidth and data rates for the UE. Each serving cell may communicate with the UE on a respective component carrier (CC) in a respective frequency band. Each serving cell may be associated with a radio access technology (RAT) (e.g., a fourth generation (4G) system such as a Long Term Evolution (LTE) system, a fifth generation (5G) system which may be referred to as a New Radio (NR) system, etc.). For example, a UE may communicate with two serving cells in a dual connectivity scheme, where each serving cell may belong to a different RAT or a different cell group within a RAT.

Each serving cell may belong to one or more cell groups, such as a master cell group (MCG), a secondary cell group (SCG), etc. A UE may use radio resources associated with a master node (MN) for communicating with serving cells in an MCG. Similarly, a UE may use radio resources associated with a secondary node (SN) for communicating with serving cells in an SCG. An MCG may include a primary cell (PCell) and one or more secondary cells (SCells). Similarly, an SCG may include a primary secondary cell (PSCell) and one or more SCells. As used herein, a PCell may refer to a PCell of an MCG or a PSCell of an SCG. A UE may establish a connection with the PCell of an MCG (or with the PSCell of an SCG), and then establish connections with SCells to increase radio resources for communicating with a cell group.

In some examples, a UE may receive control information from one cell scheduling a UE to communicate via a data transmission with another cell (i.e., a different cell than the scheduling cell). This scheduling may be referred to as cross-carrier scheduling. For example, a UE may receive a physical downlink control channel (PDCCH) transmission from an SCell scheduling the UE to communicate a data transmission (e.g., a physical downlink shared channel (PDSCH) transmission, a physical uplink shared channel (PUSCH) transmission, etc.) with a PCell (or a PSCell). The PDCCH transmission may include a downlink control information (DCI) message scheduling the data transmission. In some examples, the DCI message may include a carrier indicator field (CIF) indicating cross-carrier scheduling of the PCell. In some examples, the PDCCH transmission may schedule the UE to communicate a second data transmission with the SCell (i.e., the scheduling cell) in addition to scheduling the data transmission with the PCell.

Cells may transmit control information in a control region such as a control resource set (CORESET) of a system bandwidth (e.g., to limit the bandwidth over which a UE monitors for control information). For example, a CORESET may include one or more search spaces (e.g., a common search space (CSS) and/or a UE-specific search space (USS)) for the transmission of common and UE-specific control information, respectively. A UE may monitor decoding candidates (e.g., PDCCH candidates) of a CSS for control information intended for multiple UEs as well as decoding candidates of a USS for control information designated for the UE.

In some examples, a UE may be configured to monitor PDCCH candidates of search spaces on an SCell (e.g., a scheduling cell) for cross-carrier scheduling indications associated with transmissions on a PCell (e.g., a scheduled cell). In some examples, the UE may fail to monitor PDCCH candidates of search spaces on the PCell because the UE may expect to receive control information from the SCell. As a result, the UE may miss control information associated with operations configured by the PCell, such as connectivity or mobility functionalities (e.g., fallback operations, PDCCH ordering configurations, beam failure recovery operations, semi-persistent scheduling or configured grant scheduling activation or deactivation, etc.). Missing control information on the PCell may accordingly result in reduced efficiency or reduced reliability in wireless communications at the UE.

According to the techniques described herein, a UE may be configured to monitor search spaces on a PCell and an SCell for control information according to a shared search space monitoring configuration. The UE may monitor PDCCH candidates of one or more CSSs on the PCell and of one or more USSs on the SCell for DCI messages scheduling data transmissions with the PCell. In some examples, the SCell may configure which USSs the UE is to monitor based on a value (e.g., 0 or 1) in a CIF of a DCI message. In some examples, the UE may be configured to monitor a limited quantity of non-overlapping control channel elements (CCEs) of the search spaces to reduce monitoring complexity for the UE. Additionally or alternatively, the UE may be limited to attempting a configured quantity of blind decodes of PDCCH candidates. The limit may be on a per-CC basis. In some examples, the shared search space monitoring configuration may be based on the configured limit. For example, the UE may report a monitoring capability to the cells, and the SCell may update the shared search space monitoring configuration based on the reported monitoring capability. The shared search space monitoring configuration may enable the UE to improve efficiency and reliability of communications with the cells without significantly increasing signaling overhead or monitoring complexity.

In some examples, the cross-carrier scheduled communications may be configured according to a scheduling configuration, which may include one or more scheduling constraints. The scheduling constraints may apply to the DCI messages, the scheduled data transmissions, feedback messages corresponding to the data transmissions, or any combination thereof. For example, data transmissions may be constrained such that they are not time-overlapped, are not scheduled in a same slot, or are not in a different order than the scheduling DCI messages. Similarly, the DCI messages may be constrained such that they are not time-overlapped, are not transmitted in a same monitoring occasion, or are not transmitted in a same slot. The feedback messages corresponding to the data transmissions may be constrained such that they are not transmitted in a same uplink transmission (e.g., a physical uplink control channel (PUCCH) transmission, a PUSCH transmission, etc.), are not in a different order than the corresponding data transmissions, or that a retransmission (e.g., based on a negative acknowledgement (NACK) feedback message) is scheduled by a DCI on the same cell as the original transmission. The scheduling constraints may enable the UE to improve communications efficiency and resource utilization, without significantly increasing communications complexity for the UE.

Aspects of the disclosure are initially described in the context of wireless communications systems. An example transmission scheme, example timing diagrams, and example process flows illustrating aspects of the discussed techniques are then described. Aspects of the disclosure are further illustrated by and described with reference to apparatus diagrams, system diagrams, and flowcharts that relate to techniques for cross-carrier scheduling from a secondary cell to a primary cell.

FIG. 1 illustrates an example of a wireless communications system 100 that supports techniques for cross-carrier scheduling from a secondary cell to a primary cell in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE may support the communication of signals according to one or more radio access technologies.

The UEs 115 may be dispersed throughout a coverage area 110 of the wireless communications system 100, and each UE may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE may include or may be referred to as a mobile device, a wireless device, a remote device, a handheld device, or a subscriber device, or some other suitable terminology, where the "device" may also be referred to as a unit, a station, a terminal, or a client, among other examples. A UE may also include or may be referred to as a personal electronic device such as a cellular phone, a personal digital assistant (PDA), a tablet computer, a laptop computer, or a personal computer. In some examples, a UE may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE using carrier aggregation or multi-carrier operation. A UE may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE to a base station 105, or downlink transmissions from a base station 105 to a UE. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE receives and the higher the order of the modulation scheme, the higher the data rate may be for the UE. A wireless communications resource may refer to a combination of a radio frequency spectrum resource, a time resource, and a spatial resource (e.g., spatial layers or beams), and the use of multiple spatial layers may further increase the data rate or data integrity for communications with a UE.

One or more numerologies for a carrier may be supported, where a numerology may include a subcarrier spacing ($\Delta f$) and a cyclic prefix. A carrier may be divided into one or more BWPs having the same or different numerologies. In some examples, a UE may be configured with multiple BWPs. In some examples, a single BWP for a carrier may be active at a given time and communications for the UE may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE transmits to every other UE in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE may be equipped with multiple antennas, which may be used to employ techniques such as transmit diversity, receive diversity, multiple-input multiple-output (MIMO) communications, or beamforming. The antennas of a base station 105 or a UE may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE. Likewise, a UE may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE may be configured to monitor search spaces on a PCell and an SCell (e.g., of one or more base stations 105) for control information according to a shared search space monitoring configuration. The UE may monitor PDCCH candidates of one or more CSSs on the PCell and of one or more USSs on the SCell for DCI messages scheduling data transmissions with the PCell. In some examples, the SCell may configure which USSs the UE is to monitor based on a value (e.g., 0 or 1) in a CIF of a DCI message. In some examples, the UE may be configured to monitor a limited quantity of non-overlapping CCEs of the search spaces to reduce monitoring complexity for the UE. Additionally or alternatively, the UE may be limited to attempting a configured quantity of blind decodes of PDCCH candidates. The limit may be on a per-CC basis. In some examples, the shared search space monitoring configuration may be based on the configured limit. For example, the UE may report a monitoring capability to the cells, and the SCell may update the shared search space monitoring configuration based on the reported monitoring capability. The shared search space monitoring configuration may enable the UE to improve efficiency and reliability of communications with the cells without significantly increasing signaling overhead or monitoring complexity.

In some examples, the cross-carrier scheduled communications may be configured according to a scheduling configuration, which may include one or more scheduling constraints. The scheduling constraints may apply to the DCI messages, the scheduled data transmissions, feedback messages corresponding to the data transmissions, or any combination thereof. For example, data transmissions may be constrained such that they are not time-overlapped, are not scheduled in a same slot, or are not in a different order than the scheduling DCI messages. Similarly, the DCI messages may be constrained such that they are not time-overlapped, are not transmitted in a same monitoring occasion, or are not transmitted in a same slot. The feedback messages corresponding to the data transmissions may be constrained such that they are not transmitted in a same uplink transmission (e.g., a PUCCH transmission, a PUSCH transmission, etc.), are not in a different order than the corresponding data transmissions, or that a retransmission (e.g., based on a HARQ NACK feedback message) is scheduled by a DCI on the same cell as the original transmission. The scheduling constraints may enable the UE to improve communications efficiency and resource utilization, without significantly increasing communications complexity for the UE.

Figure 2:
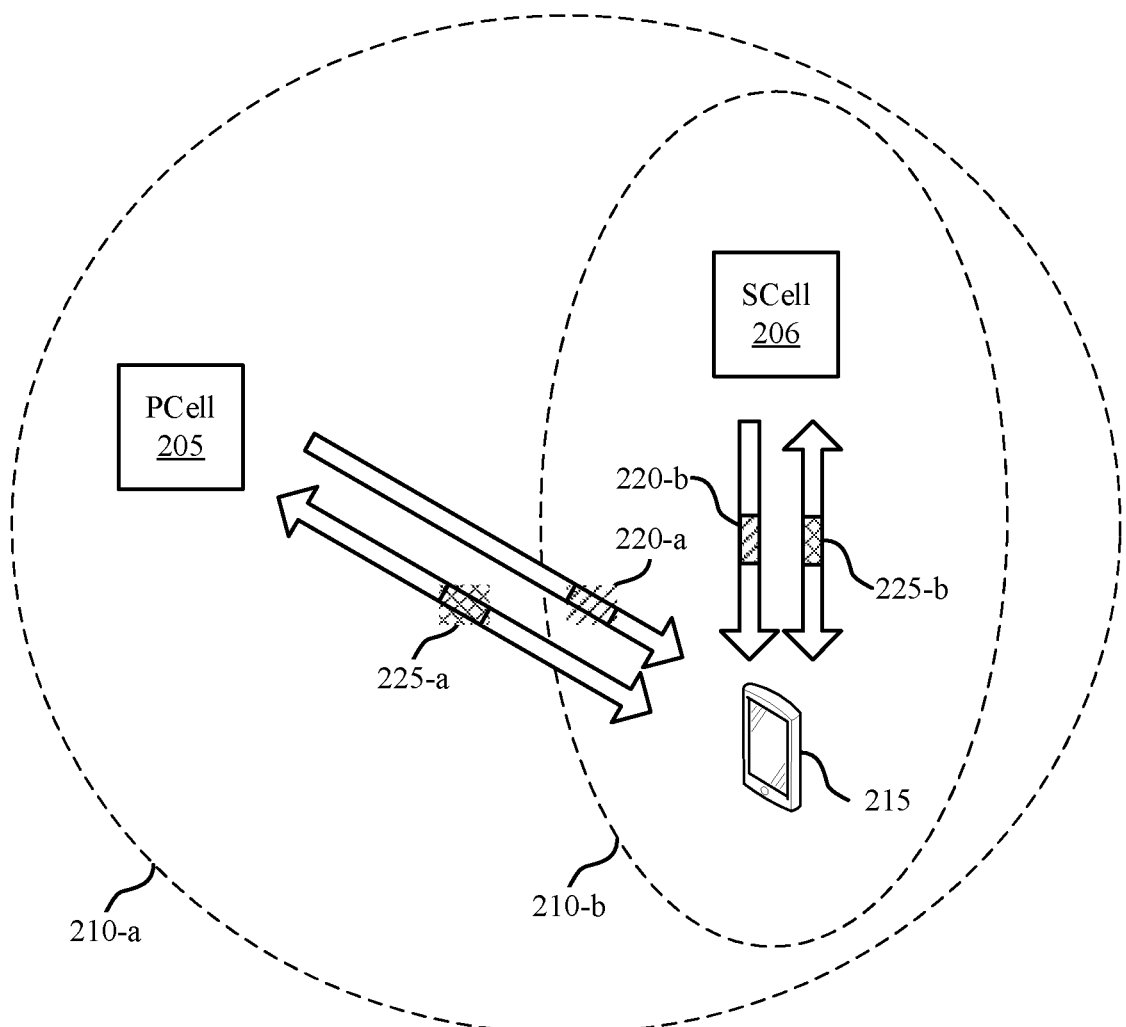

FIG. 2 illustrates an example of a wireless communications system 200 that supports techniques for cross-carrier scheduling from a secondary cell to a primary cell in accordance with aspects of the present disclosure. In some examples, the wireless communications system 200 may implement aspects of wireless communication system 100. For example, the wireless communications system 200 may include a UE 215, which may be an example of the corresponding device described with reference to FIG. 1. The wireless communications system 200 may also include a PCell 205 and an SCell 206, where the PCell 205 and the SCell 206 may be associated with one or more base stations 105 described with reference to FIG. 1. In some examples, the PCell 205 and the SCell 206 may be associated with a same base station 105. In other examples, the PCell 205 may be associated with a first base station 105 and the SCell 206 may be associated with a second base station 105. The PCell 205 and the SCell 206 may belong to an MCG. In some examples, the UE 215 may be in communication with the SCell 206 and a PSCell (not shown) of an SCG. The wireless communications system 200 may include features for improved cross-carrier scheduling in CA configurations, among other benefits.

In the wireless communications system 200, the PCell 205 may act as a serving cell for a geographic coverage area 210-a, and the SCell 206 may act as a serving cell for a geographic coverage area 210-b. The PCell 205 and the SCell 206 may configure and transmit DCI messages 220 to the UE 215. The UE 215 may communicate data transmissions 225 (e.g., PDSCH transmissions, PUSCH transmissions, etc.) with the PCell 205 or the SCell 206. As illustrated in FIG. 2, the UE 215 may communicate concurrently with the PCell 205 and the SCell 206, for example in a CA configuration. The UE 215 may monitor PDCCH candidates of one or more CSSs on the PCell 205 and of one or more USSs on the SCell 206 according to a shared search space monitoring configuration. Based on the shared search space monitoring configuration, the UE 215 may identify that the SCell 206 is a scheduling cell and the PCell 205 is a scheduled cell (e.g., cross-carrier scheduling).

Based on monitoring the PDCCH candidates, the UE 215 may receive a DCI message 220-b from the SCell 206 scheduling the UE 215 to communicate a data transmission 225-a with the PCell 205. In some examples, the DCI message 220-b may include a CIF indicating cross-carrier scheduling of the PCell 205. In some examples, a DCI message 220 (e.g., a DCI message 220-a from the PCell 205 or a DCI message 220-b from the SCell 206) may schedule the UE 215 to communicate additional data transmissions 225 (e.g., a data transmission 225-a, a data transmission 225-b, etc.) with the PCell 205 or the SCell 206. In some examples, the DCI message 220-b may schedule both the data transmission 225-a and the data transmission 225-b (e.g., joint scheduling).

In some examples, the SCell 206 may configure which USSs the UE 215 is to monitor based on a value (e.g., 0 or 1) in a CIF of the DCI message 220-b. The UE 215 may be configured to monitor a limited quantity of non-overlapping CCEs of the search spaces to reduce monitoring complexity for the UE 215. Additionally or alternatively, the UE 215 may be limited to attempting a configured quantity of blind decodes of PDCCH candidates. The limit may be on a per-CC basis. In some examples, the shared search space monitoring configuration may be based on the configured limit. In some examples, the SCell 206 may transmit to the UE 215 a shared search space monitoring configuration that configures the UE to perform a quantity of blind decodes or monitor a quantity of CCEs that exceeds the limit. In such examples, the UE 215 may determine to not monitor one or more USSs in the SCell 206, which may reduce monitoring complexity. In some examples, the UE 215 may report a monitoring capability to the PCell 205 and the SCell 206, and the SCell 206 may update the shared search space monitoring configuration based on the reported monitoring capability of the UE 215. The shared search space monitoring configuration may enable the UE 215 to improve efficiency and reliability of communications with the PCell 205 and the SCell 206 without significantly increasing signaling overhead or monitoring complexity.

Figure 3:
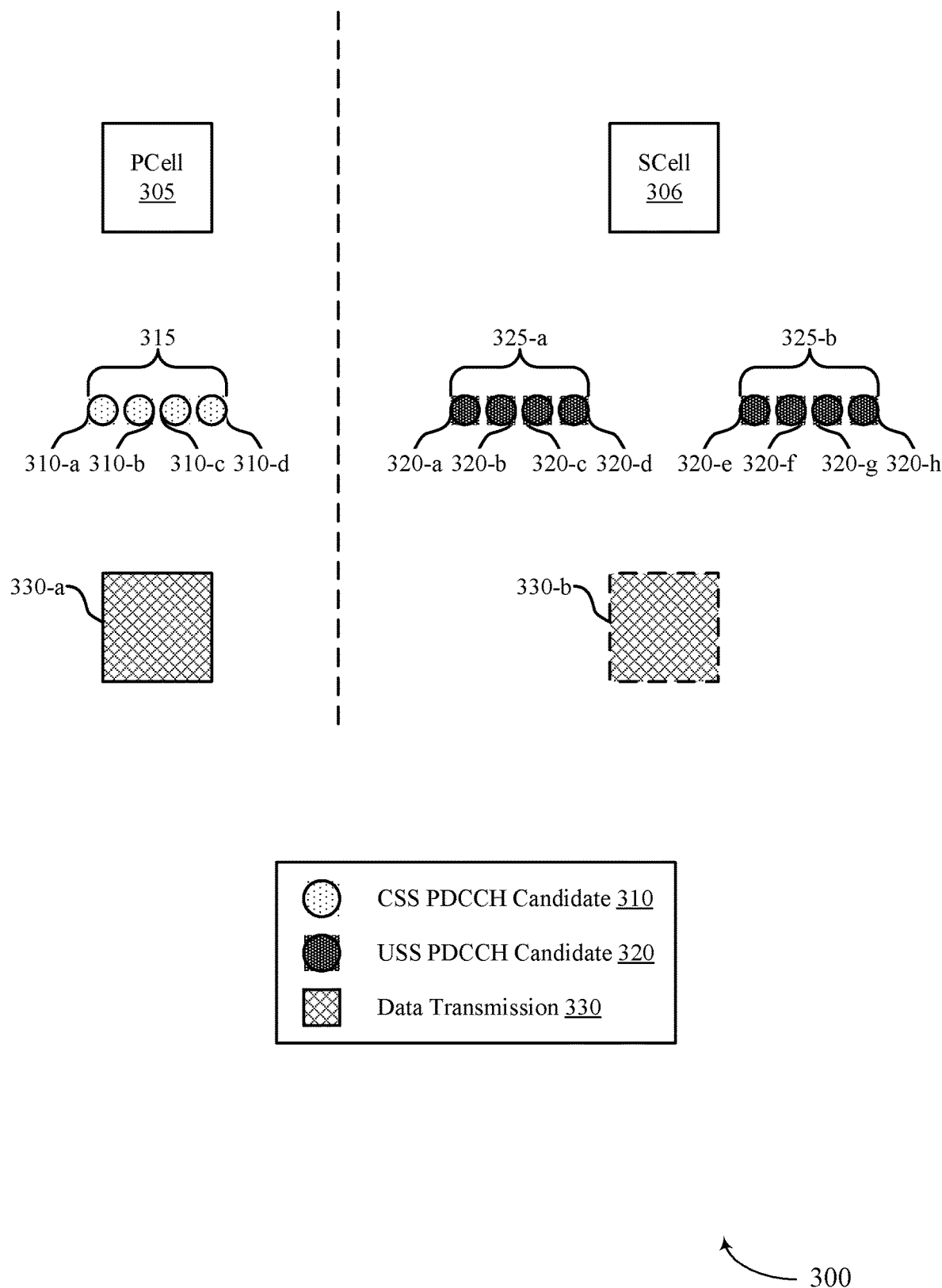
FIG. 3 illustrates an example of a transmission scheme that supports techniques for cross-carrier scheduling from a secondary cell to a primary cell in accordance with aspects of the present disclosure.

FIG. 3 illustrates an example of a transmission scheme 300 that supports techniques for cross-carrier scheduling from a secondary cell to a primary cell in accordance with aspects of the present disclosure. In some examples, the transmission scheme 300 may implement aspects of wireless communication systems 100 and 200. For example, the transmission scheme 300 may be associated with communications between a PCell 305, an SCell 306, and a UE, which may be examples of corresponding devices described with reference to FIGS. 1 and 2. The PCell 305 and the SCell 306 may belong to an MCG. In some examples, the UE may be in communication with the SCell 306 and a PSCell (not shown) of an SCG. The transmission scheme 300 may illustrate features for improved cross-carrier scheduling in CA configurations, among other benefits.

A UE may communicate concurrently with the PCell 305 and the SCell 306, for example in a CA configuration. The UE may monitor CSS PDCCH candidates 310 of one or more CSSs on the PCell 305 and USS PDCCH candidates 320 of one or more USSs on the SCell 306 according to a shared search space monitoring configuration. Based on the shared search space monitoring configuration, the UE may identify that the SCell 306 is a scheduling cell and the PCell 305 is a scheduled cell (e.g., cross-carrier scheduling).

As illustrated in FIG. 3, the CSS PDCCH candidates 310 may be included in a group 315, and the USS PDCCH candidates 320 may be included in groups 325. The group 315 may include CSS PDCCH candidates 310 of one or more CSSs, and each group 325 may include USS PDCCH candidates 320 of one or more USSs. Although the group 315 illustrated in FIG. 3 includes CSS PDCCH candidates 310-a through 310-d, the group 315 may in some examples include more or less than four CSS PDCCH candidates 310 based on a configuration of the PCell 305. Similarly, although the group 325-a includes USS PDCCH candidates 320-a through 320-d and the group 325-b includes USS PDCCH candidates 320-e through 320-h, each group 325 may in some examples include more or less than four USS PDCCH candidates 320 based on a configuration of the SCell 306. The CSSs on the PCell 305 may include type0-CSSs, type0A-CSSs, type1-CSSs, type2-CSSs, or type3-CSSs, or any combination thereof. Each type of CSS may include different types of signaling (e.g., a system information block (SIB), random access channel (RACH) procedure messages, paging messages, etc.) which the UE may monitor for on the PCell 305 to enable connectivity or mobility functionalities.

In some examples, the UE may be configured with a shared search space monitoring configuration. Based on the shared search space monitoring configuration, a data transmission 330-a (e.g., a PDSCH transmission from the PCell 305, a PUSCH transmission to the PCell 305, etc.) on the PCell 305 may be scheduled by a DCI message in a CSS PDCCH candidate 310 on the PCell 305, or by a DCI message in a USS PDCCH candidate 320 on the SCell 306, or both. The shared search space monitoring configuration may enable transmission diversity, where a network may schedule the data transmission 330-a using the PCell 305 or the SCell 306 based on network conditions. The shared search space monitoring configuration may also increase a quantity of PDCCH candidates (e.g., CSS PDCCH candidates 310 or USS PDCCH candidates 320) the UE monitors to receive control information, which may lead to an increase in monitoring or decoding complexity for the UE.

The UE may be configured to monitor a limited quantity of non-overlapping CCEs of the search spaces to reduce monitoring complexity for the UE. Additionally or alternatively, the UE may be limited to attempting a configured quantity of blind decodes of PDCCH candidates. The limit may be on a per-CC basis. In some examples, the shared search space monitoring configuration may be based on the configured limit. In some examples, the SCell 306 may transmit to the UE a shared search space monitoring configuration that configures the UE to perform a quantity of blind decodes or monitor a quantity of CCEs that exceeds the limit. In such examples, the UE may determine to not monitor one or more USSs in the SCell 306, which may reduce monitoring complexity. In some examples, the UE may report a monitoring capability to the PCell 305 and the SCell 306, and the SCell 306 may update the shared search space monitoring configuration based on the reported monitoring capability of the UE.

In some examples, the shared search space monitoring configuration may indicate which USSs the UE is to monitor based on a value (e.g., 0 or 1) in a CIF of a DCI message received in a USS PDCCH candidate 320. Each group 325 may correspond to a value in the CIF. For example, the group 325-a may include USS PDCCH candidates 320 of USSs the UE is to monitor when the value in the CIF is 0, and the group 325-b may include USS PDCCH candidates 320 of USSs the UE is to monitor when the value in the CIF is 1.

In a first example of the shared search space monitoring configuration, a first value (e.g., 0) in the CIF may indicate that the USS PDCCH candidates 320 corresponding to the first value in the CIF (e.g., the group 325-a) are configured to transmit cross-carrier scheduling indications (e.g., DCI messages scheduling the data transmission 330-a). A second value (e.g., 1) in the CIF may indicate that the USS PDCCH candidates 320 corresponding to the second value in the CIF (e.g., the group 325-b) are not configured to transmit cross-carrier scheduling indications, and may not be used to transmit DCI messages scheduling the data transmission 330-a. Accordingly, based on the shared search space monitoring configuration of the first example, the UE may monitor USS PDCCH candidates 320 of the group 325-a for DCI messages scheduling the data transmission 330-a, but skip monitoring USS PDCCH candidates 320 of the group 325-b.

In a second example of the shared search space monitoring configuration, the UE may be configured to monitor the group 325-a and the group 325-b for DCI messages scheduling the data transmission 330-a. That is, based on the shared search space monitoring configuration of the second example, any or all of the USS PDCCH candidates 320-a through 320-h may include DCI messages scheduling the data transmission 330-a, and the UE may monitor all of the USS PDCCH candidates 320 for the DCI messages. In some cases, the number of USS PDCCH candidates 320 may be limited based on the limit determined by the UE, which may be reported in the monitoring capability.

In a third example, a UE may be configured to support the shared search space monitoring configuration of the first example or the second example based on reporting a monitoring capability. For example, the UE may signal a searchSpaceSharingCA-DL parameter and/or a searchSpaceSharingCA-UL parameter in capability information signaling to indicate that the UE supports the shared search space monitoring configuration of the first example. Alternatively, the UE may signal a searchSpaceSharingCA-DL-toPCell parameter and/or a searchSpaceSharingCA-UL-toPCell parameter in capability information signaling to indicate that the UE supports the shared search space monitoring configuration of the second example. Based on the capability information signaling from the UE, the SCell 306 may transmit to the UE an update to the shared search space monitoring configuration.

In some examples, the UE may additionally monitor USS PDCCH candidates 320 of the groups 325 for DCI messages scheduling a data transmission 330-b. That is, based on the shared search space monitoring configuration, any or all of the USS PDCCH candidates 320-a through 320-h may include DCI messages scheduling the data transmission 330-a, the data transmission 330-b, or both.

The shared search space monitoring configuration may enable the UE to improve efficiency and reliability of communications with the PCell 305 and the SCell 306 without significantly increasing signaling overhead or monitoring complexity.

Figures 4A, 4B, 4C:
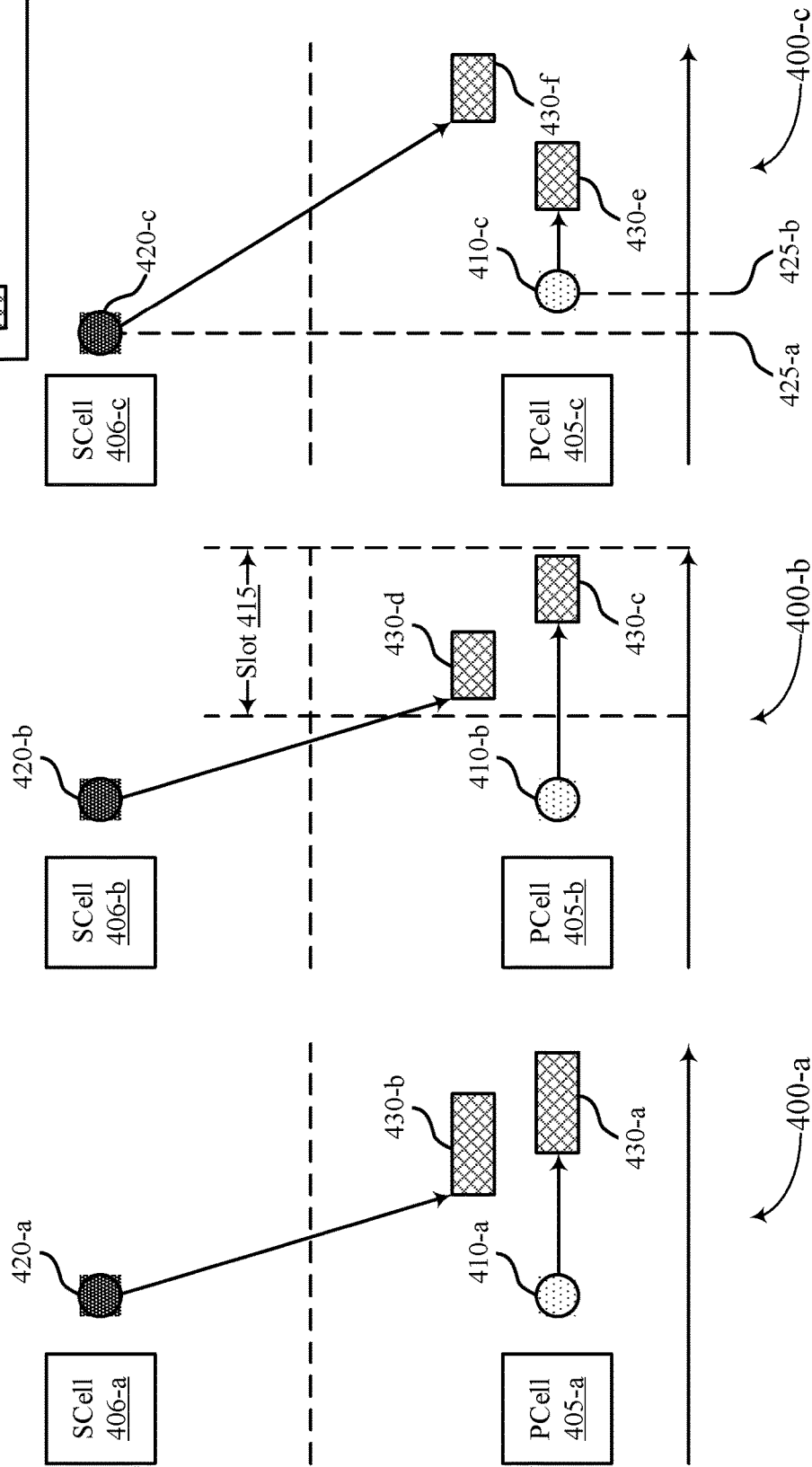
FIGS. 4A through 4C illustrate examples of timing diagrams that support techniques for cross-carrier scheduling from a secondary cell to a primary cell in accordance with aspects of the present disclosure.

FIGS. 4A through 4C illustrate examples of timing diagrams 400 that support techniques for cross-carrier scheduling from a secondary cell to a primary cell in accordance with aspects of the present disclosure. In some examples, the timing diagrams 400 may implement aspects of wireless communication systems 100 and 200. For example, the timing diagrams 400 may be associated with communications between PCells 405, SCells 406, and UEs, which may be examples of corresponding devices described with reference to FIGS. 1 and 2. The timing diagrams 400 may illustrate features for improved cross-carrier scheduling in CA configurations, among other benefits.

A UE may communicate concurrently with a PCell 405 and an SCell 406, for example in a CA configuration. The UE may monitor CSS PDCCH candidates 410 of one or more CSSs on the PCell 405 and USS PDCCH candidates 420 of one or more USSs on the SCell 406 according to a shared search space monitoring configuration. Based on the shared search space monitoring configuration, the UE may identify that the SCell 406 is a scheduling cell and the PCell 405 is a scheduled cell (e.g., cross-carrier scheduling). Based on monitoring the PDCCH candidates, the UE may receive one or more DCI messages scheduling one or more data transmissions 430 on the PCell 405.

In some examples, the cross-carrier scheduled communications on the PCell 405 may be configured according to a scheduling configuration, which may include one or more scheduling constraints applied to the data transmissions 430, the DCI messages, etc. The scheduling constraints may enable the UE to improve communications efficiency and resource utilization, without significantly increasing communications complexity for the UE.

FIG. 4A illustrates an example timing diagram 400-a. In the timing diagram 400-a, a first DCI message in a CSS PDCCH candidate 410-a on a PCell 405-a may schedule a data transmission 430-a on the PCell 405-a, and a second DCI message in a USS PDCCH candidate 420-a on an SCell 406-a may schedule a data transmission 430-b on the PCell 405-a. The data transmissions 430-a and 430-b may partially or completely overlap in time, which may increase communications complexity for the UE. For example, communicating the data transmission 430-*a* may include the UE using a first hardware configuration to transmit a PUSCH transmission to the PCell 405-*a* or receive a PDSCH transmission from the PCell 405-*a*, and communicating the data transmission 430-*b* may include the UE using a second hardware configuration different from the first hardware configuration. If the data transmissions 430-*a* and 430-*b* overlap in time, the UE may consume additional power using the first and second hardware configurations concurrently. In some examples, the UE may be unable to use the first and second hardware configurations concurrently, and the UE may fail to communicate one or both of the data transmissions 430-*a* and 430-*b*, which may reduce communications reliability and efficiency.

In some examples, the scheduling configuration for cross-carrier scheduled communications on the PCell 405-*a* may include a scheduling constraint that data transmissions 430 may not overlap in time, which may reduce communications complexity for the UE. That is, the UE may communicate the data transmission 430-*a* in a first duration according to the scheduling configuration, and the UE may communicate the data transmission 430-*b* in a second duration that does not overlap in time with the first duration based on the scheduling constraint.

FIG. 4B illustrates an example timing diagram 400-*b*. In the timing diagram 400-*b*, a first DCI message in a CSS PDCCH candidate 410-*b* on a PCell 405-*b* may schedule a data transmission 430-*c* on the PCell 405-*b*, and a second DCI message in a USS PDCCH candidate 420-*b* on an SCell 406-*b* may schedule a data transmission 430-*d* on the PCell 405-*b*. Based on the scheduling, the UE may communicate the data transmissions 430-*c* and 430-*d* in a slot 415, which may increase communications complexity for the UE. For example, communicating the data transmission 430-*c* may include the UE using a first hardware configuration to transmit a PUSCH transmission to the PCell 405-*b* or receive a PDSCH transmission from the PCell 405-*b*, and communicating the data transmission 430-*d* may include the UE using a second hardware configuration different from the first hardware configuration. If the data transmissions 430-*c* and 430-*d* are scheduled in the same slot 415, the UE may not have sufficient time to transition between the first and second hardware configurations, and the UE may fail to communicate one or both of the data transmissions 430-*c* and 430-*d*, which may reduce communications reliability and efficiency.

In some examples, the scheduling configuration for cross-carrier scheduled communications on the PCell 405-*b* may include a scheduling constraint that data transmissions 430 may not be scheduled in the same slot 415, which may reduce communications complexity for the UE. That is, the UE may communicate the data transmission 430-*c* in a first slot (e.g., the slot 415) according to the scheduling configuration, and the UE may communicate the data transmission 430-*d* in a second slot different from the first slot (e.g., a slot before or after the slot 415) based on the scheduling constraint.

FIG. 4C illustrates an example timing diagram 400-*c*. In the timing diagram 400-*c*, a first DCI message in a CSS PDCCH candidate 410-*c* on a PCell 405-*c* may schedule a data transmission 430-*e* on the PCell 405-*c*, and a second DCI message in a USS PDCCH candidate 420-*c* on an SCell 406-*c* may schedule a data transmission 430-*f* on the PCell 405-*c*. The SCell 406-*c* may transmit the USS PDCCH candidate 420-*c* at a time 425-*a*, and the PCell 405-*c* may transmit the CSS PDCCH candidate 410-*c* at a time 425-*b* after the time 425-*a*. The data transmissions 430-*e* may be scheduled before the data transmission 430-*f*. That is, the data transmissions 430-*e* and 430-*f* may be scheduled in a different order than the order in which the UE receives the scheduling DCI messages, which may increase communications complexity for the UE. For example, communicating the data transmission 430-*e* may include the UE using a first hardware configuration to transmit a PUSCH transmission to the PCell 405-*c* or receive a PDSCH transmission from the PCell 405-*c*, and communicating the data transmission 430-*f* may include the UE using a second hardware configuration different from the first hardware configuration.

If the data transmissions 430-*e* and 430-*f* are scheduled in a different order than the order in which the UE receives the scheduling DCI messages, the UE may consume additional power by performing unnecessary transitions between hardware configurations. For example, the UE may transition to the second hardware configuration upon receiving the second DCI message at the time 425-*a*. The UE may then transition to the first hardware configuration upon receiving the first DCI message at the time 425-*b* to communicate the data transmission 430-*e*, before transitioning back to the second hardware configuration to communicate the data transmission 430-*f*. In some examples, the UE may not have sufficient time to make additional transitions between the first and second hardware configurations, and the UE may fail to communicate one or both of the data transmissions 430-*e* and 430-*f*, which may reduce communications reliability and efficiency.

In some examples, the scheduling configuration for cross-carrier scheduled communications on the PCell 405-*c* may include a scheduling constraint that data transmissions 430 may not be scheduled in a different order than the order in which the UE receives the scheduling DCI messages, which may reduce communications complexity for the UE. That is, the UE may receive the first DCI message in the CSS PDCCH candidate 410-*c* after receiving the second DCI message in the USS PDCCH candidate 420-*c* according to the scheduling configuration, and the UE may be scheduled to communicate the data transmission 430-*e* after communicating the data transmission 430-*f* based on the scheduling constraint. Alternatively, the UE may receive the first DCI message in the CSS PDCCH candidate 410-*c* before receiving the second DCI message in the USS PDCCH candidate 420-*c* according to the scheduling configuration, and the UE may be scheduled to communicate the data transmission 430-*e* before communicating the data transmission 430-*f* based on the scheduling constraint.

FIGS. 5A and 5B illustrate examples of timing diagrams 500 that support techniques for cross-carrier scheduling from a secondary cell to a primary cell in accordance with aspects of the present disclosure. In some examples, the timing diagrams 500 may implement aspects of wireless communication systems 100 and 200. For example, the timing diagrams 500 may be associated with communications between PCells 505, SCells 506, and UEs, which may be examples of corresponding devices described with reference to FIGS. 1 and 2. The timing diagrams 500 may illustrate features for improved cross-carrier scheduling in CA configurations, among other benefits.

A UE may communicate concurrently with a PCell 505 and an SCell 506, for example in a CA configuration. The UE may monitor CSS PDCCH candidates 510 of one or more CSSs on the PCell 505 and USS PDCCH candidates 520 of one or more USSs on the SCell 506 according to a shared search space monitoring configuration. Based on the shared search space monitoring configuration, the UE may identify that the SCell 506 is a scheduling cell and the PCell 505 is a scheduled cell (e.g., cross-carrier scheduling). Based on monitoring the PDCCH candidates, the UE may receive one or more DCI messages scheduling one or more data transmissions 530 on the PCell 505.

In some examples, the cross-carrier scheduled communications on the PCell 505 may be configured according to a scheduling configuration, which may include one or more scheduling constraints applied to transmission of the DCI messages in the PDCCH candidates, the data transmissions 530, etc. The scheduling constraints may enable the UE to improve communications efficiency and resource utilization, without significantly increasing communications complexity for the UE.

FIG. 5A illustrates an example timing diagram 500-*a*. In the timing diagram 500-*a*, a first DCI message in a CSS PDCCH candidate 510-*a* on a PCell 505-*a* may schedule a data transmission 530-*a* on the PCell 505-*a*, and a second DCI message in a USS PDCCH candidate 520-*a* on an SCell 506-*a* may schedule a data transmission 530-*b* on the PCell 505-*a*. The CSS PDCCH candidate 510-*a* and the USS PDCCH candidate 520-*a* may partially or completely overlap in time, or the PDCCH candidates may be in a same monitoring occasion 525-*a*, which may increase monitoring complexity for the UE. For example, the UE may use a first hardware configuration to monitor the CSS PDCCH candidate 510-*a* and a second hardware configuration different from the first hardware configuration to monitor the USS PDCCH candidate 520-*a*. Additionally or alternatively, the UE may be limited in the number of blind decodes the UE may attempt across PDCCH candidates based on a shared search space monitoring configuration as described herein. If the CSS PDCCH candidate 510-*a* and the USS PDCCH candidate 520-*a* containing the DCI messages overlap in time, or are in the same monitoring occasion 525-*a*, the UE may miss one or both of the DCI messages. Based on missing the DCI messages, the UE may fail to communicate one or both of the data transmissions 530-*a* and 530-*b*, which may reduce communications reliability and efficiency.

In some examples, the scheduling configuration for cross-carrier scheduled communications on the PCell 505-*a* may include a scheduling constraint that PDCCH candidates scheduling data transmissions 530 may not overlap in time or be in a same monitoring occasion 525, which may reduce communications complexity for the UE. That is, the PCell 505-*a* may transmit the first DCI message in a CSS PDCCH candidate 510-*a* in a first duration according to the scheduling configuration, and the SCell 506-*a* may transmit the second DCI message in a USS PDCCH candidate 520-*a* in a second duration that does not overlap in time with the first duration or is not in the same monitoring occasion 525 as the first duration based on the scheduling constraint.

FIG. 5B illustrates an example timing diagram 500-*b*. In the timing diagram 500-*b*, a first DCI message in a CSS PDCCH candidate 510-*b* on a PCell 505-*b* may schedule a data transmission 530-*c* on the PCell 505-*b*, and a second DCI message in a USS PDCCH candidate 520-*b* on an SCell 506-*b* may schedule a data transmission 530-*d* on the PCell 505-*b*. The CSS PDCCH candidate 510-*b* may be in a monitoring occasion 525-*b* in a slot 515, and the USS PDCCH candidate 520-*b* may be in a monitoring occasion 525-*c* in the same slot 515, which may increase monitoring complexity for the UE. For example, the UE may use a first hardware configuration to monitor the CSS PDCCH candidate 510-*b* and a second hardware configuration different from the first hardware configuration to monitor the USS PDCCH candidate 520-*b*. Additionally or alternatively, the UE may be limited in the number of blind decodes the UE may attempt across PDCCH candidates based on a shared search space monitoring configuration as described herein. If the CSS PDCCH candidate 510-*b* and the USS PDCCH candidate 520-*b* are in the same slot 515, the UE may miss one or both of the DCI messages. Based on missing the DCI messages, the UE may fail to communicate one or both of the data transmissions 530-*c* and 530-*d*, which may reduce communications reliability and efficiency.

In some examples, the scheduling configuration for cross-carrier scheduled communications on the PCell 505-*b* may include a scheduling constraint that PDCCH candidates scheduling data transmissions 530 may not be in a same slot 515, which may reduce communications complexity for the UE. That is, the PCell 505-*b* may transmit the first DCI message in a CSS PDCCH candidate 510-*b* in a first slot (e.g., the slot 515) according to the scheduling configuration, and the SCell 506-*b* may transmit the second DCI message in a USS PDCCH candidate 520-*b* in a second slot different from the first slot (e.g., in a slot before or after the slot 515) based on the scheduling constraint.

FIGS. 6A and 6B illustrate examples of timing diagrams 600 that support techniques for cross-carrier scheduling from a secondary cell to a primary cell in accordance with aspects of the present disclosure. In some examples, the timing diagrams 600 may implement aspects of wireless communication systems 100 and 200. For example, the timing diagrams 600 may be associated with communications between PCells 605, SCells 606, and UEs, which may be examples of corresponding devices described with reference to FIGS. 1 and 2. The timing diagrams 600 may illustrate features for improved cross-carrier scheduling in CA configurations, among other benefits.

A UE may communicate concurrently with a PCell 605 and an SCell 606, for example in a CA configuration. The UE may monitor CSS PDCCH candidates 610 of one or more CSSs on the PCell 605 and USS PDCCH candidates 620 of one or more USSs on the SCell 606 according to a shared search space monitoring configuration. Based on the shared search space monitoring configuration, the UE may identify that the SCell 606 is a scheduling cell and the PCell 605 is a scheduled cell (e.g., cross-carrier scheduling). Based on monitoring the PDCCH candidates, the UE may receive one or more DCI messages scheduling one or more downlink transmissions 630 (e.g., PDSCH transmissions) from the PCell 605 to the UE. In some examples, the UE may transmit feedback messages (e.g., HARQ-ACK or HARQ-NACK feedback) corresponding to the downlink transmissions 630 in uplink transmissions 635 (e.g., PUSCH transmissions, PDCCH transmissions, etc.).

In some examples, the cross-carrier scheduled communications on the PCell 605 may be configured according to a scheduling configuration, which may include one or more scheduling constraints applied to the downlink transmissions 630, the feedback messages, etc. The scheduling constraints may enable the UE to improve communications efficiency and resource utilization, without significantly increasing communications complexity for the UE.

FIG. 6A illustrates an example timing diagram 600-*a*. In the timing diagram 600-*a*, a first DCI message in a CSS PDCCH candidate 610-*a* on a PCell 605-*a* may schedule a downlink transmission 630-*a* on the PCell 605-*a*, and a second DCI message in a USS PDCCH candidate 620-*a* on an SCell 606-*a* may schedule a downlink transmission 630-*b* on the PCell 605-*a*. The UE may report a first feedback message corresponding to the downlink transmission 630-*a* and a second feedback message corresponding to the downlink transmission 630-*b*. The UE may report both the first and second feedback messages in an uplink transmission 635-*a*, which may increase communications complexity for the UE. For example, if the first and second feedback messages are reported in the same uplink transmission 635-*a*, the feedback messages may be multiplexed on a same feedback codebook (e.g., a HARQ-ACK codebook). In a first example, the PCell 605-*a* may be unable to distinguish between the first feedback message and the second feedback message in the uplink transmission 635-*a*. In a second example, the UE may be configured to include additional bits distinguishing the feedback messages. In either example, reporting the first feedback message and the second feedback message in the uplink transmission 635-*a* may reduce communications reliability and efficiency.

In some examples, the scheduling configuration for cross-carrier scheduled communications on the PCell 605-*a* may include a scheduling constraint that multiple feedback messages corresponding to downlink transmissions 630 may not be included in the same uplink transmission 635. That is, the UE may report the first feedback message in a first uplink transmission 635 (e.g., the uplink transmission 635-*a*) according to the scheduling configuration, and the UE may report the second feedback message in a second uplink transmission 635 different from the first uplink transmission 635 (e.g., an uplink transmission 635 different from the uplink transmission 635-*a*) based on the scheduling constraint.

FIG. 6B illustrates an example timing diagram 600-*b*. In the timing diagram 600-*b*, a first DCI message in a CSS PDCCH candidate 610-*b* on a PCell 605-*b* may schedule a downlink transmission 630-*c* on the PCell 605-*b*, and a second DCI message in a USS PDCCH candidate 620-*b* on an SCell 606-*b* may schedule a downlink transmission 630-*d* on the PCell 605-*b*. The UE may report a first feedback message corresponding to the downlink transmission 630-*c* in an uplink transmission 635-*b*. The UE may also report a second feedback message corresponding to the downlink transmission 630-*d* in an uplink transmission 635-*c*. The downlink transmission 630-*c* may be scheduled after the downlink transmission 630-*d* and the uplink transmission 635-*b* may be scheduled before the uplink transmission 635-*c*. That is, the data transmissions 630-*c* and 630-*d* may be scheduled in a different order than the order in which the corresponding uplink transmissions 635-*b* and 635-*c* are scheduled, which may increase communications complexity for the UE. In a first example, the PCell 605-*b* may fail to associate the first and second feedback messages with the data transmissions 630-*c* and 630-*d*, respectively, based on the different ordering. In a second example, the UE may be configured to include additional bits distinguishing the feedback messages in the uplink transmission 635-*b* and 635-*c* based on the different ordering. In either example, reporting the first feedback message and the second feedback message in a different order in which the corresponding data transmissions 630-*c* and 630-*d* are scheduled may reduce communications reliability and efficiency.

In some examples, the scheduling configuration for cross-carrier scheduled communications on the PCell 605-*b* may include a scheduling constraint that feedback messages corresponding to downlink transmissions 630 may not be reported in a different order than the order in which the downlink transmissions 630 are scheduled. That is, the downlink transmission 630-*c* may be scheduled before the downlink transmission 630-*d*, and the UE may be configured to report the first feedback message in an uplink transmission 635-*b* that is scheduled before an uplink transmission 635-*c* in which the UE is configured to report the second feedback message. Alternatively, the downlink transmission 630-*c* may be scheduled after the downlink transmission 630-*d*, and the UE may be configured to report the first feedback message in an uplink transmission 635-*b* that is scheduled after an uplink transmission 635-*c* in which the UE is configured to report the second feedback message.

Figure 7:
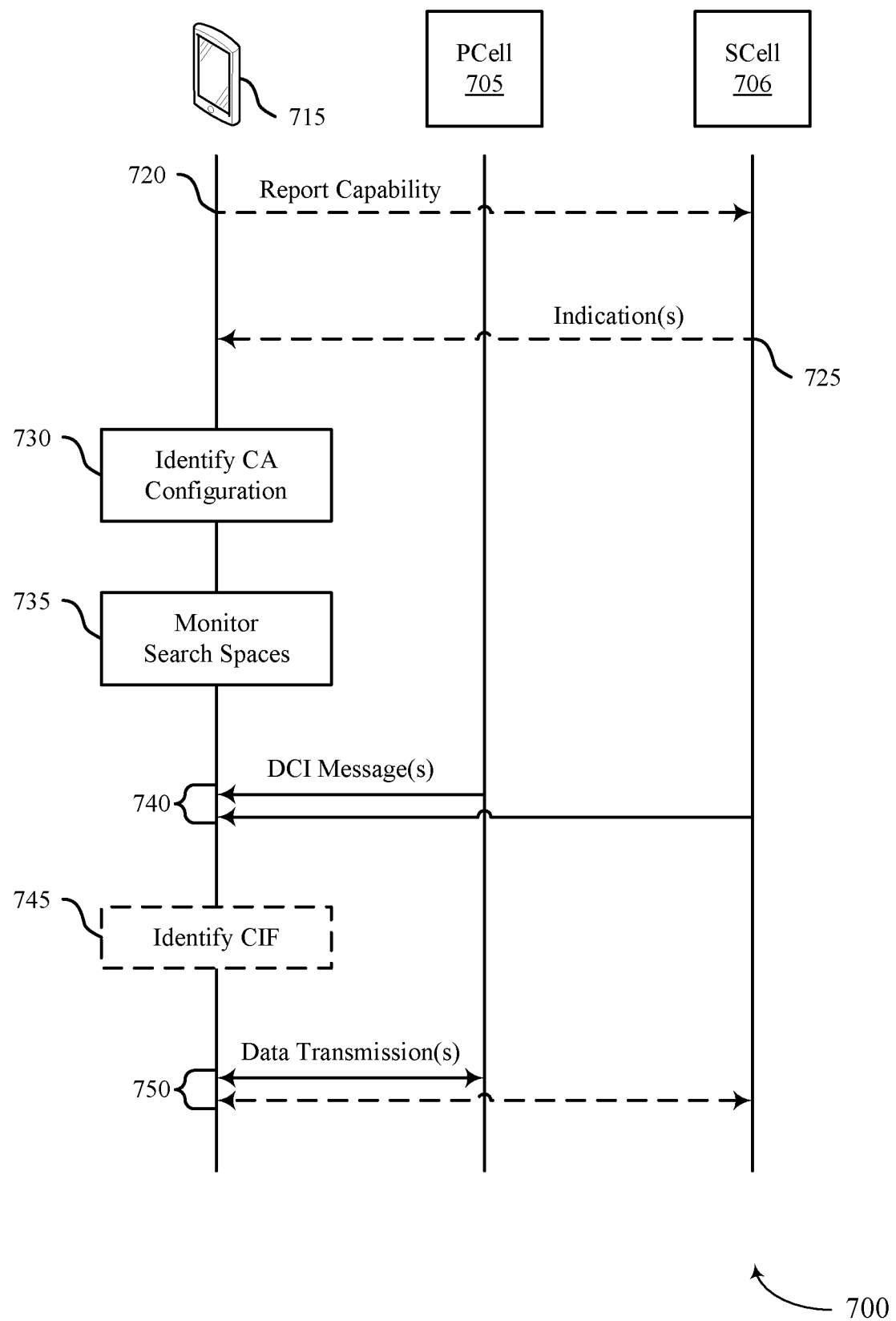
FIGS. 7 and 8 illustrate examples of process flows that support techniques for cross-carrier scheduling from a secondary cell to a primary cell in accordance with aspects of the present disclosure.

FIG. 7 illustrates an example of a process flow 700 that supports techniques for cross-carrier scheduling from a secondary cell to a primary cell in accordance with aspects of the present disclosure. In some examples, the process flow 700 may implement aspects of wireless communications systems 100 and 200. For example, the process flow 700 may include example operations associated with one or more of a PCell 705, an SCell 706, or a UE 715, which may be examples of the corresponding devices described with reference to FIGS. 1 and 2. In the following description of the process flow 700, the operations between the PCell 705, the SCell 706, and the UE 715 may be performed in a different order than the example order shown, or the operations performed by the PCell 705, the SCell 706, and the UE 715 may be performed in different orders or at different times. Some operations may also be omitted from the process flow 700, and other operations may be added to the process flow 700. The operations performed by the PCell 705, the SCell 706, and the UE 715 may support improvement to the UE 715 communications operations and, in some examples, may promote improvements to the UE 715 implementation of cross-carrier scheduling, among other benefits.

In some examples, at 720 the UE 715 may report a monitoring capability to the SCell 706. The monitoring capability may indicate a limit to a quantity of non-overlapping CCEs of search spaces the UE 715 is capable of monitoring, or a limit to a quantity of blind decodes of PDCCH candidates the UE 715 is capable of attempting, or both. The limit may be on a per-CC basis, where the limit may apply to the PCell 705 and the SCell 706 individually. In some examples, reporting the monitoring capability may include transmitting capability information signaling to the SCell 706.

In some examples, at 725 the SCell 706 may transmit an indication of a shared search space monitoring configuration. The indication may include an update to a previously configured shared search space monitoring configuration for the UE 715, or the indication may configure a new shared search space monitoring configuration for the UE 715.

At 730, the UE 715 may identify that the UE 715 is in communication with the PCell 705 and the SCell 706. The UE 715 may communicate concurrently with the PCell 705 and an SCell 706, for example in a CA configuration. In some examples, the UE 715 may identify the CA configuration based on the shared search space configuration indicated at 725. Based on the shared search space monitoring configuration, the UE 715 may identify that the SCell 706 is a scheduling cell and the PCell 705 is a scheduled cell (e.g., cross-carrier scheduling). The PCell 705 and the SCell 706 may also identify the CA configuration at 730.

At 735, the UE 715 may monitor search spaces of the PCell 705 and the SCell 706 for control information. For example, the UE 715 may monitor PDCCH candidates of one or more CSSs on the PCell 705 and PDCCH candidates of one or more USSs on the SCell 706 according to the shared search space monitoring configuration. Additionally at 735, the PCell 705 and the SCell 706 may determine which PDCCH candidates to use for transmitting control information to the UE 715.

At 740, the UE 715 may receive one or more DCI messages from the PCell 705 and the SCell 706. The DCI messages may schedule the UE 715 to communicate a data transmission (e.g., a PDSCH transmission, a PUSCH transmission, etc.) with the PCell 705. One or more DCI messages from the SCell 706 may include a cross-carrier scheduling indication that the data transmission is scheduled for the PCell 705. In some examples, the UE 715 may receive a second DCI message from the SCell 706 scheduling a second data transmission for the SCell 706.

In some examples, at 745 the UE 715 may identify a value in a CIF of a DCI message. In some examples, the shared search space monitoring configuration may indicate which USSs of the SCell 706 the UE 715 is to monitor based on a value (e.g., 0 or 1) in a CIF of a DCI message received in a PDCCH candidate in a USS of the SCell 706. Each USS may correspond to a value in the CIF. For example, the UE 715 may be configured to monitor a first set of USSs when the value in the CIF is 0, and a second set of USSs when the value in the CIF is 1.

At 750, the UE 715 may communicate with the PCell 705 via the scheduled data transmission in accordance with the DCI messages. In some examples, the UE 715 may communicate with the SCell 706 via the second data transmission in accordance with the 715 DCI message. The operations performed by the PCell 705, the SCell 706, and the UE 415 may support improvements to the UE 715 communication operations and, in some examples, may promote improvements to the UE 715 reliability, among other benefits.

Figure 8:
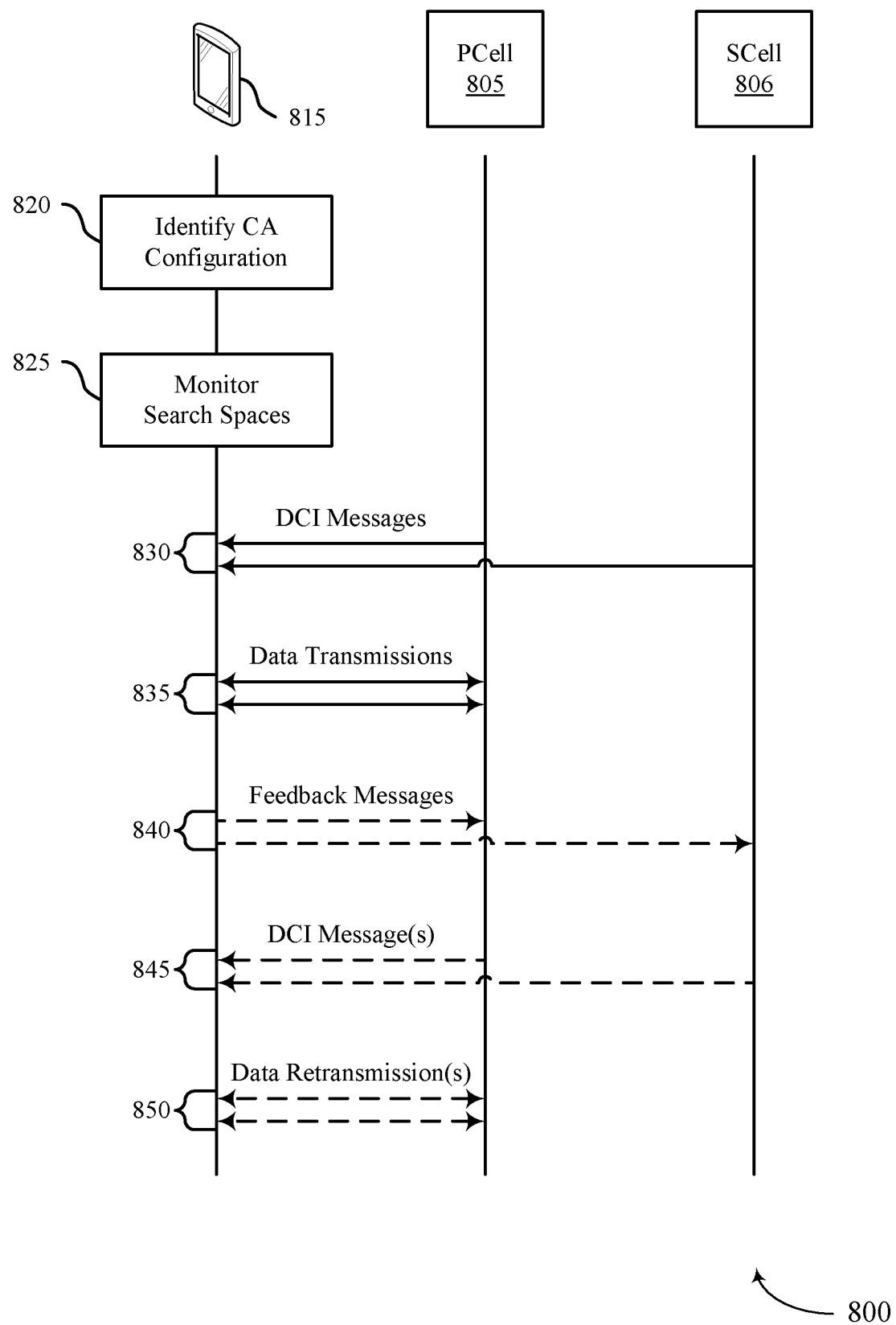

FIG. 8 illustrates an example of a process flow 800 that supports techniques for cross-carrier scheduling from a secondary cell to a primary cell in accordance with aspects of the present disclosure. In some examples, the process flow 800 may implement aspects of wireless communications systems 100 and 200. For example, the process flow 800 may include example operations associated with one or more of a PCell 805, an SCell 806, or a UE 815, which may be examples of the corresponding devices described with reference to FIGS. 1 and 2. In the following description of the process flow 800, the operations between the PCell 805, the SCell 806, and the UE 815 may be performed in a different order than the example order shown, or the operations performed by the PCell 805, the SCell 806, and the UE 815 may be performed in different orders or at different times. Some operations may also be omitted from the process flow 800, and other operations may be added to the process flow 800. The operations performed by the PCell 805, the SCell 806, and the UE 815 may support improvement to the UE 815 communications operations and, in some examples, may promote improvements to the UE 815 implementation of cross-carrier scheduling, among other benefits.

At 820, the UE 815 may identify that the UE 815 is in communication with the PCell 805 and the SCell 806. The UE 815 may communicate concurrently with the PCell 805 and an SCell 806, for example in a CA configuration. In some examples, the UE 815 may identify the CA configuration based on a shared search space configuration by the SCell 806. Based on the shared search space monitoring configuration, the UE 815 may identify that the SCell 806 is a scheduling cell and the PCell 805 is a scheduled cell (e.g., cross-carrier scheduling). In some examples, the cross-carrier scheduled communications on the PCell 805 may be configured according to a scheduling configuration, which may include one or more scheduling constraints. The scheduling configuration and the scheduling constraints may reduce monitoring and communications complexity for the UE 815. The UE 815 may identify the scheduling configuration, for example based on the shared search space monitoring configuration. The PCell 805 and the SCell 806 may also identify the CA configuration at 820.

At 825, the UE 815 may monitor search spaces of the PCell 805 and the SCell 806 for control information. For example, the UE 815 may monitor PDCCH candidates of one or more CSSs on the PCell 805 and PDCCH candidates of one or more USSs on the SCell 806 according to the shared search space monitoring configuration. Additionally at 825, the PCell 805 and the SCell 806 may determine which PDCCH candidates to use for transmitting control information to the UE 815.

At 830, the UE 815 may receive a first DCI message based on monitoring PDCCH candidates of CSSs on the PCell 805. The UE 815 may also receive a second DCI message based on monitoring PDCCH candidates of USSs on the SCell 806. The DCI messages may schedule the UE 815 to communicate data transmissions with the PCell 805. For example, the first DCI message may schedule a first data transmission and the second DCI message may schedule a second data transmission. The DCI message from the SCell 806 may include a cross-carrier scheduling indication that the data transmission is scheduled for the PCell 805.

In some examples, the scheduling configuration may include a scheduling constraint that PDCCH candidates scheduling data transmissions may not overlap in time or be in a same monitoring occasion. That is, the PCell 805 may transmit the first DCI message in a PDCCH candidate in a first duration according to the scheduling configuration, and the SCell 806 may transmit the second DCI message in a PDCCH candidate in a second duration that does not overlap in time with the first duration or is not in the same monitoring occasion as the first duration based on the scheduling constraint.

In some examples, the scheduling configuration may include a scheduling constraint that PDCCH candidates scheduling data transmissions may not be in a same slot. That is, the PCell 805 may transmit the first DCI message in a PDCCH candidate in a first slot according to the scheduling configuration, and the SCell 806 may transmit the second DCI message in a PDCCH candidate in a second slot different from the first slot (e.g., in a slot before or after the first slot) based on the scheduling constraint.

At 835, the UE 815 may communicate with the PCell 805 via the first and second data transmissions in accordance with the first and second DCI messages. In some examples, the data transmissions may include PDSCH transmissions, PUSCH transmissions, etc.

In some examples, the scheduling configuration may include a scheduling constraint that the scheduled data transmissions may not overlap in time. That is, the UE 815 may communicate the first data transmission in a first duration according to the scheduling configuration, and the UE 815 may communicate the second data transmission in a second duration that does not overlap in time with the first duration based on the scheduling constraint.

In some examples, the scheduling configuration include a scheduling constraint that data transmissions may not be scheduled in a same slot. That is, the UE 815 may communicate the first data transmission in a first slot according to the scheduling configuration, and the UE 815 may communicate the second data transmission in a second slot different from the first slot (a slot before or after the first slot) based on the scheduling constraint.

In some examples, the scheduling configuration include a scheduling constraint that data transmissions may not be scheduled in a different order than the order in which the UE 815 receives the scheduling DCI messages. That is, the UE 815 may receive the first DCI message after receiving the second DCI message according to the scheduling configuration, and the UE 815 may be scheduled to communicate the first data transmission after communicating the second data transmission based on the scheduling constraint. Alternatively, the UE 815 may receive the first DCI message before receiving the second DCI message according to the scheduling configuration, and the UE 815 may be scheduled to communicate the first data transmission before communicating the second data transmission based on the scheduling constraint.

In some examples, at 840 the UE 815 may transmit a first feedback message corresponding to the first data transmission and a second feedback message corresponding to the second data transmission. The UE 815 may transmit the feedback messages in uplink transmissions (e.g., PUSCH transmissions, PUCCH transmissions, etc.). In some examples, the feedback messages may include a HARQ-ACK message or a HARQ-NACK message.

In some examples, the scheduling configuration may include a scheduling constraint that multiple feedback messages corresponding to data transmissions may not be included in a same uplink transmission. That is, the UE 815 may report the first feedback message in a first uplink transmission according to the scheduling configuration, and the UE 815 may report the second feedback message in a second uplink transmission different from the first uplink transmission based on the scheduling constraint.

In some examples, the scheduling configuration may include a scheduling constraint that feedback messages corresponding to downlink transmissions may not be reported in a different order than the order in which the downlink transmissions are scheduled. That is, the first downlink transmission may be scheduled before the second downlink transmission, and the UE 815 may be configured to report the first feedback message in a first uplink transmission that is scheduled before a second uplink transmission in which the UE 815 is configured to report the second feedback message. Alternatively, the first downlink transmission may be scheduled after the second downlink transmission, and the UE 815 may be configured to report the first feedback message in a first uplink transmission that is scheduled after a second uplink transmission in which the UE 815 is configured to report the second feedback message.

In some examples, at 845 the PCell 805 and the SCell 806 may, based on the feedback messages, transmit additional DCI messages scheduling additional data transmissions. The additional data transmissions may be retransmissions of the first or second data transmissions, for example based on receiving HARQ-NACK feedback.

In some examples, the scheduling configuration may include a scheduling constraint that retransmissions of data transmissions are to be scheduled by the same cell (e.g., the PCell 805 or the SCell 806) which scheduled the original data transmission. That is, the UE 815 may receive a third DCI message from the PCell 805 scheduling a retransmission of the first data transmission in accordance with the scheduling configuration. Additionally or alternatively, the UE 815 may receive a fourth DCI message from the SCell 806 scheduling a retransmission of the second data transmission in accordance with the scheduling configuration.

In some examples, at 850 the UE 815 may communicate with the PCell 805 via the scheduled retransmissions. The operations performed by the PCell 805, the SCell 806, and the UE 415 may support improvements to the UE 815 communication operations and, in some examples, may promote improvements to the UE 815 reliability, among other benefits.

Figure 9:
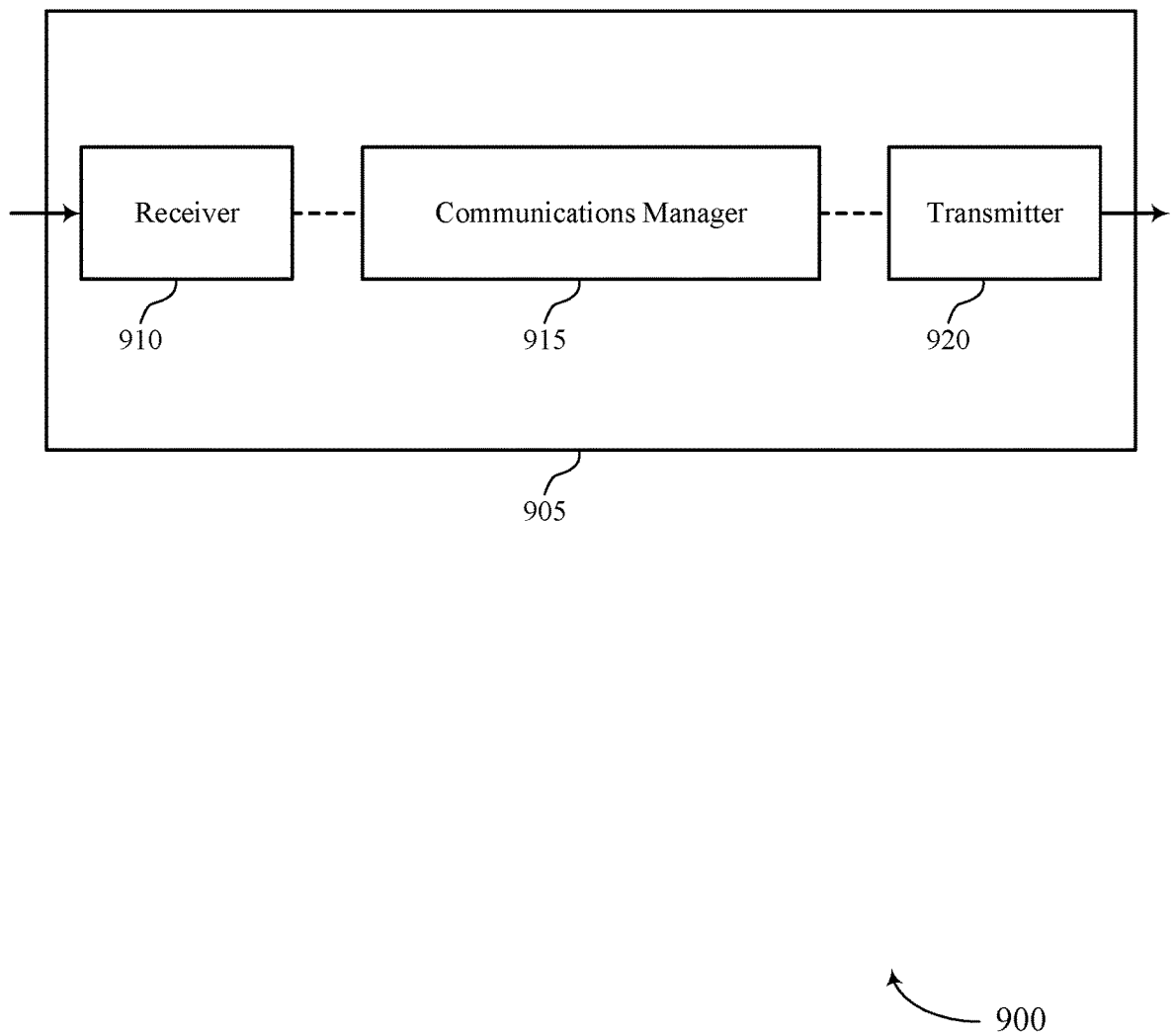
FIGS. 9 and 10 show block diagrams of devices that support techniques for cross-carrier scheduling from a secondary cell to a primary cell in accordance with aspects of the present disclosure.

FIG. 9 shows a block diagram 900 of a device 905 that supports techniques for cross-carrier scheduling from a secondary cell to a primary cell in accordance with aspects of the present disclosure. The device 905 may be an example of aspects of a UE as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for cross-carrier scheduling from a secondary cell to a primary cell, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that the UE is in communication with a primary cell and a secondary cell in a carrier aggregation configuration, where the primary cell is a cross-carrier scheduled cell and the secondary cell is a cross-carrier scheduling cell, monitor a common search space of the primary cell and a UE-specific search space of the secondary cell for control information in accordance with a shared search space monitoring configuration, receive one or more downlink control information messages as a result of monitoring the UE-specific search space of the secondary cell, where the one or more downlink control information messages include a cross-carrier scheduling indication that a data transmission is scheduled with the primary cell, and communicate with the primary cell via the data transmission in accordance with at least one of the one or more downlink control information messages.

The communications manager 915 may also identify that the UE is in communication with a primary cell and a secondary cell in a carrier aggregation configuration, where the primary cell is a cross-carrier scheduled cell and the secondary cell is a cross-carrier scheduling cell, receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell, receive, from the secondary cell, a second downlink control information message that includes a cross-carrier scheduling indication that a second data transmission is scheduled with the primary cell in accordance with the scheduling configuration, and communicate with the primary cell via the first data transmission in accordance with the first downlink control information message, and via the second data transmission in accordance with the second downlink control information message.

The communications manager 915 as described herein may be implemented to realize one or more potential advantages. One implementation may allow the device 905 to save power and increase battery life by communicating with multiple serving cells (e.g., of one or more base stations 105 as shown in FIG. 1) more efficiently. For example, the device 905 may efficiently communicate with the serving cells (e.g., a PCell and an SCell) in a CA configuration, as the device 905 may be able to identify search spaces to monitor based on the shared search space configuration. Additionally, the device 905 may efficiently communicate with the serving cells via cross-carrier scheduled communications configured according to a scheduling configuration, which may reduce monitoring and communications complexity for the device 905. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
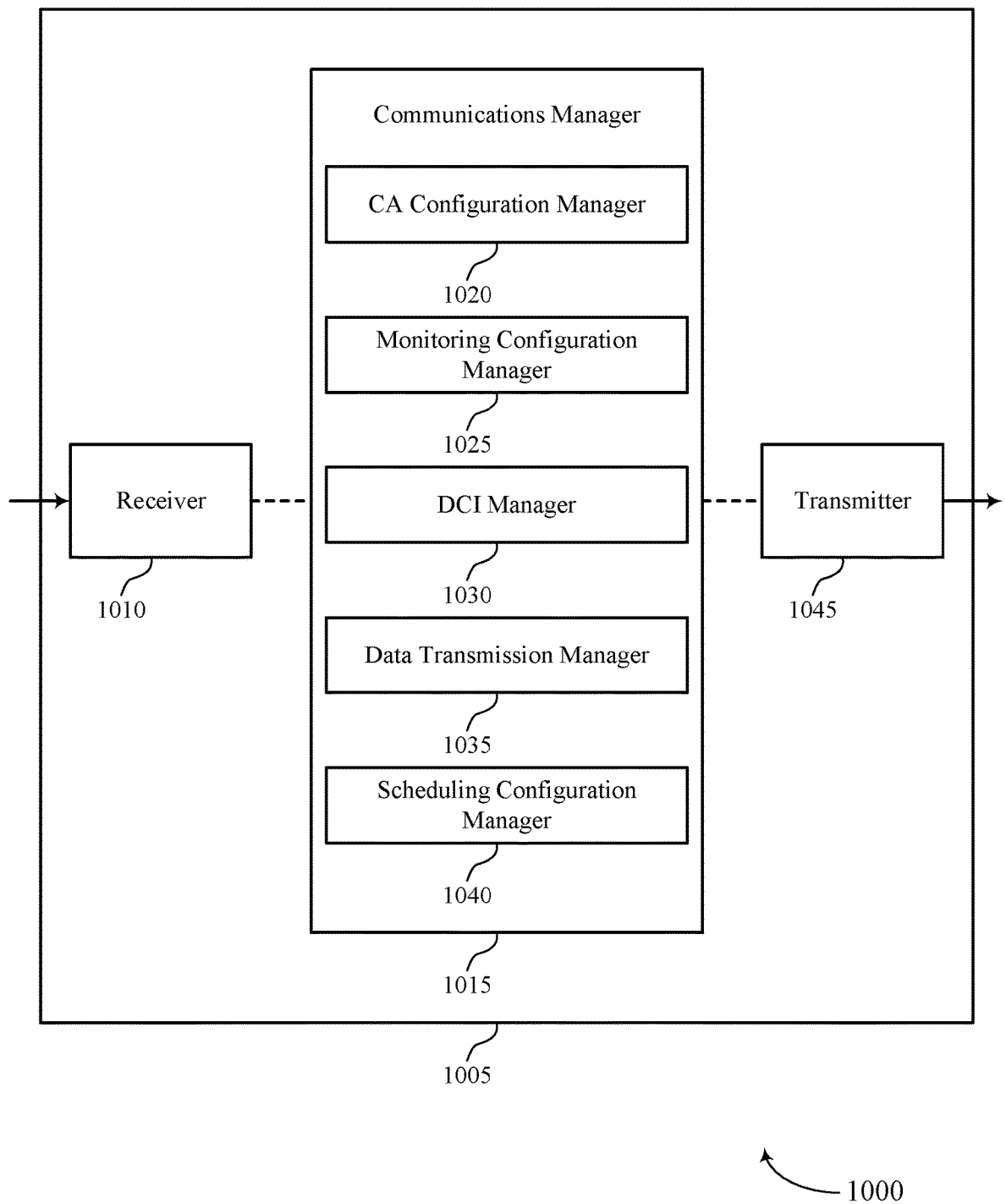

FIG. 10 shows a block diagram 1000 of a device 1005 that supports techniques for cross-carrier scheduling from a secondary cell to a primary cell in accordance with aspects of the present disclosure. The device 1005 may be an example of aspects of a device 905, or a UE as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for cross-carrier scheduling from a secondary cell to a primary cell, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a CA configuration manager 1020, a monitoring configuration manager 1025, a DCI manager 1030, a data transmission manager 1035, and a scheduling configuration manager 1040. The communications manager 1015 may be an example of aspects of the communications manager 1210 described herein.

The CA configuration manager 1020 may identify that the UE is in communication with a primary cell and a secondary cell in a carrier aggregation configuration, where the primary cell is a cross-carrier scheduled cell and the secondary cell is a cross-carrier scheduling cell.

The monitoring configuration manager 1025 may monitor a common search space of the primary cell and a UE-specific search space of the secondary cell for control information in accordance with a shared search space monitoring configuration.

The DCI manager 1030 may receive one or more downlink control information messages as a result of monitoring the UE-specific search space of the secondary cell, where the one or more downlink control information messages include a cross-carrier scheduling indication that a data transmission is scheduled with the primary cell.

The data transmission manager 1035 may communicate with the primary cell via the data transmission in accordance with at least one of the one or more downlink control information messages.

The scheduling configuration manager 1040 may receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell and receive, from the secondary cell, a second downlink control information message that includes a cross-carrier scheduling indication that a second data transmission is scheduled with the primary cell in accordance with the scheduling configuration.

The data transmission manager 1035 may communicate with the primary cell via the first data transmission in accordance with the first downlink control information message, and via the second data transmission in accordance with the second downlink control information message.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
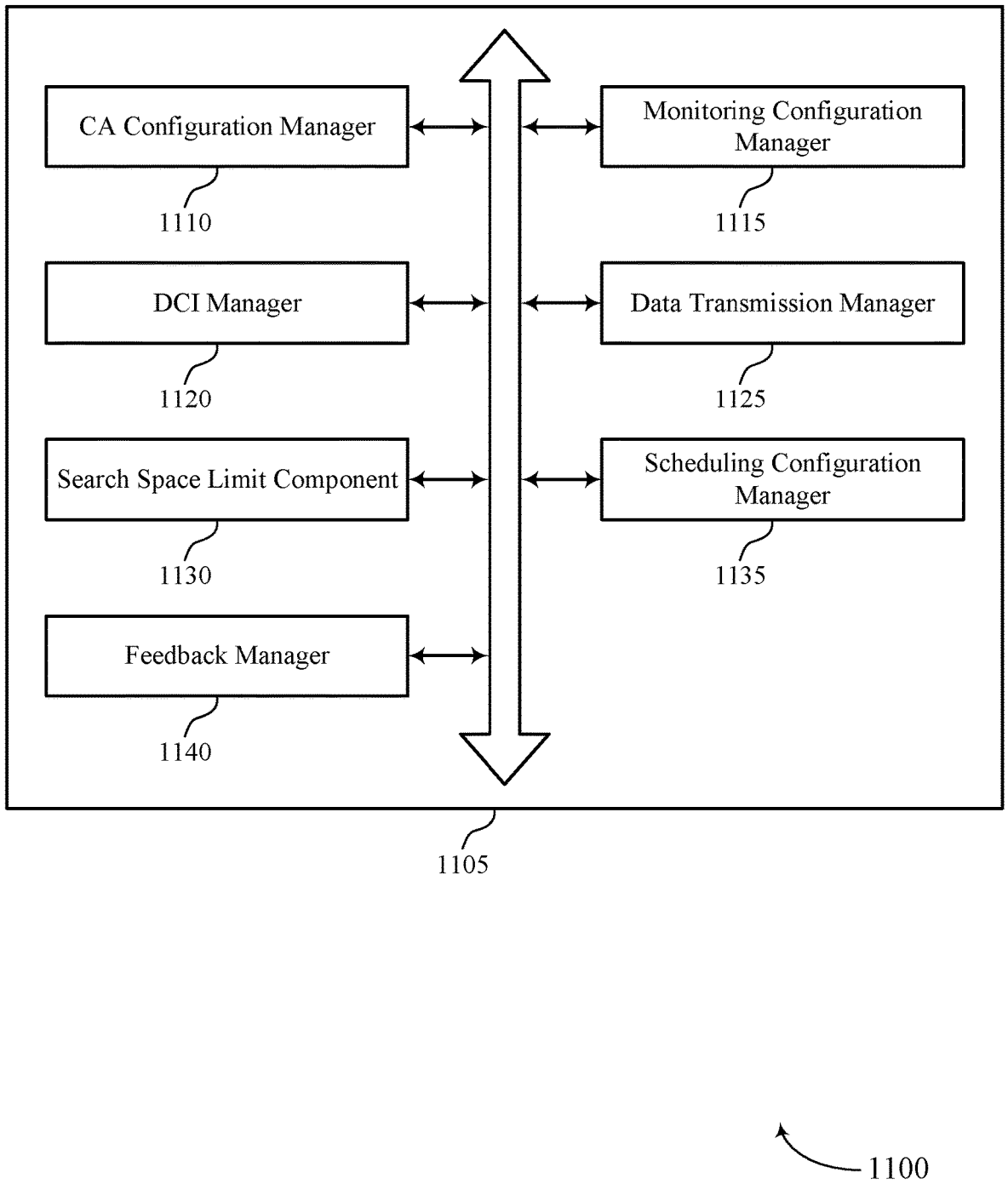
FIG. 11 shows a block diagram of a communications manager that supports techniques for cross-carrier scheduling from a secondary cell to a primary cell in accordance with aspects of the present disclosure.

FIG. 11 shows a block diagram 1100 of a communications manager 1105 that supports techniques for cross-carrier scheduling from a secondary cell to a primary cell in accordance with aspects of the present disclosure. The communications manager 1105 may be an example of aspects of a communications manager 915, a communications manager 1015, or a communications manager 1210 described herein. The communications manager 1105 may include a CA configuration manager 1110, a monitoring configuration manager 1115, a DCI manager 1120, a data transmission manager 1125, a search space limit component 1130, a scheduling configuration manager 1135, and a feedback manager 1140. Each of these modules may communicate, directly or indirectly, with one another (e.g., via one or more buses).

The CA configuration manager 1110 may identify that the UE is in communication with a primary cell and a secondary cell in a carrier aggregation configuration, where the primary cell is a cross-carrier scheduled cell and the secondary cell is a cross-carrier scheduling cell.

The monitoring configuration manager 1115 may monitor a common search space of the primary cell and a UE-specific search space of the secondary cell for control information in accordance with a shared search space monitoring configuration.

In some examples, the monitoring configuration manager 1115 may report an indication of a capability of the UE to support shared search space control channel candidates in UE-specific search spaces not associated with the cross-carrier scheduling indication, where the shared search space monitoring configuration is based on the capability. In some examples, the monitoring configuration manager 1115 may monitor a type0 common search space of the primary cell, a type0A common search space of the primary cell, a type1 common search space of the primary cell, a type2 common search space of the primary cell, a type3 common search space of the primary cell, or any combination thereof.

In some examples, the monitoring configuration manager 1115 may monitor a common search space of the primary cell and one or more UE-specific search spaces of the secondary cell for control information in accordance with a shared search space monitoring configuration, where the first downlink control information message and the second downlink control information message are received as a result of the monitoring, and where the scheduling configuration is based on the shared search space monitoring configuration.

In some cases, the shared search space monitoring configuration includes control channel candidates associated with the one or more downlink control information messages that include the cross-carrier scheduling indication. In some cases, the control channel candidates associated with the one or more downlink control information messages are not included in UE-specific search spaces not associated with the cross-carrier scheduling indication. In some cases, one or more of the control channel candidates associated with the one or more downlink control information messages are included in a second UE-specific search space not associated with the cross-carrier scheduling indication.

The DCI manager 1120 may receive one or more downlink control information messages as a result of monitoring the UE-specific search space of the secondary cell, where the one or more downlink control information messages include a cross-carrier scheduling indication that a data transmission is scheduled with the primary cell. In some examples, the DCI manager 1120 may identify a respective carrier indicator field in each of the one or more downlink control information messages, where the cross-carrier scheduling indication is a value included in one of the respective carrier indicator fields. In some examples, the DCI manager 1120 may receive a second downlink control information message as a result of the monitoring, where the second downlink control information message includes a second scheduling indication that a second data transmission is scheduled with the secondary cell. In some examples, the DCI manager 1120 may receive a third downlink control information message as a result of the monitoring, where the third downlink control information message includes a third scheduling indication that a third data transmission is scheduled with the primary cell.

The data transmission manager 1125 may communicate with the primary cell via the data transmission in accordance with at least one of the one or more downlink control information messages.

In some examples, the data transmission manager 1125 may communicate with the primary cell via the first data transmission in accordance with the first downlink control information message, and via the second data transmission in accordance with the second downlink control information message. In some examples, the data transmission manager 1125 may communicate with the secondary cell via the second data transmission in accordance with the second downlink control information message. In some examples, the data transmission manager 1125 may communicate with the primary cell via the third data transmission in accordance with the third downlink control information message.

In some examples, the data transmission manager 1125 may communicate with the primary cell via the retransmission of the first data transmission in accordance with the third downlink control information message. In some examples, the data transmission manager 1125 may communicate with the primary cell via the retransmission of the second data transmission in accordance with the fourth downlink control information message.

In some examples, the data transmission manager 1125 may receive a downlink data transmission from the primary cell, transmit an uplink data transmission to the primary cell, or both.

The scheduling configuration manager 1135 may receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell. In some examples, the scheduling configuration manager 1135 may receive, from the secondary cell, a second downlink control information message that includes a cross-carrier scheduling indication that a second data transmission is scheduled with the primary cell in accordance with the scheduling configuration.

In some examples, the scheduling configuration manager 1135 may receive, from the primary cell, a third downlink control information message that includes a second scheduling indication that a retransmission of the first data transmission is scheduled with the primary cell in accordance with the scheduling configuration. In some examples, the scheduling configuration manager 1135 may receive, from the secondary cell, a fourth downlink control information message that includes a second cross-carrier scheduling indication that a retransmission of the second data transmission is scheduled with the primary cell in accordance with the scheduling configuration.

In some cases, the first data transmission is communicated in a first duration in accordance with the scheduling configuration. In some cases, the second data transmission is communicated in a second duration that does not overlap with the first duration based on one or more scheduling constraints of the set of scheduling constraints.

In some cases, the first data transmission is communicated in a first slot in accordance with the scheduling configuration. In some cases, the second data transmission is communicated in a second slot different from the first slot based on one or more scheduling constraints of the set of scheduling constraints.

In some cases, the first downlink control information message is received before the second downlink control information message in accordance with the scheduling configuration. In some cases, the first data transmission is communicated before the second data transmission based on one or more scheduling constraints of the set of scheduling constraints.

In some cases, the first downlink control information message is received after the second downlink control information message in accordance with the scheduling configuration. In some cases, the first data transmission is communicated after the second data transmission based on one or more scheduling constraints of the set of scheduling constraints.

In some cases, the first downlink control information message is received in a first duration in accordance with the scheduling configuration. In some cases, the second downlink control information message is received in a second duration that does not overlap with the first duration based on one or more scheduling constraints of the set of scheduling constraints.

In some cases, the first downlink control information message is received in a first monitoring occasion in accordance with the scheduling configuration. In some cases, the second downlink control information message is received in a second monitoring occasion different from the first monitoring occasion based on one or more scheduling constraints of the set of scheduling constraints.

In some cases, the first downlink control information message is received in a first slot in accordance with the scheduling configuration. In some cases, the second downlink control information message is received in a second slot different from the first slot based on one or more scheduling constraints of the set of scheduling constraints.

In some cases, the first feedback message is included in a first uplink transmission in accordance with the scheduling configuration. In some cases, the second feedback message is included in a second uplink transmission different from the first uplink transmission based on one or more scheduling constraints of the set of scheduling constraints.

In some cases, the first data transmission is communicated before the second data transmission in accordance with the scheduling configuration. In some cases, the first feedback message is transmitted before the second feedback message based on one or more scheduling constraints of the set of scheduling constraints.

In some cases, the first data transmission is communicated after the second data transmission in accordance with the scheduling configuration. In some cases, the first feedback message is transmitted after the second feedback message based on one or more scheduling constraints of the set of scheduling constraints.

The search space limit component 1130 may determine a limit corresponding to the shared search space monitoring configuration, where the limit is associated with a maximum number of blind decodes to be attempted by the UE, a maximum number of non-overlapping control channel elements, or both, across control channel candidates of the common search space of the primary cell and of the UE-specific search space of the secondary cell. In some examples, the search space limit component 1130 may receive an indication of the limit from the secondary cell, where determining the limit is based on receiving the indication.

In some examples, the search space limit component 1130 may receive an indication of the shared search space monitoring configuration consistent with the limit, where the monitoring is further in accordance with the limit.

In some examples, the search space limit component 1130 may receive an indication of the shared search space monitoring configuration, where the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both. In some examples, the search space limit component 1130 may identify a second UE-specific search space of the secondary cell included in the shared search space monitoring configuration. In some examples, the search space limit component 1130 may refrain from monitoring the second UE-specific search space of the secondary cell in accordance with the limit.

The feedback manager 1140 may transmit a first feedback message to the primary cell based on communicating with the primary cell via the first data transmission. In some examples, the feedback manager 1140 may transmit a second feedback message to the primary cell based on communicating with the primary cell via the second data transmission.

In some cases, the first feedback message includes a hybrid automatic repeat request acknowledgment message or a hybrid automatic repeat request negative acknowledgment message. In some cases, the second feedback message includes a hybrid automatic repeat request acknowledgment message or a hybrid automatic repeat request negative acknowledgment message.

Figure 12:
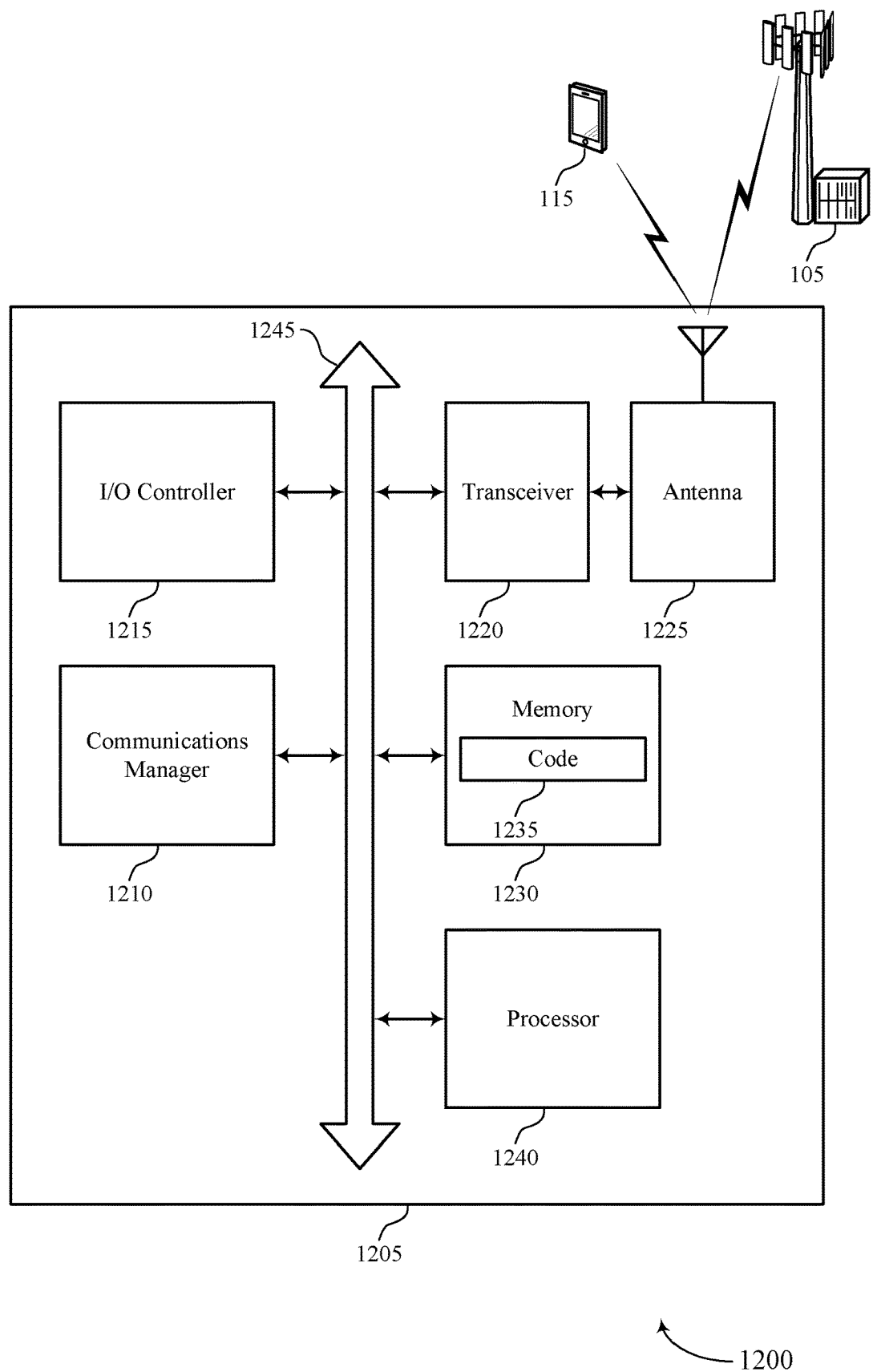
FIG. 12 shows a diagram of a system including a device that supports techniques for cross-carrier scheduling from a secondary cell to a primary cell in accordance with aspects of the present disclosure.

FIG. 12 shows a diagram of a system 1200 including a device 1205 that supports techniques for cross-carrier scheduling from a secondary cell to a primary cell in accordance with aspects of the present disclosure. The device 1205 may be an example of or include the components of device 905, device 1005, or a UE as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify that the UE is in communication with a primary cell and a secondary cell in a carrier aggregation configuration, where the primary cell is a cross-carrier scheduled cell and the secondary cell is a cross-carrier scheduling cell, monitor a common search space of the primary cell and a UE-specific search space of the secondary cell for control information in accordance with a shared search space monitoring configuration, receive one or more downlink control information messages as a result of monitoring the UE-specific search space of the secondary cell, where the one or more downlink control information messages include a cross-carrier scheduling indication that a data transmission is scheduled with the primary cell, and communicate with the primary cell via the data transmission in accordance with at least one of the one or more downlink control information messages.

The communications manager 1210 may also identify that the UE is in communication with a primary cell and a secondary cell in a carrier aggregation configuration, where the primary cell is a cross-carrier scheduled cell and the secondary cell is a cross-carrier scheduling cell, receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell, receive, from the secondary cell, a second downlink control information message that includes a cross-carrier scheduling indication that a second data transmission is scheduled with the primary cell in accordance with the scheduling configuration, and communicate with the primary cell via the first data transmission in accordance with the first downlink control information message, and via the second data transmission in accordance with the second downlink control information message.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for cross-carrier scheduling from a secondary cell to a primary cell).

The processor 1240 of the device 1205 (e.g., controlling the receiver 910, the transmitter 920, or the transceiver 1220) may reduce power consumption and increase communication efficiency based on communicating with serving cells according to the shared search space monitoring configuration and the scheduling configuration. In some examples, the processor 1240 of the device 1205 may reconfigure parameters associated with monitoring search spaces on one or more serving cells. For example, the processor 1240 of the device 1205 may turn on one or more processing units for processing the communications, increase a processing clock, or a similar mechanism within the device 1205. As such, when scheduling messages are received, the processor 1240 may be ready to respond more efficiently through the reduction of a ramp up in processing power. The improvements in power saving and communication efficiency may further increase battery life at the device 1205 (for example, by reducing or eliminating unnecessary or failed communications, etc.).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
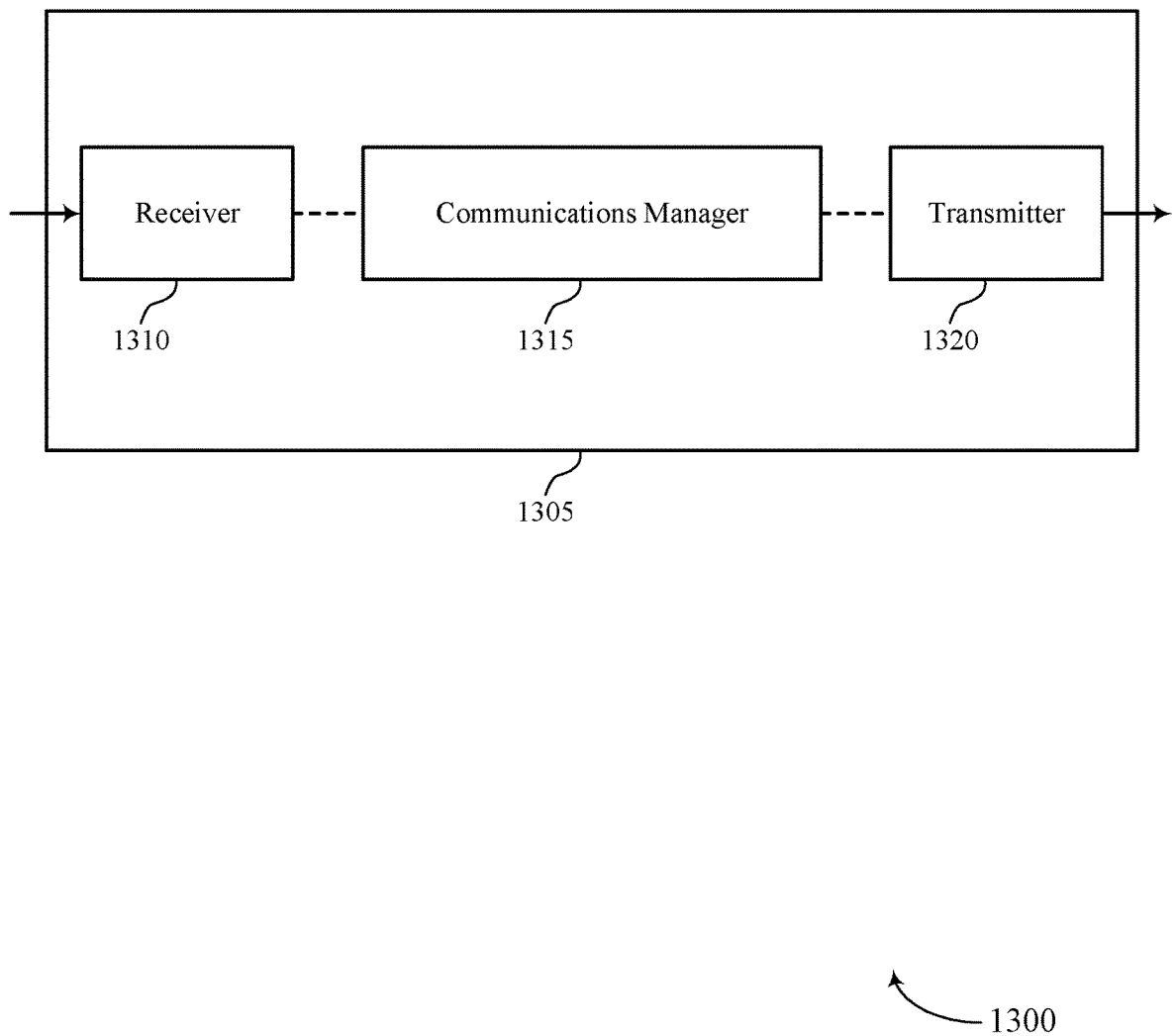
FIGS. 13 and 14 show block diagrams of devices that support techniques for cross-carrier scheduling from a secondary cell to a primary cell in accordance with aspects of the present disclosure.

FIG. 13 shows a block diagram 1300 of a device 1305 that supports techniques for cross-carrier scheduling from a secondary cell to a primary cell in accordance with aspects of the present disclosure. The device 1305 may be an example of aspects of a base station 105 as described herein. For example, the device 1305 may be an example of a primary cell and a secondary cell, although it is to be understood that various operations associated with the primary cell and/or the secondary cell may be performed at separate devices (e.g., different base stations 105). Therefore, in some instances, device 1305 may be representative of a base station that includes both a primary cell and a secondary cell. In other instances, device 1305 may be representative of a base station that is acting as a primary cell, or a base station that is acting as a secondary cell. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for cross-carrier scheduling from a secondary cell to a primary cell, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may configure a UE to communicate with a primary cell and a secondary cell in a carrier aggregation configuration, where the primary cell is a cross-carrier scheduled cell and the secondary cell is a cross-carrier scheduling cell, configure a common search space of the primary cell and a UE-specific search space of the secondary cell for transmitting control information in accordance with a shared search space monitoring configuration, transmit one or more downlink control information messages to the UE in the UE-specific search space of the secondary cell in accordance with the configuring, where the one or more downlink control information messages include a cross-carrier scheduling indication that a data transmission is scheduled with the primary cell, and communicate with the UE via the data transmission of the primary cell in accordance with at least one of the one or more downlink control information messages.

The communications manager 1315 may also configure a UE to communicate with a primary cell and a secondary cell in a carrier aggregation configuration, where the primary cell is a cross-carrier scheduled cell and the secondary cell is a cross-carrier scheduling cell, transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell, transmit a second downlink control information message via the secondary cell that includes a cross-carrier scheduling indication that a second data transmission is scheduled with the primary cell in accordance with the scheduling configuration, and communicate with the UE via the first data transmission of the primary cell in accordance with the first downlink control information message, and via the second data transmission of the primary cell in accordance with the second downlink control information message.

The communications manager 1315 as described herein may be implemented to realize one or more potential advantages. One implementation may allow the device 1305 to save power by communicating with a UE (as shown in FIG. 1) more efficiently. For example, the device 1305 may improve reliability in communications with a UE, as the device 1305 may be able to configure shared search space monitoring and scheduling at the UE and adjust communications accordingly. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
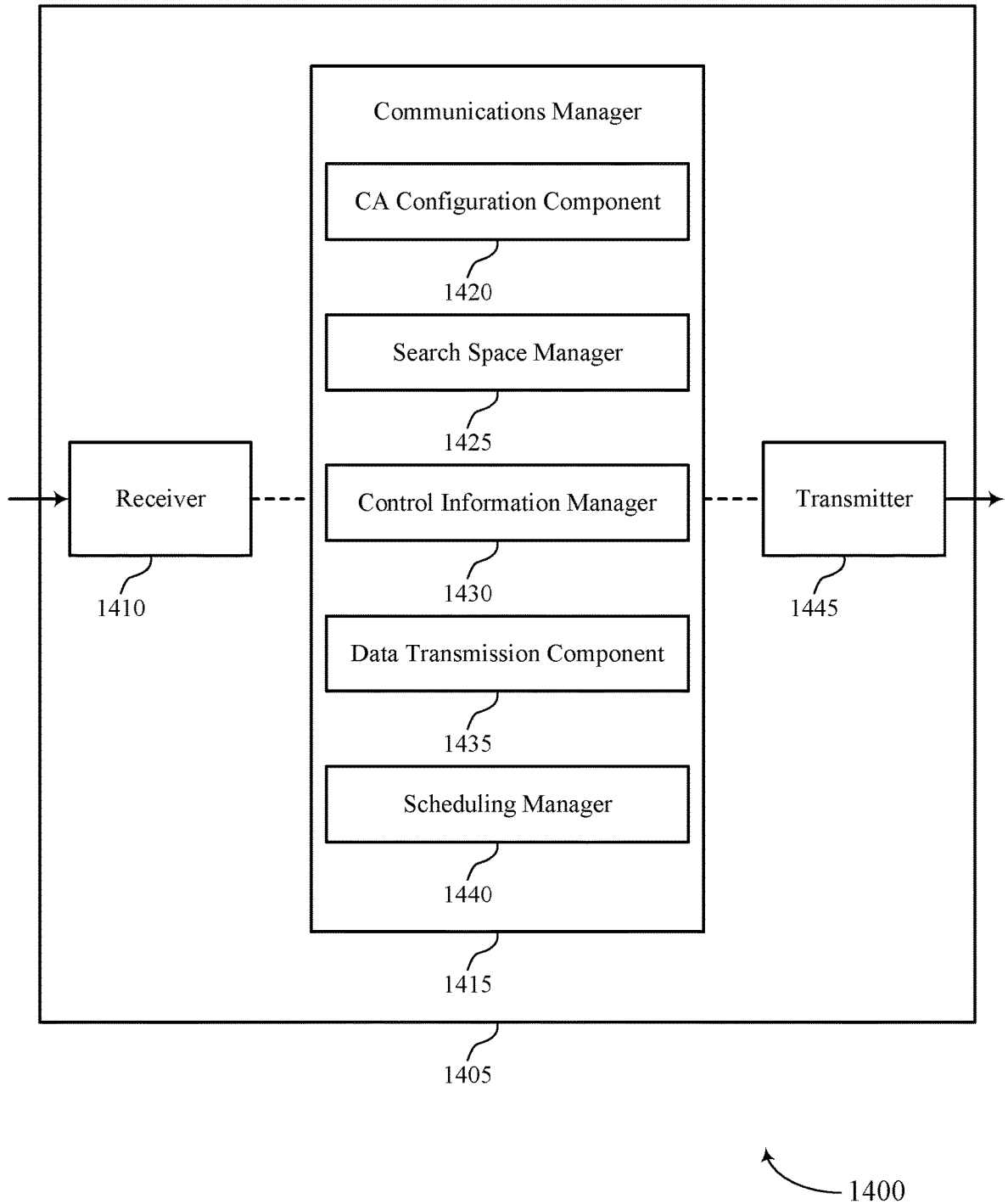

FIG. 14 shows a block diagram 1400 of a device 1405 that supports techniques for cross-carrier scheduling from a secondary cell to a primary cell in accordance with aspects of the present disclosure. The device 1405 may be an example of aspects of a device 1305, or a base station 105 as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to techniques for cross-carrier scheduling from a secondary cell to a primary cell, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a CA configuration component 1420, a search space manager 1425, a control information manager 1430, a data transmission component 1435, and a scheduling manager 1440. The communications manager 1415 may be an example of aspects of the communications manager 1610 described herein.

The CA configuration component 1420 may configure a UE to communicate with a primary cell and a secondary cell in a carrier aggregation configuration, where the primary cell is a cross-carrier scheduled cell and the secondary cell is a cross-carrier scheduling cell.

The search space manager 1425 may configure a common search space of the primary cell and a UE-specific search space of the secondary cell for transmitting control information in accordance with a shared search space monitoring configuration.

The control information manager 1430 may transmit one or more downlink control information messages to the UE in the UE-specific search space of the secondary cell in accordance with the configuring, where the one or more downlink control information messages include a cross-carrier scheduling indication that a data transmission is scheduled with the primary cell.

The data transmission component 1435 may communicate with the UE via the data transmission of the primary cell in accordance with at least one of the one or more downlink control information messages.

The CA configuration component 1420 may configure a UE to communicate with a primary cell and a secondary cell in a carrier aggregation configuration, where the primary cell is a cross-carrier scheduled cell and the secondary cell is a cross-carrier scheduling cell.

The scheduling manager 1440 may transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell and transmit a second downlink control information message via the secondary cell that includes a cross-carrier scheduling indication that a second data transmission is scheduled with the primary cell in accordance with the scheduling configuration.

The data transmission component 1435 may communicate with the UE via the first data transmission of the primary cell in accordance with the first downlink control information message, and via the second data transmission of the primary cell in accordance with the second downlink control information message.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
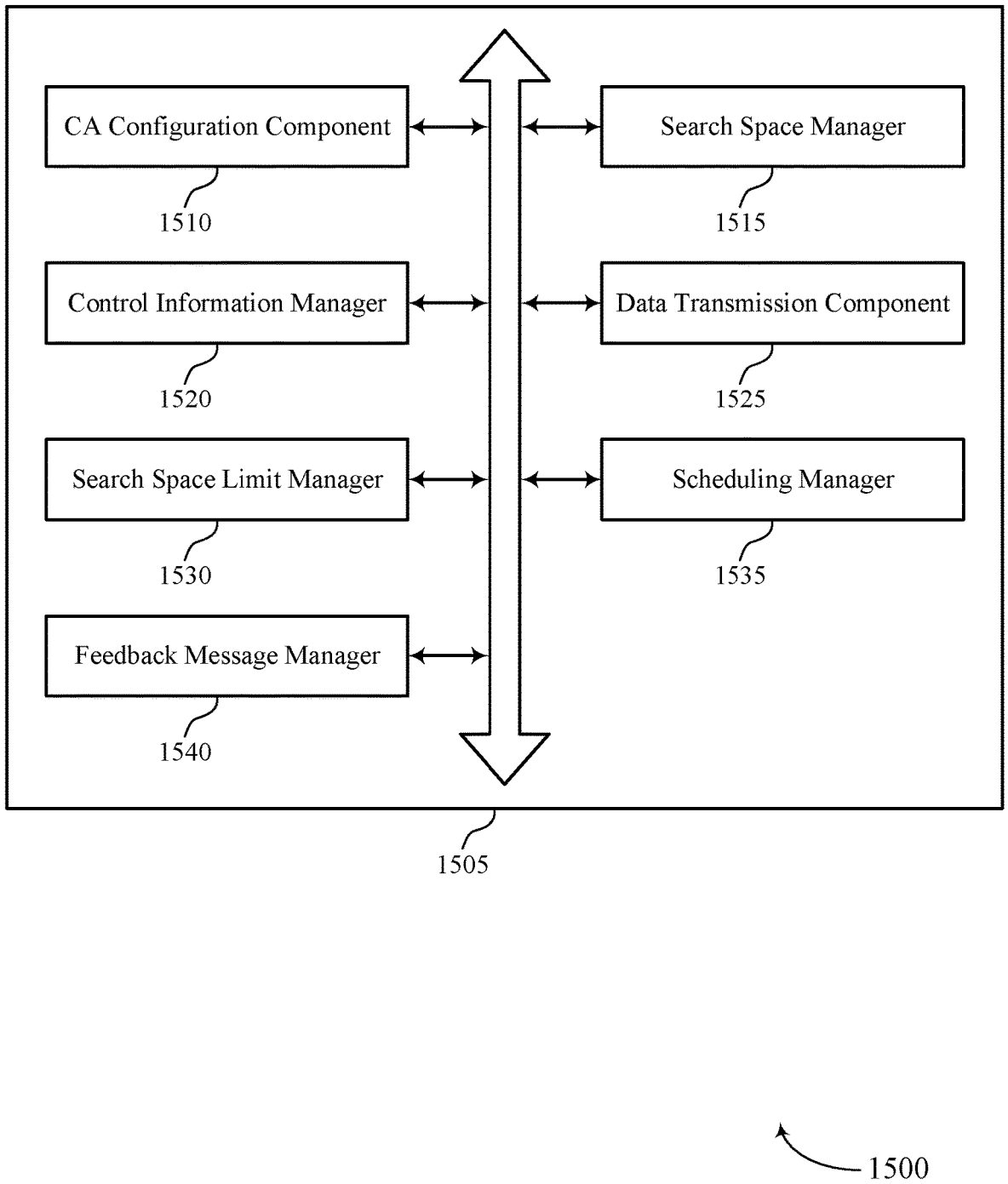
FIG. 15 shows a block diagram of a communications manager that supports techniques for cross-carrier scheduling from a secondary cell to a primary cell in accordance with aspects of the present disclosure.

FIG. 15 shows a block diagram 1500 of a communications manager 1505 that supports techniques for cross-carrier scheduling from a secondary cell to a primary cell in accordance with aspects of the present disclosure. The communications manager 1505 may be an example of aspects of a communications manager 1315, a communications manager 1415, or a communications manager 1610 described herein. The communications manager 1505 may include a CA configuration component 1510, a search space manager 1515, a control information manager 1520, a data transmission component 1525, a search space limit manager 1530, a scheduling manager 1535, and a feedback message manager 1540. Each of these modules may communicate, directly or indirectly, with one another (e.g., via one or more buses).

The CA configuration component 1510 may configure a UE to communicate with a primary cell and a secondary cell in a carrier aggregation configuration, where the primary cell is a cross-carrier scheduled cell and the secondary cell is a cross-carrier scheduling cell.

The search space manager 1515 may configure a common search space of the primary cell and a UE-specific search space of the secondary cell for transmitting control information in accordance with a shared search space monitoring configuration. In some examples, the search space manager 1515 may receive an indication of a capability of the UE to support shared search space control channel candidates in UE-specific search spaces not associated with the cross-carrier scheduling indication, where the shared search space monitoring configuration is based on receiving the indication.

In some examples, the search space manager 1515 may configure a common search space of the primary cell and one or more UE-specific search spaces of the secondary cell for transmitting control information in accordance with a shared search space monitoring configuration, where the first downlink control information message and the second downlink control information message are transmitted based on the determining, and where the scheduling configuration is based on the shared search space monitoring configuration.

In some cases, the shared search space monitoring configuration includes control channel candidates associated with the one or more downlink control information messages that include the cross-carrier scheduling indication. In some cases, the control channel candidates associated with the one or more downlink control information messages are not included in UE-specific search spaces not associated with the cross-carrier scheduling indication. In some cases, one or more of the control channel candidates associated with the one or more downlink control information messages are included in a second UE-specific search space not associated with the cross-carrier scheduling indication.

In some cases, the common search space of the primary cell includes a type0 common search space of the primary cell, a type0A common search space of the primary cell, a type1 common search space of the primary cell, a type2 common search space of the primary cell, a type3 common search space of the primary cell, or any combination thereof.

The control information manager 1520 may transmit one or more downlink control information messages to the UE in the UE-specific search space of the secondary cell in accordance with the configuring, where the one or more downlink control information messages include a cross-carrier scheduling indication that a data transmission is scheduled with the primary cell.

In some examples, the control information manager 1520 may configure a respective carrier indicator field in each of the one or more downlink control information messages, where the cross-carrier scheduling indication is a value included in one of the respective carrier indicator fields. In some examples, the control information manager 1520 may transmit a second downlink control information message, where the second downlink control information message includes a second scheduling indication that a second data transmission is scheduled with the secondary cell. In some examples, the control information manager 1520 may transmit a third downlink control information message, where the third downlink control information message includes a third scheduling indication that a third data transmission is scheduled with the primary cell.

The data transmission component 1525 may communicate with the UE via the data transmission of the primary cell in accordance with at least one of the one or more downlink control information messages.

In some examples, the data transmission component 1525 may communicate with the UE via the first data transmission of the primary cell in accordance with the first downlink control information message, and via the second data transmission of the primary cell in accordance with the second downlink control information message. In some examples, the data transmission component 1525 may communicate with the UE via the second data transmission of the secondary cell in accordance with the second downlink control information message. In some examples, the data transmission component 1525 may communicate with the UE via the third data transmission of the primary cell in accordance with the third downlink control information message. In some examples, the data transmission component 1525 may transmit a downlink data transmission to the UE, receive an uplink data transmission from the UE, or both.

In some examples, the data transmission component 1525 may communicate with the UE via the retransmission of the first data transmission of the primary cell in accordance with the third downlink control information message. In some examples, the data transmission component 1525 may communicate with the UE via the retransmission of the second data transmission of the primary cell in accordance with the fourth downlink control information message.

The scheduling manager 1535 may transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell. In some examples, the scheduling manager 1535 may transmit a second downlink control information message via the secondary cell that includes a cross-carrier scheduling indication that a second data transmission is scheduled with the primary cell in accordance with the scheduling configuration.

In some examples, the scheduling manager 1535 may transmit a third downlink control information message via the primary cell that includes a second scheduling indication that a retransmission of the first data transmission is scheduled with the primary cell in accordance with the scheduling configuration. In some examples, the scheduling manager 1535 may transmit a fourth downlink control information message via the secondary cell that includes a second cross-carrier scheduling indication that a retransmission of the second data transmission is scheduled with the primary cell in accordance with the scheduling configuration.

In some cases, the first data transmission is communicated in a first duration in accordance with the scheduling configuration. In some cases, the second data transmission is communicated in a second duration that does not overlap with the first duration based on one or more scheduling constraints of the set of scheduling constraints.

In some cases, the first data transmission is communicated in a first slot in accordance with the scheduling configuration. In some cases, the second data transmission is communicated in a second slot different from the first slot based on one or more scheduling constraints of the set of scheduling constraints.

In some cases, the first downlink control information message is received before the second downlink control information message in accordance with the scheduling configuration. In some cases, the first data transmission is communicated before the second data transmission based on one or more scheduling constraints of the set of scheduling constraints.

In some cases, the first downlink control information message is transmitted after the second downlink control information message in accordance with the scheduling configuration. In some cases, the first data transmission is communicated after the second data transmission based on one or more scheduling constraints of the set of scheduling constraints.

In some cases, the first downlink control information message is transmitted in a first duration in accordance with the scheduling configuration. In some cases, the second downlink control information message is received in a second duration that does not overlap with the first duration based on one or more scheduling constraints of the set of scheduling constraints.

In some cases, the first downlink control information message is transmitted in a first monitoring occasion in accordance with the scheduling configuration. In some cases, the second downlink control information message is transmitted in a second monitoring occasion different from the first monitoring occasion based on one or more scheduling constraints of the set of scheduling constraints.

In some cases, the first downlink control information message is transmitted in a first slot in accordance with the scheduling configuration. In some cases, the second downlink control information message is transmitted in a second slot different from the first slot based on one or more scheduling constraints of the set of scheduling constraints.

In some cases, the first feedback message is included in a first uplink transmission in accordance with the scheduling configuration. In some cases, the second feedback message is included in a second uplink transmission different from the first uplink transmission based on one or more scheduling constraints of the set of scheduling constraints.

In some cases, the first data transmission is communicated before the second data transmission in accordance with the scheduling configuration. In some cases, the first feedback message is received before the second feedback message based on one or more scheduling constraints of the set of scheduling constraints.

In some cases, the first data transmission is communicated after the second data transmission in accordance with the scheduling configuration. In some cases, the first feedback message is received after the second feedback message based on one or more scheduling constraints of the set of scheduling constraints.

The search space limit manager 1530 may determine a limit corresponding to the shared search space monitoring configuration, where the limit is associated with a maximum number of blind decodes to be attempted by the UE, a maximum number of non-overlapping control channel elements, or both, across control channel candidates of the common search space of the primary cell and of the UE-specific search space of the secondary cell. In some examples, the search space limit manager 1530 may transmit an indication of the limit to the UE based on determining the limit.

In some examples, the search space limit manager 1530 may determine the shared search space monitoring configuration based on the limit, where the shared search space monitoring configuration is consistent with the limit. In some examples, the search space limit manager 1530 may transmit an indication of the shared search space monitoring configuration to the UE. In some examples, the search space limit manager 1530 may determine the shared search space monitoring configuration based on the limit, where the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both.

The feedback message manager 1540 may receive a first feedback message from the UE based on communicating with the UE via the first data transmission of the primary cell. In some examples, the feedback message manager 1540 may receive a second feedback message from the UE based on communicating with the UE via the first data transmission of the primary cell. In some cases, the first feedback message includes a hybrid automatic repeat request acknowledgment message or a hybrid automatic repeat request negative acknowledgment message. In some cases, the second feedback message includes a hybrid automatic repeat request acknowledgment message or a hybrid automatic repeat request negative acknowledgment message.

Figure 16:
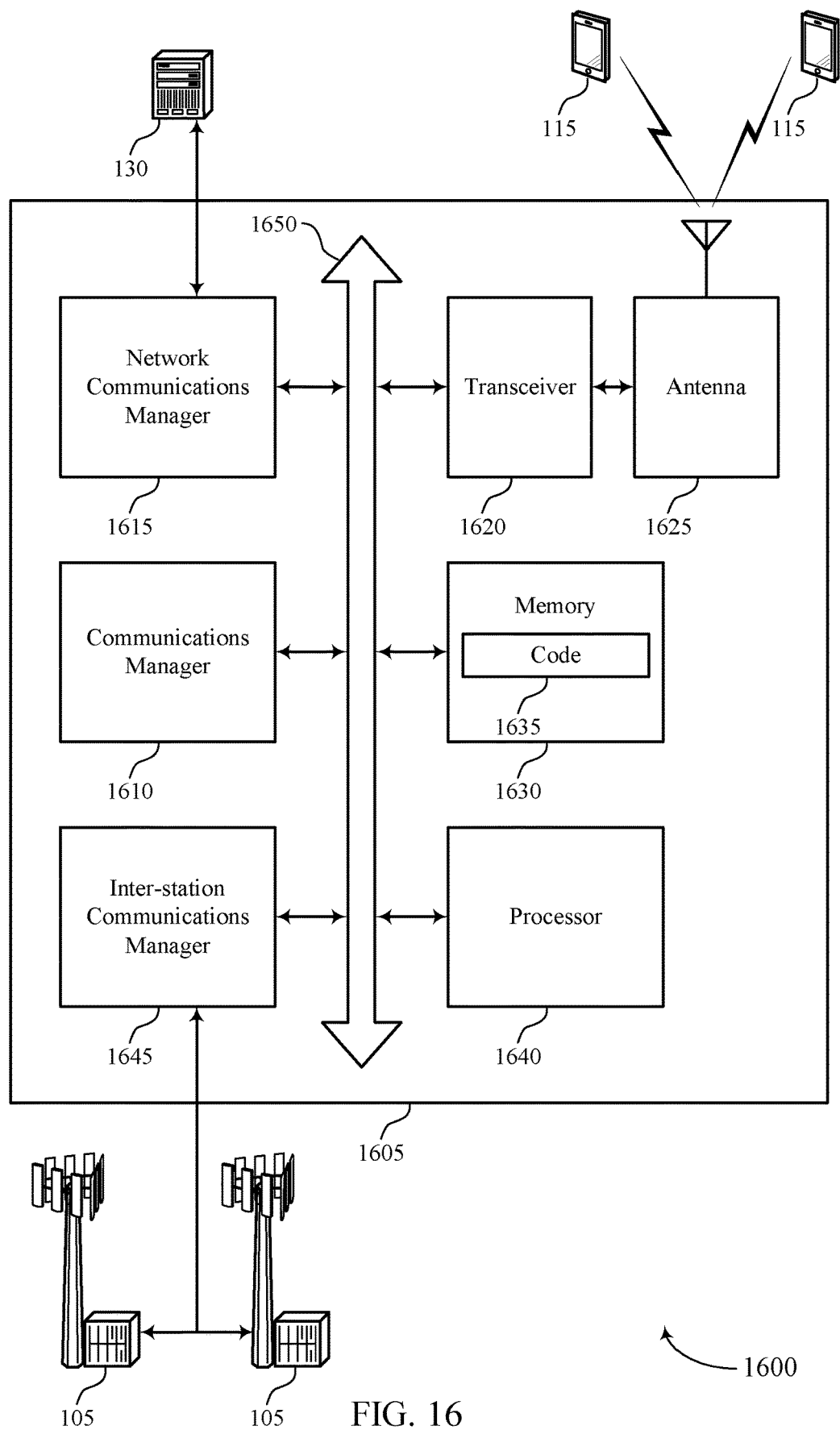
FIG. 16 shows a diagram of a system including a device that supports techniques for cross-carrier scheduling from a secondary cell to a primary cell in accordance with aspects of the present disclosure.

FIG. 16 shows a diagram of a system 1600 including a device 1605 that supports techniques for cross-carrier scheduling from a secondary cell to a primary cell in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may configure a UE to communicate with a primary cell and a secondary cell in a carrier aggregation configuration, where the primary cell is a cross-carrier scheduled cell and the secondary cell is a cross-carrier scheduling cell, configure a common search space of the primary cell and a UE-specific search space of the secondary cell for transmitting control information in accordance with a shared search space monitoring configuration, transmit one or more downlink control information messages to the UE in the UE-specific search space of the secondary cell in accordance with the configuring, where the one or more downlink control information messages include a cross-carrier scheduling indication that a data transmission is scheduled with the primary cell, and communicate with the UE via the data transmission of the primary cell in accordance with at least one of the one or more downlink control information messages.

The communications manager 1610 may also configure a UE to communicate with a primary cell and a secondary cell in a carrier aggregation configuration, where the primary cell is a cross-carrier scheduled cell and the secondary cell is a cross-carrier scheduling cell, transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell, transmit a second downlink control information message via the secondary cell that includes a cross-carrier scheduling indication that a second data transmission is scheduled with the primary cell in accordance with the scheduling configuration, and communicate with the UE via the first data transmission of the primary cell in accordance with the first downlink control information message, and via the second data transmission of the primary cell in accordance with the second downlink control information message.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting techniques for cross-carrier scheduling from a secondary cell to a primary cell).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
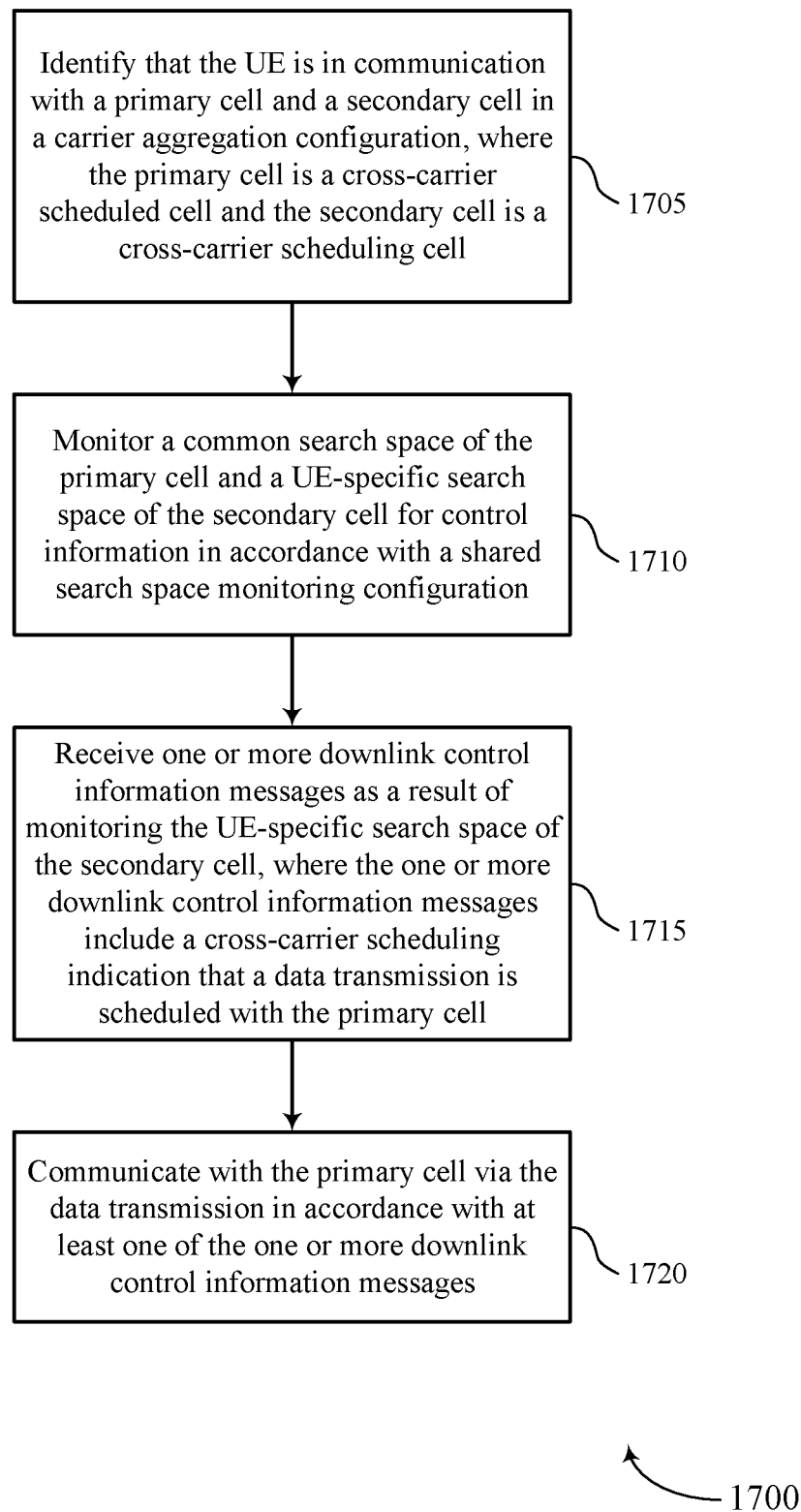
FIGS. 17 through 20 show flowcharts illustrating methods that support techniques for cross-carrier scheduling from a secondary cell to a primary cell in accordance with aspects of the present disclosure.

FIG. 17 shows a flowchart illustrating a method 1700 that supports techniques for cross-carrier scheduling from a secondary cell to a primary cell in accordance with aspects of the present disclosure. The operations of method 1700 may be implemented by a UE or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may identify that the UE is in communication with a primary cell and a secondary cell in a carrier aggregation configuration, where the primary cell is a cross-carrier scheduled cell and the secondary cell is a cross-carrier scheduling cell. The operations of 1705 may be performed according to the methods described herein. In some examples, aspects of the operations of 1705 may be performed by a CA configuration manager as described with reference to FIGS. 9 through 12.

At 1710, the UE may monitor a common search space of the primary cell and a UE-specific search space of the secondary cell for control information in accordance with a shared search space monitoring configuration. The operations of 1710 may be performed according to the methods described herein. In some examples, aspects of the operations of 1710 may be performed by a monitoring configuration manager as described with reference to FIGS. 9 through 12.

At 1715, the UE may receive one or more downlink control information messages as a result of monitoring the UE-specific search space of the secondary cell, where the one or more downlink control information messages include a cross-carrier scheduling indication that a data transmission is scheduled with the primary cell. The operations of 1715 may be performed according to the methods described herein. In some examples, aspects of the operations of 1715 may be performed by a DCI manager as described with reference to FIGS. 9 through 12.

At 1720, the UE may communicate with the primary cell via the data transmission in accordance with at least one of the one or more downlink control information messages. The operations of 1720 may be performed according to the methods described herein. In some examples, aspects of the operations of 1720 may be performed by a data transmission manager as described with reference to FIGS. 9 through 12.

Figure 18:
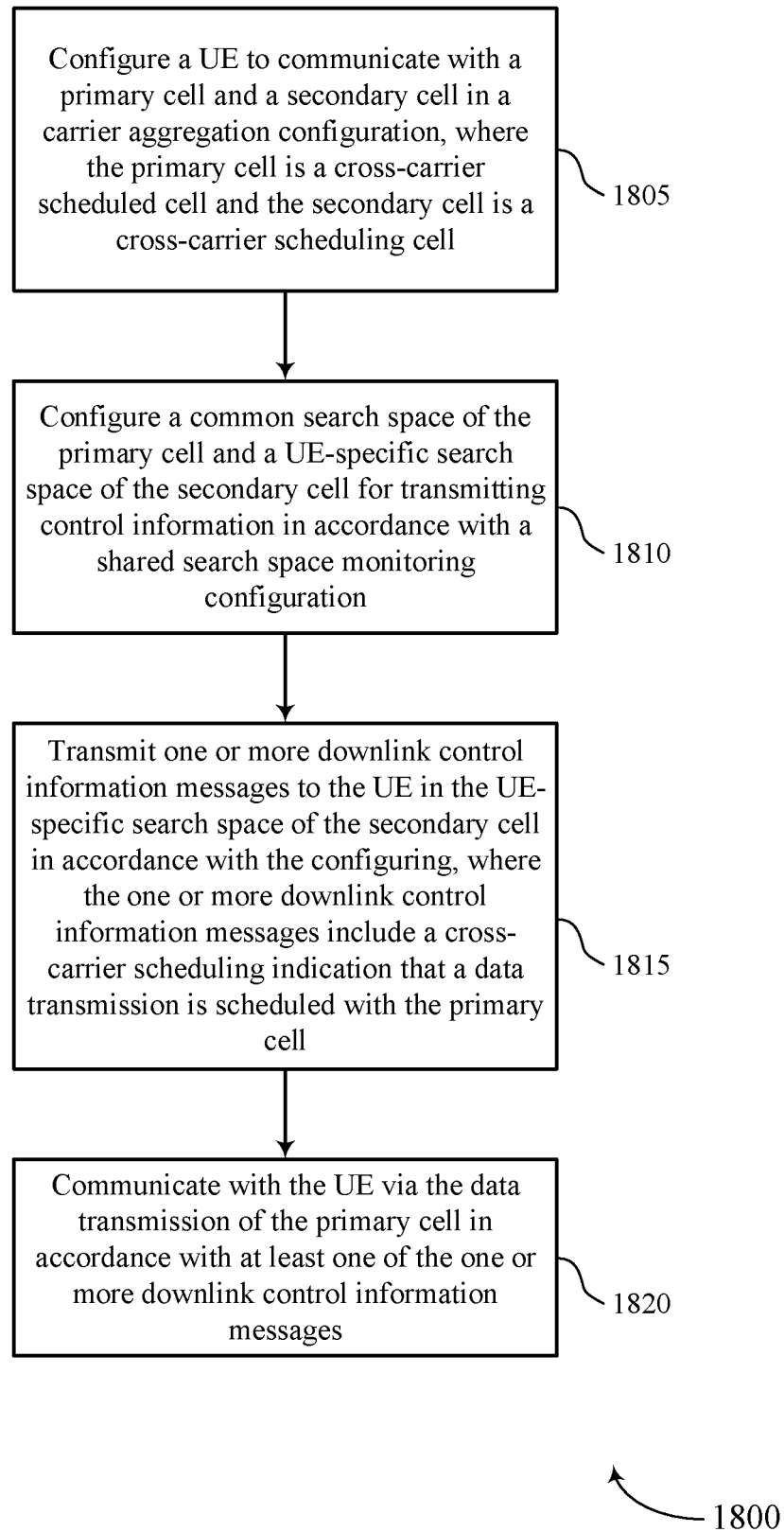

FIG. 18 shows a flowchart illustrating a method 1800 that supports techniques for cross-carrier scheduling from a secondary cell to a primary cell in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may configure a UE to communicate with a primary cell and a secondary cell in a carrier aggregation configuration, where the primary cell is a cross-carrier scheduled cell and the secondary cell is a cross-carrier scheduling cell. The operations of 1805 may be performed according to the methods described herein. In some examples, aspects of the operations of 1805 may be performed by a CA configuration component as described with reference to FIGS. 13 through 16.

At 1810, the base station may configure a common search space of the primary cell and a UE-specific search space of the secondary cell for transmitting control information in accordance with a shared search space monitoring configuration. The operations of 1810 may be performed according to the methods described herein. In some examples, aspects of the operations of 1810 may be performed by a search space manager as described with reference to FIGS. 13 through 16.

At 1815, the base station may transmit one or more downlink control information messages to the UE in the UE-specific search space of the secondary cell in accordance with the configuring, where the one or more downlink control information messages include a cross-carrier scheduling indication that a data transmission is scheduled with the primary cell. The operations of 1815 may be performed according to the methods described herein. In some examples, aspects of the operations of 1815 may be performed by a control information manager as described with reference to FIGS. 13 through 16.

At 1820, the base station may communicate with the UE via the data transmission of the primary cell in accordance with at least one of the one or more downlink control information messages. The operations of 1820 may be performed according to the methods described herein. In some examples, aspects of the operations of 1820 may be performed by a data transmission component as described with reference to FIGS. 13 through 16.

Figure 19:
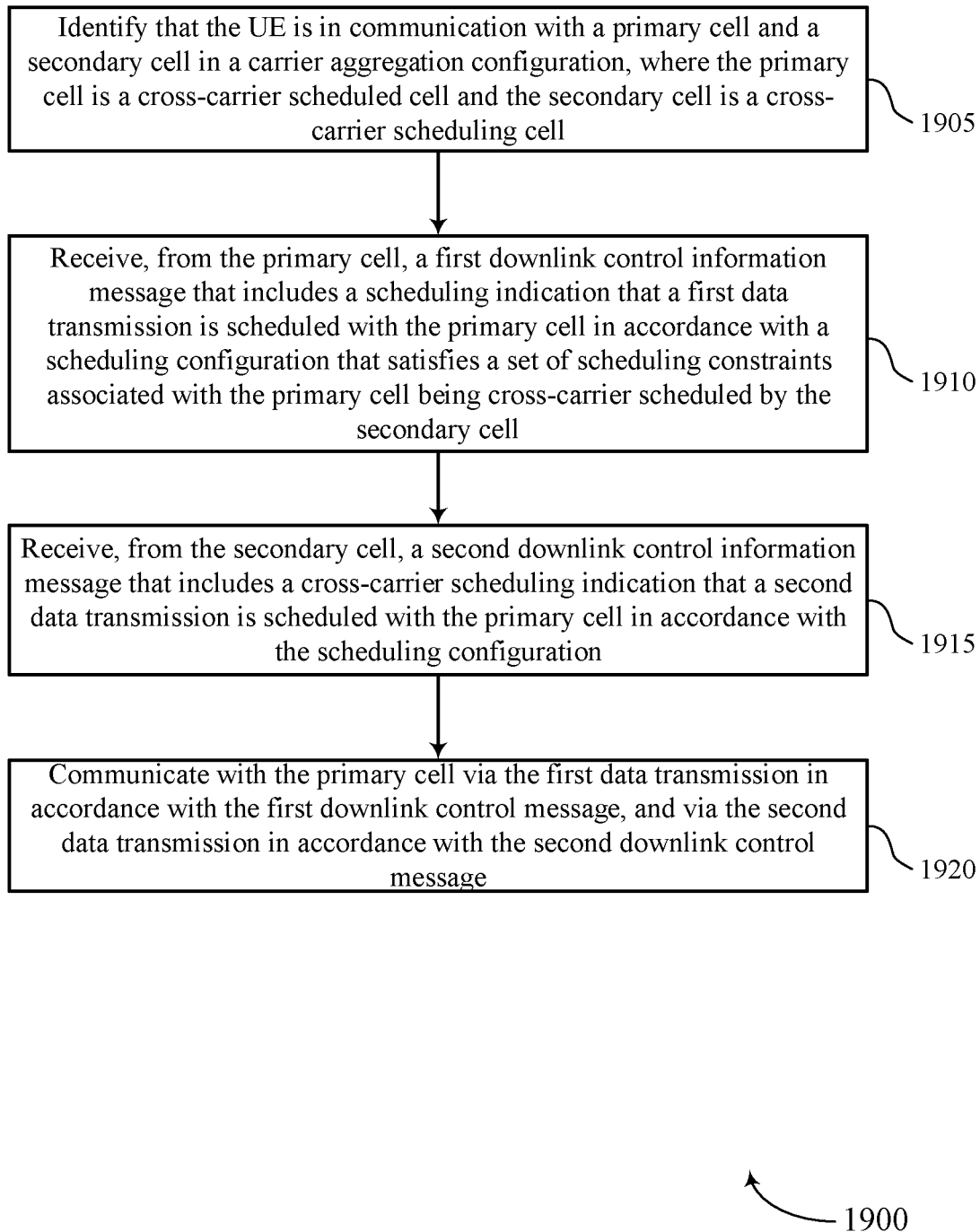

FIG. 19 shows a flowchart illustrating a method 1900 that supports techniques for cross-carrier scheduling from a secondary cell to a primary cell in accordance with aspects of the present disclosure. The operations of method 1900 may be implemented by a UE or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may identify that the UE is in communication with a primary cell and a secondary cell in a carrier aggregation configuration, where the primary cell is a cross-carrier scheduled cell and the secondary cell is a cross-carrier scheduling cell. The operations of 1905 may be performed according to the methods described herein. In some examples, aspects of the operations of 1905 may be performed by a CA configuration manager as described with reference to FIGS. 9 through 12.

At 1910, the UE may receive, from the primary cell, a first downlink control information message that includes a scheduling indication that a first data transmission is scheduled with the primary cell in accordance with a scheduling configuration that satisfies a set of scheduling constraints associated with the primary cell being cross-carrier scheduled by the secondary cell. The operations of 1910 may be performed according to the methods described herein. In some examples, aspects of the operations of 1910 may be performed by a scheduling configuration manager as described with reference to FIGS. 9 through 12.

At 1915, the UE may receive, from the secondary cell, a second downlink control information message that includes a cross-carrier scheduling indication that a second data transmission is scheduled with the primary cell in accordance with the scheduling configuration. The operations of 1915 may be performed according to the methods described herein. In some examples, aspects of the operations of 1915 may be performed by a scheduling configuration manager as described with reference to FIGS. 9 through 12.

At 1920, the UE may communicate with the primary cell via the first data transmission in accordance with the first downlink control information message, and via the second data transmission in accordance with the second downlink control information message. The operations of 1920 may be performed according to the methods described herein. In some examples, aspects of the operations of 1920 may be performed by a data transmission manager as described with reference to FIGS. 9 through 12.

Figure 20:
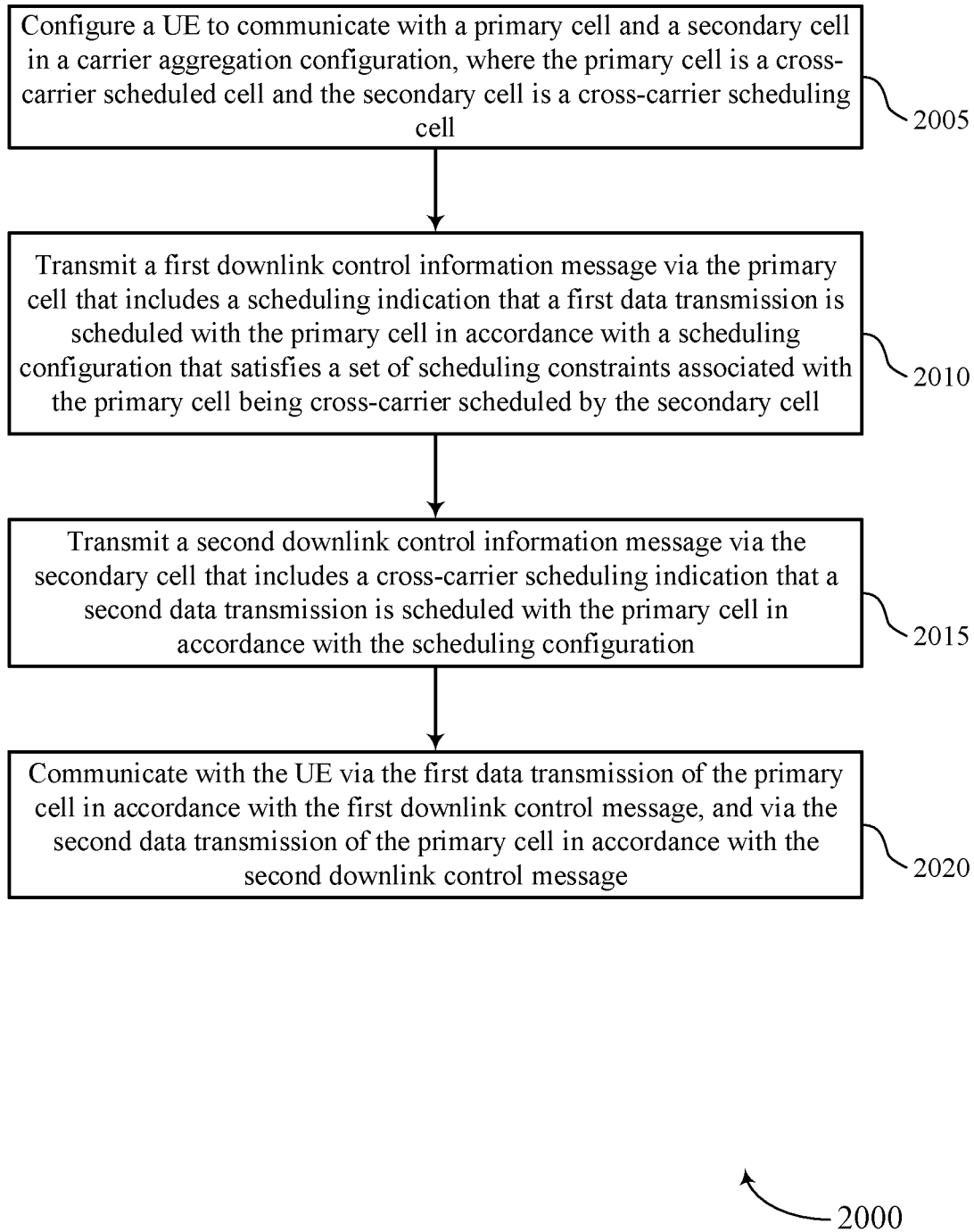

FIG. 20 shows a flowchart illustrating a method 2000 that supports techniques for cross-carrier scheduling from a secondary cell to a primary cell in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may configure a UE to communicate with a primary cell and a secondary cell in a carrier aggregation configuration, where the primary cell is a cross-carrier scheduled cell and the secondary cell is a cross-carrier scheduling cell. The operations of 2005 may be performed according to the methods described herein. In some examples, aspects of the operations of 2005 may be performed by a CA configuration component as described with reference to FIGS. 13 through 16.

At 2010, the base station may transmit a first downlink control information message via the primary cell that includes a scheduling indication that a first data transmission is scheduled with the primary cell in accordance with a scheduling configuration that satisfies a set of scheduling constraints associated with the primary cell being cross-carrier scheduled by the secondary cell. The operations of 2010 may be performed according to the methods described herein. In some examples, aspects of the operations of 2010 may be performed by a scheduling manager as described with reference to FIGS. 13 through 16.

At 2015, the base station may transmit a second downlink control information message via the secondary cell that includes a cross-carrier scheduling indication that a second data transmission is scheduled with the primary cell in accordance with the scheduling configuration. The operations of 2015 may be performed according to the methods described herein. In some examples, aspects of the operations of 2015 may be performed by a scheduling manager as described with reference to FIGS. 13 through 16.

At 2020, the base station may communicate with the UE via the first data transmission of the primary cell in accordance with the first downlink control information message, and via the second data transmission of the primary cell in accordance with the second downlink control information message. The operations of 2020 may be performed according to the methods described herein. In some examples, aspects of the operations of 2020 may be performed by a data transmission component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: identifying that the UE is in communication with a primary cell and a secondary cell in a carrier aggregation configuration, wherein the primary cell is a cross-carrier scheduled cell and the secondary cell is a cross-carrier scheduling cell; monitoring a common search space of the primary cell and a UE-specific search space of the secondary cell for control information in accordance with a shared search space monitoring configuration; receiving one or more downlink control information messages as a result of monitoring the UE-specific search space of the secondary cell, wherein the one or more downlink control information messages include a cross-carrier scheduling indication that a data transmission is scheduled with the primary cell; and communicating with the primary cell via the data transmission in accordance with at least one of the one or more downlink control information messages.

Aspect 2: The method of aspect 1, further comprising: identifying a respective carrier indicator field in each of the one or more downlink control information messages, wherein the cross-carrier scheduling indication is a value included in one of the respective carrier indicator fields.

Aspect 3: The method of any of aspects 1 or 2, further comprising: determining a limit corresponding to the shared search space monitoring configuration, wherein the limit is associated with a maximum number of blind decodes to be attempted by the UE, a maximum number of non-overlapping control channel elements, or both, across control channel candidates of the common search space of the primary cell and of the UE-specific search space of the secondary cell.

Aspect 4: The method of any of aspects 1 to 3, further comprising: receiving an indication of the limit from the secondary cell, wherein determining the limit is based at least in part on receiving the indication.

Aspect 5: The method of any of aspects 1 to 4, further comprising: receiving an indication of the shared search space monitoring configuration consistent with the limit, wherein the monitoring is further in accordance with the limit.

Aspect 6: The method of any of aspects 1 to 4, further comprising: receiving an indication of the shared search space monitoring configuration, wherein the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both; identifying a second UE-specific search space of the secondary cell included in the shared search space monitoring configuration; and refraining from monitoring the second UE-specific search space of the secondary cell in accordance with the limit.

Aspect 7: The method of any of aspects 1 to 6, further comprising: receiving a second downlink control information message as a result of the monitoring, wherein the second downlink control information message includes a second scheduling indication that a second data transmission is scheduled with the secondary cell; and communicating with the secondary cell via the second data transmission in accordance with the second downlink control information message.

Aspect 8: The method of any of aspects 1 to 7, further comprising: receiving a third downlink control information message as a result of the monitoring, wherein the third downlink control information message includes a third scheduling indication that a third data transmission is scheduled with the primary cell; and communicating with the primary cell via the third data transmission in accordance with the third downlink control information message.

Aspect 9: The method of any of aspects 1 to 8, wherein: the shared search space monitoring configuration includes control channel candidates associated with the one or more downlink control information messages that include the cross-carrier scheduling indication; and the control channel candidates associated with the one or more downlink control information messages are not included in UE-specific search spaces not associated with the cross-carrier scheduling indication.

Aspect 10: The method of any of aspects 1 to 8, wherein: the shared search space monitoring configuration includes control channel candidates associated with the one or more downlink control information messages that include the cross-carrier scheduling indication; and one or more of the control channel candidates associated with the one or more downlink control information messages are included in a second UE-specific search space not associated with the cross-carrier scheduling indication.

Aspect 11: The method of any of aspects 1 to 10, further comprising: reporting an indication of a capability of the UE to support shared search space control channel candidates in UE-specific search spaces not associated with the cross-carrier scheduling indication, wherein the shared search space monitoring configuration is based at least in part on the capability.

Aspect 12: The method of any of aspects 1 to 11, wherein monitoring the common search space of the primary cell for the control information comprises: monitoring a type0 common search space of the primary cell, a type0A common search space of the primary cell, a type1 common search space of the primary cell, a type2 common search space of the primary cell, a type3 common search space of the primary cell, or any combination thereof.

Aspect 13: The method of any of aspects 1 to 12, wherein communicating with the primary cell via the data transmission comprises: receiving a downlink data transmission from the primary cell, transmitting an uplink data transmission to the primary cell, or both.

Aspect 14: An apparatus for wireless communications comprising a processor; memory in electronic communication with the processor; and instructions stored in the memory and executable by the processor to cause the apparatus to perform a method of any of aspects 1 to 13.

Aspect 15: A non-transitory computer-readable medium storing code for wireless communications, the code comprising instructions executable by a processor to perform a method of any of aspects 1 to 13.

Aspect 16: An apparatus, comprising means for performing the method of any of aspects 1 to 13.

Aspect 17: A method for wireless communications at a base station, comprising: configuring a UE to communicate with a primary cell and a secondary cell in a carrier aggregation configuration, wherein the primary cell is a cross-carrier scheduled cell and the secondary cell is a cross-carrier scheduling cell; configuring a common search space of the primary cell and a UE-specific search space of the secondary cell for transmitting control information in accordance with a shared search space monitoring configuration; transmitting one or more downlink control information messages to the UE in the UE-specific search space of the secondary cell in accordance with the configuring, wherein the one or more downlink control information messages include a cross-carrier scheduling indication that a data transmission is scheduled with the primary cell; and communicating with the UE via the data transmission of the primary cell in accordance with at least one of the one or more downlink control information messages.

Aspect 18: The method of aspect 17, further comprising: configuring a respective carrier indicator field in each of the one or more downlink control information messages, wherein the cross-carrier scheduling indication is a value included in one of the respective carrier indicator fields.

Aspect 19: The method of any of aspects 17 or 18, further comprising: determining a limit corresponding to the shared search space monitoring configuration, wherein the limit is associated with a maximum number of blind decodes to be attempted by the UE, a maximum number of non-overlapping control channel elements, or both, across control channel candidates of the common search space of the primary cell and of the UE-specific search space of the secondary cell.

Aspect 20: The method of any of aspects 17 to 19, further comprising: transmitting an indication of the limit to the UE based at least in part on determining the limit.

Aspect 21: The method of any of aspects 17 to 20, further comprising: determining the shared search space monitoring configuration based at least in part on the limit, wherein the shared search space monitoring configuration is consistent with the limit; and transmitting an indication of the shared search space monitoring configuration to the UE.

Aspect 22: The method of any of aspects 17 to 20, further comprising: determining the shared search space monitoring configuration based at least in part on the limit, wherein the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both; and transmitting an indication of the shared search space monitoring configuration to the UE.

Aspect 23: The method of any of aspects 17 to 22, further comprising: transmitting a second downlink control information message, wherein the second downlink control information message includes a second scheduling indication that a second data transmission is scheduled with the secondary cell; and communicating with the UE via the second data transmission of the secondary cell in accordance with the second downlink control information message.

Aspect 24: The method of any of aspects 17 to 23, further comprising: transmitting a third downlink control information message, wherein the third downlink control information message includes a third scheduling indication that a third data transmission is scheduled with the primary cell; and communicating with the UE via the third data transmission of the primary cell in accordance with the third downlink control information message.

Aspect 25: The method of any of aspects 17 to 24, wherein: the shared search space monitoring configuration includes control channel candidates associated with the one or more downlink control information messages that include the cross-carrier scheduling indication; and the control channel candidates associated with the one or more downlink control information messages are not included in UE-specific search spaces not associated with the cross-carrier scheduling indication.

Aspect 26: The method of any of aspects 17 to 24, wherein: the shared search space monitoring configuration includes control channel candidates associated with the one or more downlink control information messages that include the cross-carrier scheduling indication; and one or more of the control channel candidates associated with the one or more downlink control information messages are included in a second UE-specific search space not associated with the cross-carrier scheduling indication.

Aspect 27: The method of any of aspects 17 to 26, further comprising: receiving an indication of a capability of the UE to support shared search space control channel candidates in UE-specific search spaces not associated with the cross-carrier scheduling indication, wherein the shared search space monitoring configuration is based at least in part on receiving the indication.

Aspect 28: The method of any of aspects 17 to 27, wherein the common search space of the primary cell comprises a type0 common search space of the primary cell, a type0A common search space of the primary cell, a type1 common search space of the primary cell, a type2 common search space of the primary cell, a type3 common search space of the primary cell, or any combination thereof.

Aspect 29: The method of any of aspects 17 to 28, wherein communicating with the UE via the data transmission of the primary cell comprises: transmitting a downlink data transmission to the UE, receiving an uplink data transmission from the UE, or both.

Aspect 30: An apparatus for wireless communications comprising a processor; memory in electronic communication with the processor; and instructions stored in the memory and executable by the processor to cause the apparatus to perform a method of any of aspects 17 to 29.

Aspect 31: A non-transitory computer-readable medium storing code for wireless communications, the code comprising instructions executable by a processor to perform a method of any of aspects 17 to 29.

Aspect 32: An apparatus, comprising means for performing the method of any of aspects 17 to 29.

Aspect 33: A method for wireless communications at a UE, comprising: identifying that the UE is in communication with a primary cell and a secondary cell in a carrier aggregation configuration, wherein the primary cell is a cross-carrier scheduled cell and the secondary cell is a cross-carrier scheduling cell; receiving, from the primary cell, a first downlink control information message that includes a scheduling indication that a first data transmission is scheduled with the primary cell in accordance with a scheduling configuration that satisfies a plurality of scheduling constraints associated with the primary cell being cross-carrier scheduled by the secondary cell; receiving, from the secondary cell, a second downlink control information message that includes a cross-carrier scheduling indication that a second data transmission is scheduled with the primary cell in accordance with the scheduling configuration; and communicating with the primary cell via the first data transmission in accordance with the first downlink control information message, and via the second data transmission in accordance with the second downlink control information message.

Aspect 34: The method of aspect 33, further comprising: monitoring a common search space of the primary cell and one or more UE-specific search spaces of the secondary cell for control information in accordance with a shared search space monitoring configuration, wherein the first downlink control information message and the second downlink control information message are received as a result of the monitoring, and wherein the scheduling configuration is based at least in part on the shared search space monitoring configuration.

Aspect 35: The method of any of aspects 33 or 34, wherein: the first data transmission is communicated in a first duration in accordance with the scheduling configuration; and the second data transmission is communicated in a second duration that does not overlap with the first duration based at least in part on one or more scheduling constraints of the plurality of scheduling constraints.

Aspect 36: The method of any of aspects 33 to 35, wherein: the first data transmission is communicated in a first slot in accordance with the scheduling configuration; and the second data transmission is communicated in a second slot different from the first slot based at least in part on one or more scheduling constraints of the plurality of scheduling constraints.

Aspect 37: The method of any of aspects 33 to 36, wherein: the first downlink control information message is received before the second downlink control information message in accordance with the scheduling configuration; and the first data transmission is communicated before the second data transmission based at least in part on one or more scheduling constraints of the plurality of scheduling constraints.

Aspect 38: The method of any of aspects 33 to 36, wherein: the first downlink control information message is received after the second downlink control information message in accordance with the scheduling configuration; and the first data transmission is communicated after the second data transmission based at least in part on one or more scheduling constraints of the plurality of scheduling constraints.

Aspect 39: The method of any of aspects 33 to 38, wherein: the first downlink control information message is received in a first duration in accordance with the scheduling configuration; and the second downlink control information message is received in a second duration that does not overlap with the first duration based at least in part on one or more scheduling constraints of the plurality of scheduling constraints.

Aspect 40: The method of any of aspects 33 to 39, wherein: the first downlink control information message is received in a first monitoring occasion in accordance with the scheduling configuration; and the second downlink control information message is received in a second monitoring occasion different from the first monitoring occasion based at least in part on one or more scheduling constraints of the plurality of scheduling constraints.

Aspect 41: The method of any of aspects 33 to 40, wherein: the first downlink control information message is received in a first slot in accordance with the scheduling configuration; and the second downlink control information message is received in a second slot different from the first slot based at least in part on one or more scheduling constraints of the plurality of scheduling constraints.

Aspect 42: The method of any of aspects 33 to 41, further comprising: transmitting a first feedback message to the primary cell based at least in part on communicating with the primary cell via the first data transmission; and transmitting a second feedback message to the primary cell based at least in part on communicating with the primary cell via the second data transmission.

Aspect 43: The method of any of aspects 33 to 42, wherein: the first feedback message is included in a first uplink transmission in accordance with the scheduling configuration; and the second feedback message is included in a second uplink transmission different from the first uplink transmission based at least in part on one or more scheduling constraints of the plurality of scheduling constraints.

Aspect 44: The method of any of aspects 33 to 43, wherein: the first data transmission is communicated before the second data transmission in accordance with the scheduling configuration; and the first feedback message is transmitted before the second feedback message based at least in part on one or more scheduling constraints of the plurality of scheduling constraints.

Aspect 45: The method of any of aspects 33 to 43, wherein: the first data transmission is communicated after the second data transmission in accordance with the scheduling configuration; and the first feedback message is transmitted after the second feedback message based at least in part on one or more scheduling constraints of the plurality of scheduling constraints.

Aspect 46: The method of any of aspects 33 to 45, further comprising: receiving, from the primary cell, a third downlink control information message that includes a second scheduling indication that a retransmission of the first data transmission is scheduled with the primary cell in accordance with the scheduling configuration; and communicating with the primary cell via the retransmission of the first data transmission in accordance with the third downlink control information message.

Aspect 47: The method of any of aspects 33 to 46, further comprising: receiving, from the secondary cell, a fourth downlink control information message that includes a second cross-carrier scheduling indication that a retransmission of the second data transmission is scheduled with the primary cell in accordance with the scheduling configuration; and communicating with the primary cell via the retransmission of the second data transmission in accordance with the fourth downlink control information message.

Aspect 48: The method of any of aspects 33 to 47, wherein: the first feedback message comprises a hybrid automatic repeat request acknowledgment message or a hybrid automatic repeat request negative acknowledgment message; and the second feedback message comprises a hybrid automatic repeat request acknowledgment message or a hybrid automatic repeat request negative acknowledgment message.

Aspect 49: The method of any of aspects 33 to 48, wherein communicating with the primary cell via a data transmission comprises: receiving a downlink data transmission from the primary cell, transmitting an uplink data transmission to the primary cell, or both.

Aspect 50: An apparatus for wireless communications comprising a processor; memory in electronic communication with the processor; and instructions stored in the memory and executable by the processor to cause the apparatus to perform a method of any of aspects 33 to 49.

Aspect 51: A non-transitory computer-readable medium storing code for wireless communications, the code comprising instructions executable by a processor to perform a method of any of aspects 33 to 49.

Aspect 52: An apparatus, comprising means for performing the method of any of aspects 33 to 49.

Aspect 53: A method for wireless communications at a base station, comprising: configuring a UE to communicate with a primary cell and a secondary cell in a carrier aggregation configuration, wherein the primary cell is a cross-carrier scheduled cell and the secondary cell is a cross-carrier scheduling cell; transmitting a first downlink control information message via the primary cell that includes a scheduling indication that a first data transmission is scheduled with the primary cell in accordance with a scheduling configuration that satisfies a plurality of scheduling constraints associated with the primary cell being cross-carrier scheduled by the secondary cell; transmitting a second downlink control information message via the secondary cell that includes a cross-carrier scheduling indication that a second data transmission is scheduled with the primary cell in accordance with the scheduling configuration; and communicating with the UE via the first data transmission of the primary cell in accordance with the first downlink control information message, and via the second data transmission of the primary cell in accordance with the second downlink control information message.

Aspect 54: The method of aspect 53, further comprising: configuring a common search space of the primary cell and one or more UE-specific search spaces of the secondary cell for transmitting control information in accordance with a shared search space monitoring configuration, wherein the first downlink control information message and the second downlink control information message are transmitted based at least in part on the determining, and wherein the scheduling configuration is based at least in part on the shared search space monitoring configuration.

Aspect 55: The method of any of aspects 53 or 54, wherein: the first data transmission is communicated in a first duration in accordance with the scheduling configuration; and the second data transmission is communicated in a second duration that does not overlap with the first duration based at least in part on one or more scheduling constraints of the plurality of scheduling constraints.

Aspect 56: The method of any of aspects 53 to 55, wherein: the first data transmission is communicated in a first slot in accordance with the scheduling configuration; and the second data transmission is communicated in a second slot different from the first slot based at least in part on one or more scheduling constraints of the plurality of scheduling constraints.

Aspect 57: The method of any of aspects 53 to 56, wherein: the first downlink control information message is received before the second downlink control information message in accordance with the scheduling configuration; and the first data transmission is communicated before the second data transmission based at least in part on one or more scheduling constraints of the plurality of scheduling constraints.

Aspect 58: The method of any of aspects 53 to 56, wherein: the first downlink control information message is transmitted after the second downlink control information message in accordance with the scheduling configuration; and the first data transmission is communicated after the second data transmission based at least in part on one or more scheduling constraints of the plurality of scheduling constraints.

Aspect 59: The method of any of aspects 53 to 58, wherein: the first downlink control information message is transmitted in a first duration in accordance with the scheduling configuration; and the second downlink control information message is received in a second duration that does not overlap with the first duration based at least in part on one or more scheduling constraints of the plurality of scheduling constraints.

Aspect 60: The method of any of aspects 53 to 59, wherein: the first downlink control information message is transmitted in a first monitoring occasion in accordance with the scheduling configuration; and the second downlink control information message is transmitted in a second monitoring occasion different from the first monitoring occasion based at least in part on one or more scheduling constraints of the plurality of scheduling constraints.

Aspect 61: The method of any of aspects 53 to 60, wherein: the first downlink control information message is transmitted in a first slot in accordance with the scheduling configuration; and the second downlink control information message is transmitted in a second slot different from the first slot based at least in part on one or more scheduling constraints of the plurality of scheduling constraints.

Aspect 62: The method of any of aspects 53 to 61, further comprising: receiving a first feedback message from the UE based at least in part on communicating with the UE via the first data transmission of the primary cell; and receiving a second feedback message from the UE based at least in part on communicating with the UE via the first data transmission of the primary cell.

Aspect 63: The method of any of aspects 53 to 62, wherein: the first feedback message is included in a first uplink transmission in accordance with the scheduling configuration; and the second feedback message is included in a second uplink transmission different from the first uplink transmission based at least in part on one or more scheduling constraints of the plurality of scheduling constraints.

Aspect 64: The method of any of aspects 53 to 63, wherein: the first data transmission is communicated before the second data transmission in accordance with the scheduling configuration; and the first feedback message is received before the second feedback message based at least in part on one or more scheduling constraints of the plurality of scheduling constraints.

Aspect 65: The method of any of aspects 53 to 63, wherein: the first data transmission is communicated after the second data transmission in accordance with the scheduling configuration; and the first feedback message is received after the second feedback message based at least in part on one or more scheduling constraints of the plurality of scheduling constraints.

Aspect 66: The method of any of aspects 53 to 65, further comprising: transmitting a third downlink control information message via the primary cell that includes a second scheduling indication that a retransmission of the first data transmission is scheduled with the primary cell in accordance with the scheduling configuration; and communicating with the UE via the retransmission of the first data transmission of the primary cell in accordance with the third downlink control information message.

Aspect 67: The method of any of aspects 53 to 66, further comprising: transmitting a fourth downlink control information message via the secondary cell that includes a second cross-carrier scheduling indication that a retransmission of the second data transmission is scheduled with the primary cell in accordance with the scheduling configuration; and communicating with the UE via the retransmission of the second data transmission of the primary cell in accordance with the fourth downlink control information message.

Aspect 68: The method of any of aspects 53 to 67, wherein: the first feedback message comprises a hybrid automatic repeat request acknowledgment message or a hybrid automatic repeat request negative acknowledgment message; and the second feedback message comprises a hybrid automatic repeat request acknowledgment message or a hybrid automatic repeat request negative acknowledgment message.

Aspect 69: The method of any of aspects 53 to 68, wherein communicating with the UE via a data transmission of the primary cell comprises: transmitting a downlink data transmission to the UE, receiving an uplink data transmission from the UE, or both.

Aspect 70: An apparatus for wireless communications comprising a processor; memory in electronic communication with the processor; and instructions stored in the memory and executable by the processor to cause the apparatus to perform a method of any of aspects 53 to 69.

Aspect 71: A non-transitory computer-readable medium storing code for wireless communications, the code comprising instructions executable by a processor to perform a method of any of aspects 53 to 69.

Aspect 72: An apparatus, comprising means for performing the method of any of aspects 53 to 69.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    identifying that the UE is in communication with a primary cell and one or more secondary cells in a carrier aggregation configuration, wherein the primary cell is a cross-carrier scheduled cell and a first secondary cell is a cross-carrier scheduling cell;
    monitoring respective UE-specific search spaces of the one or more secondary cells for control information in accordance with a shared search space monitoring configuration;
    determining a limit corresponding to the shared search space monitoring configuration, wherein the limit is associated with a maximum number of blind decodes to be attempted by the UE, a maximum number of non-overlapping control channel elements, or both, across control channel candidates of the UE-specific search space of the first secondary cell;
    receiving an indication of the limit from the first secondary cell, wherein determining the limit is based at least in part on receiving the indication;
    receiving one or more downlink control information messages as a result of monitoring the UE-specific search space of the first secondary cell, wherein the one or more downlink control information messages schedule one or more data transmissions and include a cross-carrier scheduling indication that the one or more data transmissions are scheduled with the primary cell; and
    communicating with the primary cell via the data transmission in accordance with at least one of the one or more downlink control information messages.

2. The method of claim 1, further comprising:
    identifying a respective carrier indicator field in each of the one or more downlink control information messages, wherein the cross-carrier scheduling indication is a value included in one of the respective carrier indicator fields.

3. The method of claim 1, further comprising:
    receiving an indication of the shared search space monitoring configuration consistent with the limit, wherein the monitoring is further in accordance with the limit.

4. The method of claim 1, further comprising:
    receiving an indication of the shared search space monitoring configuration, wherein the shared search space monitoring configuration includes a number of blind decodes that exceeds the maximum number of blind decodes associated with the limit, a number of non-overlapping control channel elements that exceeds the maximum number of non-overlapping control channel elements associated with the limit, or both;
    identifying a second UE-specific search space of the first secondary cell included in the shared search space monitoring configuration; and
    refraining from monitoring the second UE-specific search space of the first secondary cell in accordance with the limit.

5. The method of claim 1, further comprising:
receiving a second downlink control information message as a result of the monitoring, wherein the second downlink control information message includes a second scheduling indication that a second data transmission is scheduled with the first secondary cell; and
communicating with the first secondary cell via the second data transmission in accordance with the second downlink control information message.

6. The method of claim 1, further comprising:
receiving a third downlink control information message as a result of the monitoring, wherein the third downlink control information message includes a third scheduling indication that a third data transmission is scheduled with the primary cell; and
communicating with the primary cell via the third data transmission in accordance with the third downlink control information message.

7. The method of claim 1, wherein:
the shared search space monitoring configuration includes control channel candidates associated with the one or more downlink control information messages that include the cross-carrier scheduling indication; and
the control channel candidates associated with the one or more downlink control information messages are not included in UE-specific search spaces unassociated with the cross-carrier scheduling indication.

8. The method of claim 1, wherein:
the shared search space monitoring configuration includes control channel candidates associated with the one or more downlink control information messages that include the cross-carrier scheduling indication; and
one or more of the control channel candidates associated with the one or more downlink control information messages are included in a second UE-specific search space not associated with the cross-carrier scheduling indication.

9. The method of claim 1, further comprising:
reporting an indication of a capability of the UE to support shared search space control channel candidates in UE-specific search spaces not associated with the cross-carrier scheduling indication, wherein the shared search space monitoring configuration is based at least in part on the capability.

10. The method of claim 1, wherein communicating with the primary cell via the data transmission comprises:
receiving a downlink data transmission from the primary cell, transmitting an uplink data transmission to the primary cell, or both.

11. An apparatus for wireless communications at a user equipment (UE), comprising:
one or more processors, one or more memories coupled with the one or more processors; and
instructions stored in the one or more memories and executable by the one or more processors to cause the apparatus to:
identify that the UE is in communication with a primary cell and one or more secondary cells in a carrier aggregation configuration, wherein the primary cell is a cross-carrier scheduled cell and a first secondary cell is a cross-carrier scheduling cell;
monitor respective UE-specific search spaces of the one or more secondary cells for control information in accordance with a shared search space monitoring configuration;
determine a limit corresponding to the shared search space monitoring configuration, wherein the limit is associated with a maximum number of blind decodes to be attempted by the UE, a maximum number of non-overlapping control channel elements, or both, across control channel candidates of the UE-specific search space of the first secondary cell;
receive an indication of the limit from the first secondary cell, wherein determining the limit is based at least in part on receiving the indication;
receive one or more downlink control information messages as a result of monitoring the UE-specific search space of the first secondary cell, wherein the one or more downlink control information messages schedule one or more data transmissions and include a cross-carrier scheduling indication that the one or more data transmissions are scheduled with the primary cell; and
communicate with the primary cell via the data transmission in accordance with at least one of the one or more downlink control information messages.

12. The apparatus of claim 11, wherein the instructions are further executable by the one or more processors to cause the apparatus to:
identify a respective carrier indicator field in each of the one or more downlink control information messages, wherein the cross-carrier scheduling indication is a value included in one of the respective carrier indicator fields.

13. The apparatus of claim 11, wherein the instructions are further executable by the one or more processors to cause the apparatus to:
receive a second downlink control information message as a result of the monitoring, wherein the second downlink control information message includes a second scheduling indication that a second data transmission is scheduled with the first secondary cell; and
communicate with the first secondary cell via the second data transmission in accordance with the second downlink control information message.

14. The apparatus of claim 11, wherein the instructions are further executable by the one or more processors to cause the apparatus to:
receive a third downlink control information message as a result of the monitoring, wherein the third downlink control information message includes a third scheduling indication that a third data transmission is scheduled with the primary cell; and
communicate with the primary cell via the third data transmission in accordance with the third downlink control information message.

15. The apparatus of claim 11, wherein:
the shared search space monitoring configuration includes control channel candidates associated with the one or more downlink control information messages that include the cross-carrier scheduling indication; and
the control channel candidates associated with the one or more downlink control information messages are not included in UE-specific search spaces unassociated with the cross-carrier scheduling indication.

16. The apparatus of claim 11, wherein:
the shared search space monitoring configuration includes control channel candidates associated with the one or more downlink control information messages that include the cross-carrier scheduling indication, and
one or more of the control channel candidates associated with the one or more downlink control information messages are included in a second UE-specific search space not associated with the cross-carrier scheduling indication.

17. The apparatus of claim 11, wherein the instructions are further executable by the one or more processors to cause the apparatus to:
report an indication of a capability of the UE to support shared search space control channel candidates in UE-specific search spaces not associated with the cross-carrier scheduling indication, wherein the shared search space monitoring configuration is based at least in part on the capability.

18. The apparatus of claim 11, wherein the instructions to communicate with the primary cell via the data transmission are executable by the one or more processors to cause the apparatus to:
receive a downlink data transmission from the primary cell, transmit an uplink data transmission to the primary cell, or both.

19. An apparatus for wireless communications at a user equipment (UE), comprising:
means for identifying that the UE is in communication with a primary cell and one or more secondary cells in a carrier aggregation configuration, wherein the primary cell is a cross-carrier scheduled cell and a first secondary cell is a cross-carrier scheduling cell;
means for monitoring respective UE-specific search spaces of the one or more secondary cells for control information in accordance with a shared search space monitoring configuration;
means for determining a limit corresponding to the shared search space monitoring configuration, wherein the limit is associated with a maximum number of blind decodes to be attempted by the UE, a maximum number of non-overlapping control channel elements, or both, across control channel candidates of the UE-specific search space of the first secondary cell;
means for receiving an indication of the limit from the first secondary cell, wherein determining the limit is based at least in part on receiving the indication;
means for receiving one or more downlink control information messages as a result of monitoring the UE-specific search space of the first secondary cell, wherein the one or more downlink control information messages schedule one or more data transmissions and include a cross-carrier scheduling indication that the one or more data transmissions are scheduled with the primary cell; and
means for communicating with the primary cell via the data transmission in accordance with at least one of the one or more downlink control information messages.

20. A non-transitory computer-readable medium storing code for wireless communications at a user equipment (UE), the code comprising instructions executable by one or more processors to:
identify that the UE is in communication with a primary cell and one or more secondary cells in a carrier aggregation configuration, wherein the primary cell is a cross-carrier scheduled cell and a first secondary cell is a cross-carrier scheduling cell;
monitor respective UE-specific search spaces of the one or more secondary cells for control information in accordance with a shared search space monitoring configuration;
determine a limit corresponding to the shared search space monitoring configuration, wherein the limit is associated with a maximum number of blind decodes to be attempted by the UE, a maximum number of non-overlapping control channel elements, or both, across control channel candidates of the UE-specific search space of the first secondary cell;
receive an indication of the limit from the first secondary cell, wherein determining the limit is based at least in part on receiving the indication;
receive one or more downlink control information messages as a result of monitoring the UE-specific search space of the first secondary cell, wherein the one or more downlink control information messages schedule one or more data transmissions and include a cross-carrier scheduling indication that the one or more data transmissions are scheduled with the primary cell; and
communicate with the primary cell via the data transmission in accordance with at least one of the one or more downlink control information messages.

* * * * *